(12) United States Patent
Ferrari et al.

(10) Patent No.: US 7,325,201 B2
(45) Date of Patent: Jan. 29, 2008

(54) SYSTEM AND METHOD FOR MANIPULATING CONTENT IN A HIERARCHICAL DATA-DRIVEN SEARCH AND NAVIGATION SYSTEM

(75) Inventors: Adam J. Ferrari, Cambridge, MA (US); David J. Gourley, Boston, MA (US); Keith A. Johnson, Cambridge, MA (US); Frederick C. Knabe, Boston, MA (US); Vinay B. Mohta, Cambridge, MA (US); Daniel Tunkelang, Cambridge, MA (US); John S. Walter, Boston, MA (US); Andrew Lau, Cambridge, MA (US)

(73) Assignee: Endeca Technologies, Inc., Cambridge, MA (US)

( * ) Notice: Subject to any disclaimer, the term of this patent is extended or adjusted under 35 U.S.C. 154(b) by 647 days.

(21) Appl. No.: 10/272,557

(22) Filed: Oct. 16, 2002

(65) Prior Publication Data
US 2003/0097357 A1    May 22, 2003

Related U.S. Application Data

(63) Continuation-in-part of application No. 09/998,682, filed on Oct. 31, 2001, which is a continuation-in-part of application No. 09/961,131, filed on Sep. 21, 2001, which is a continuation-in-part of application No. 09/573,305, filed on May 18, 2000.

(51) Int. Cl.
*G06F 13/00* (2006.01)
*G06F 15/00* (2006.01)

(52) U.S. Cl. .......................... 715/737; 707/2

(58) Field of Classification Search ............... 715/713, 715/735–739, 853–855; 707/2, 3, 4, 5
See application file for complete search history.

(56) References Cited

U.S. PATENT DOCUMENTS 4,775,935 A    10/1988    Yourick (Continued)

FOREIGN PATENT DOCUMENTS

EP    0196064    10/1986

(Continued)

OTHER PUBLICATIONS http://web.archive.org/web/19991116151216/http://www4.yahoo.com/.*

(Continued)

*Primary Examiner*—Cao (Kevin) Nguyen
(74) *Attorney, Agent, or Firm*—Wilmer Cutler Pickering Hale and Dorr LLP

(57) ABSTRACT

A data-driven, hierarchical information search and navigation system and method enable search and navigation of sets of materials by certain common attributes that characterize the materials. A rules engine provides for manipulation of the content displayed to the user based on the query entered by the user. The rules engine includes one or more rules with a trigger and an action. The action of a rule is performed only if the trigger is satisfied. A trigger may be specified in terms of expressions of attribute-value pairs and is evaluated against a given query or navigation state. The actions can include various techniques for content manipulation, such as supplementing content, rendering content in a particular way, and sorting content in a particular way. An action may be specified in terms of navigation states. The rules engine may include a script for processing the rules.

43 Claims, 31 Drawing Sheets

U.S. PATENT DOCUMENTS

| | | |
|---|---|---|
| 4,868,733 A | 9/1989 | Fujisawa et al. |
| 4,879,648 A | 11/1989 | Cochran et al. |
| 4,996,642 A | 2/1991 | Hey |
| 5,206,949 A | 4/1993 | Cochran et al. |
| 5,241,671 A | 8/1993 | Reed et al. |
| 5,418,717 A | 5/1995 | Su et al. |
| 5,418,948 A | 5/1995 | Turtle |
| 5,418,951 A | 5/1995 | Damashek |
| 5,440,742 A | 8/1995 | Schwanke |
| 5,485,621 A | 1/1996 | Schwanke |
| 5,544,049 A | 8/1996 | Henderson et al. |
| 5,546,576 A | 8/1996 | Cochrane et al. |
| 5,548,506 A | 8/1996 | Srinivasan |
| 5,590,269 A | 12/1996 | Kruse et al. |
| 5,600,829 A | 2/1997 | Tsatalos et al. |
| 5,630,125 A | 5/1997 | Zellweger |
| 5,634,128 A | 5/1997 | Messina |
| 5,644,740 A | 7/1997 | Kiuchi |
| 5,675,784 A | 10/1997 | Maxwell et al. |
| 5,696,916 A | 12/1997 | Yamazaki et al. |
| 5,706,497 A | 1/1998 | Takahashi et al. |
| 5,715,444 A | 2/1998 | Danish et al. |
| 5,724,571 A | 3/1998 | Woods |
| 5,740,425 A | 4/1998 | Povilus |
| 5,749,081 A | 5/1998 | Whiteis |
| 5,764,975 A | 6/1998 | Taniguchi et al. |
| 5,768,578 A | 6/1998 | Kirk et al. |
| 5,768,581 A | 6/1998 | Cochran |
| 5,787,422 A | 7/1998 | Tukey et al. |
| 5,812,998 A | 9/1998 | Tsutsumi et al. |
| 5,835,905 A | 11/1998 | Pirolli et al. |
| 5,852,822 A | 12/1998 | Srinivasan et al. |
| 5,864,845 A | 1/1999 | Voorhees et al. |
| 5,864,846 A | 1/1999 | Voorhees et al. |
| 5,864,863 A | 1/1999 | Burrows |
| 5,870,746 A | 2/1999 | Knutson et al. |
| 5,873,075 A | 2/1999 | Cochrane et al. |
| 5,875,440 A | 2/1999 | Cooperman et al. |
| 5,875,446 A | 2/1999 | Brown et al. |
| 5,878,423 A | 3/1999 | Anderson et al. |
| 5,893,104 A | 4/1999 | Srinivasan et al. |
| 5,895,470 A | 4/1999 | Pirolli et al. |
| 5,897,639 A | 4/1999 | Greef et al. |
| 5,920,859 A | 7/1999 | Li |
| 5,924,105 A | 7/1999 | Punch, III et al. |
| 5,926,811 A | 7/1999 | Miller et al. |
| 5,940,821 A | 8/1999 | Wical |
| 5,943,670 A | 8/1999 | Prager |
| 5,950,189 A | 9/1999 | Cohen et al. |
| 5,970,489 A | 10/1999 | Jacobson et al. |
| 5,978,788 A | 11/1999 | Castelli et al. |
| 5,978,794 A | 11/1999 | Agrawal et al. |
| 5,978,799 A | 11/1999 | Hirsch |
| 5,983,219 A | 11/1999 | Danish et al. |
| 5,983,220 A | 11/1999 | Schmitt |
| 5,983,223 A | 11/1999 | Perlman |
| 5,986,655 A | 11/1999 | Chiu et al. |
| 5,987,468 A | 11/1999 | Singh et al. |
| 5,987,470 A | 11/1999 | Meyers et al. |
| 5,991,756 A | 11/1999 | Wu |
| 6,006,217 A | 12/1999 | Lumsden |
| 6,006,218 A | 12/1999 | Breese et al. |
| 6,006,222 A | 12/1999 | Culliss |
| 6,006,225 A | 12/1999 | Bowman et al. |
| 6,009,424 A | 12/1999 | Lepage et al. |
| 6,012,006 A | 1/2000 | Ohneda et al. |
| 6,012,066 A | 1/2000 | Discount et al. |
| 6,014,639 A | 1/2000 | Fohn et al. |
| 6,014,655 A | 1/2000 | Fujiwara et al. |
| 6,014,657 A | 1/2000 | Weida et al. |
| 6,014,665 A | 1/2000 | Culliss |
| 6,028,605 A | 2/2000 | Conrad et al. |
| 6,029,195 A | 2/2000 | Herz |
| 6,035,294 A | 3/2000 | Fish |
| 6,038,560 A | 3/2000 | Wical |
| 6,038,574 A | 3/2000 | Pitkow et al. |
| 6,049,797 A | 4/2000 | Guha et al. |
| 6,070,162 A | 5/2000 | Miyasaka et al. |
| 6,092,049 A | 7/2000 | Chislenko et al. |
| 6,094,650 A | 7/2000 | Stoffel et al. |
| 6,112,186 A | 8/2000 | Bergh et al. |
| 6,144,958 A | 11/2000 | Ortega et al. |
| 6,167,368 A | 12/2000 | Wacholder |
| 6,167,397 A | 12/2000 | Jacobson et al. |
| 6,226,745 B1 | 5/2001 | Wiederhold |
| 6,236,985 B1 | 5/2001 | Aggarwal et al. |
| 6,240,378 B1 | 5/2001 | Imanaka et al. |
| 6,240,409 B1 | 5/2001 | Aiken |
| 6,243,713 B1 | 6/2001 | Nelson et al. |
| 6,260,008 B1 | 7/2001 | Sanfilippo |
| 6,263,334 B1 | 7/2001 | Fayyad et al. |
| 6,266,199 B1 | 7/2001 | Gillis et al. |
| 6,266,649 B1 | 7/2001 | Linden et al. |
| 6,269,368 B1 | 7/2001 | Diamond |
| 6,272,507 B1 | 8/2001 | Pirolli et al. |
| 6,289,354 B1 | 9/2001 | Aggarwal et al. |
| 6,301,577 B1 | 10/2001 | Matsumoto et al. |
| 6,317,741 B1 | 11/2001 | Burrows |
| 6,339,767 B1 | 1/2002 | Rivette et al. |
| 6,345,273 B1 | 2/2002 | Cochran |
| 6,356,899 B1 * | 3/2002 | Chakrabarti et al. ............ 707/5 |
| 6,360,227 B1 | 3/2002 | Aggarwal et al. |
| 6,360,277 B1 * | 3/2002 | Ruckley et al. .............. 709/250 |
| 6,385,602 B1 | 5/2002 | Tso et al. |
| 6,397,221 B1 | 5/2002 | Greef et al. |
| 6,418,429 B1 | 7/2002 | Borovoy et al. |
| 6,424,971 B1 | 7/2002 | Kreulen et al. |
| 6,424,983 B1 | 7/2002 | Schabes et al. |
| 6,429,984 B1 | 8/2002 | Alex |
| 6,446,068 B1 | 9/2002 | Kortge |
| 6,453,315 B1 | 9/2002 | Weissman et al. |
| 6,466,918 B1 | 10/2002 | Spiegel et al. |
| 6,480,843 B2 | 11/2002 | Li |
| 6,483,523 B1 | 11/2002 | Feng |
| 6,490,111 B1 | 12/2002 | Sacks |
| 6,505,197 B1 | 1/2003 | Sundaresan et al. |
| 6,519,618 B1 | 2/2003 | Snyder |
| 6,539,376 B1 | 3/2003 | Sundaresan et al. |
| 6,560,597 B1 | 5/2003 | Dhillon et al. |
| 6,563,521 B1 | 5/2003 | Perttunen |
| 6,571,282 B1 * | 5/2003 | Bowman-Amuah ......... 709/219 |
| 6,611,825 B1 | 8/2003 | Billheimer et al. |
| 6,618,697 B1 | 9/2003 | Kantrowitz et al. |
| 6,628,466 B2 | 9/2003 | Alex |
| 6,633,868 B1 | 10/2003 | Min et al. |
| 6,647,391 B1 | 11/2003 | Smith et al. |
| 6,651,058 B1 | 11/2003 | Sundaresan et al. |
| 6,697,801 B1 | 2/2004 | Eldredge et al. |
| 6,697,998 B1 | 2/2004 | Damerau et al. |
| 6,711,585 B1 | 3/2004 | Copperman et al. |
| 6,735,578 B2 | 5/2004 | Shetty et al. |
| 6,763,349 B1 | 7/2004 | Sacco |
| 6,763,351 B1 | 7/2004 | Subramaniam et al. |
| 6,778,995 B1 | 8/2004 | Gallivan |
| 6,845,354 B1 | 1/2005 | Kuo et al. |
| 6,853,982 B2 | 2/2005 | Smith et al. |
| 6,868,411 B2 | 3/2005 | Shanahan |
| 6,928,434 B1 | 8/2005 | Choi et al. |
| 6,947,930 B2 | 9/2005 | Anick et al. |
| 6,978,274 B1 | 12/2005 | Gallivan et al. |
| 7,035,864 B1 | 4/2006 | Ferrari et al. |
| 7,062,483 B2 | 6/2006 | Ferrari et al. |
| 7,072,902 B2 | 7/2006 | Kleinberger et al. |
| 7,085,771 B2 | 8/2006 | Chung et al. |

| | | | |
|---|---|---|---|
| 7,092,936 | B1 | 8/2006 | Alonso et al. |
| 7,093,200 | B2 | 8/2006 | Schreiber et al. |
| 7,099,885 | B2 | 8/2006 | Hellman et al. |
| 7,149,732 | B2 | 12/2006 | Wen et al. |
| 2001/0044758 | A1 | 11/2001 | Talib et al. |
| 2001/0044837 | A1 | 11/2001 | Talib et al. |
| 2001/0047353 | A1 | 11/2001 | Talib et al. |
| 2001/0049674 | A1 | 12/2001 | Talib et al. |
| 2001/0049677 | A1 | 12/2001 | Talib et al. |
| 2002/0051020 | A1 | 5/2002 | Ferrari et al. |
| 2002/0065857 | A1 | 5/2002 | Michalewicz et al. |
| 2002/0083039 | A1 | 6/2002 | Ferrari et al. |
| 2002/0091696 | A1 | 7/2002 | Craft et al. |
| 2002/0095405 | A1 | 7/2002 | Fujiwara |
| 2002/0099675 | A1 | 7/2002 | Agrafiotis et al. |
| 2002/0147703 | A1 | 10/2002 | Yu et al. |
| 2002/0152204 | A1 | 10/2002 | Ortega et al. |
| 2003/0101187 | A1 | 5/2003 | Gaussier et al. |
| 2003/0110181 | A1 | 6/2003 | Schuetze et al. |
| 2003/0120630 | A1 | 6/2003 | Tunkelang |
| 2004/0117366 | A1 | 6/2004 | Ferrari et al. |
| 2004/0205448 | A1 | 10/2004 | Grefenstette et al. |
| 2004/0243554 | A1 | 12/2004 | Broder et al. |
| 2004/0243557 | A1 | 12/2004 | Broder et al. |
| 2005/0022114 | A1 | 1/2005 | Shanahan et al. |
| 2005/0097088 | A1 | 5/2005 | Bennett et al. |
| 2005/0108212 | A1 | 5/2005 | Karimisetty et al. |
| 2006/0031215 | A1 | 2/2006 | Pong |

FOREIGN PATENT DOCUMENTS

| | | |
|---|---|---|
| EP | 0 597 630 A1 | 5/1994 |
| EP | 0676705 | 10/1995 |
| EP | 0 694 829 A1 | 1/1996 |
| EP | 0795833 | 9/1997 |
| EP | 0 827 063 A1 | 3/1998 |
| EP | 0918295 | 5/1999 |
| EP | 1 050 830 A2 | 11/2000 |
| EP | 0 694 829 B1 | 5/2002 |
| GB | 2293667 | 4/1996 |
| GB | 2297179 | 7/1996 |
| JP | 09034901 | 2/1997 |
| JP | 10134063 | 5/1998 |
| JP | 11250107 | 9/1999 |
| JP | 11296547 | 10/1999 |
| WO | 90/04231 | 4/1990 |
| WO | 96/27161 | 9/1996 |
| WO | 97/36251 | 10/1997 |
| WO | 98/20436 | 5/1998 |
| WO | WO 00/36529 | 6/2000 |
| WO | 01/67225 | 9/2001 |
| WO | WO 01/67300 | 9/2001 |
| WO | 02/097671 A2 | 12/2002 |
| WO | WO 03/027902 A1 | 4/2003 |

OTHER PUBLICATIONS

Pollitt, et al. "View-Based Searching Systems—Progress Towards Effective Disintermediation" *Online Information Meeting Proceedings*, (1996) pp. 433-445.
Hearst, et al. "Cat-A-Cone: An Interactive Interface for Specifying Searches and Viewing Retrieval Results using a Large Category Hierarchy." *Proceedings of the 20th Annual International ACM-SIGIR Conference on Research and Development in Information Retrieval*, (1997) pp. 246-255.
Agosti, M., et al., "Issues of Data Modelling in Information Retrieval," *Electronic Publishing*, vol. 4 (4) pp. 219-237 (1991).
Allen, R.B., "Two Digital Library Interfaces That Exploit Hierarchical Structure," *Electronic Publishing*, (1995).
Allen, R.B., "Retrieval From Facet Spaces," *Electronic Publishing*, vol. 8 (2&3), pp. 247-257 (1995).
Baeza-Yates, et al., "New Approaches to Information Management: Attribute-Centric Data Systems" *Proceedings Seventh International Symposium on String Processing and Information Retrieval*, pp. 17-27 (2000).
Hearst, M., et al., "Cat-a Cone: An Interactive Interface for Specifying Searches and Viewing Retrieval Results Using A Large Category Hierarchy," *Ann. Int. ACM-SIGIR Conf. On Res. And Dev. In Information Retrieval*, pp. 270-279 (1993).
Pedersen, G.S., "A Browser For Bibliographic Information Retrieval Based On An Application Of Lattice Theory," *Proc. of the Ann. Int. SCM SIGIR Conference on Res. And Dev. In Information Retrieval*, pp. 270-279 91993).
Pollitt, et al., "HIBROWSE For Bibliographic Databases," *Journal of Information Science*, vol. 20, (6), pp. 413-426 (1994).
Pollitt, et al., "View-Based Searching Systems- Progress Towards Effective Disintermediation," *onlilne Information Meeting Proceedings*, pp. 433-445 (1996).
Story, G. A., et al., "The RightPages Image-Based Electronic Library for Alerting and Browsing," *Computer*, vol. 25(9), pp. 17-25 (1992).
Yahoo!, Copyright 1999 Yahoo! Inc., <http://web.archive.org/web/19991116151212/http:www.yahoo.com/>.
PriceSCAN.com, Your Unbiased Guide to the Lowest Price on Books, Computers, Electronic . . . , Copyright 1997-1999, <http://web.archive.org/web/19991117123352/http://ww.pricescan.com/>, pp. 1-8.
Amato, et al., "Region proximity in metric spaces and its use for approximate similarity search", ACM Trans. In. System, (2003), vol. 21(2), pp. 192-227.
Bergstrom, "A family of delphi components for case-based reasoning", Proceedings 11th IEEE International Conference on Chicago, (1999), pp. 153-160.
Beyer et al., "When is 'Nearest Neighbor' meaningful", Proceedings of the 7th International Conference on Database Theory, (1999).
Diamantini et al., "A conceptual indexing method for content-based retrieval", Database and Expert Systems Applications. Proceedings Tenth Workshop on Florence Italy, (1999), pp. 192-197.
Guha et al., "ROCK: A robust clustering algorithm for catagorical attributes", Data Engineering Proceedings 15th International Conference on Sidney, (1999), pp. 512-521.
Guttman, "R-Trees: A dynamic index structure for spatial searching", Proceedings of the ACM SIG-MOD Conference, (1984).
Han-Joon, K. et al., "An effective document clustering method using user-adaptable distance metrics.", SAC, (2002), 16-20.
Hinneburg et al., "What is the nearest neighbor in high dimensional spaces", Proceedings of the 26th VLDB Conference, (2000).
Hongyan Jing, "Information retrieval based on context distance and morphology", Proceedings of the 22nd annual international ACM SIGIR conference on Research and Development in information retrieval, pp. 90-96, Aug. 1999.
Miller et al., "DataWeb: Customizable Database Publishing for the Web" IEEE Multimedia, 4(4):14-21(1997).
Miller et al., "Integrating Hierarchical Navigation and Querying: A User Customizable Solution" ACM Multimedia Workshop on Effective Abstractions in Multimedia Layout, Presentation, and Interaction, San Francisco, CA, Nov. (1995).
Pi-Sheng, "Using case-based reasoning for decision support", Proceedings of the 27th Annual Hawaii International Conference on System Sciences, (1994), pp. 552-561.
Salton et al., "Term-weighting approaches in automatic test retrieval", Information Processing & Management, (1988), vol. 24(5), pp. 513-523.
Shamos et al., "Closest-point problems", Proceedings of the 16th Annual Symposium on Foundations of Computer Science, IEEE (1975).
Yahoo 1996 (Exhibit 12-16).
Beaudoin et al., "Cheops: A Compact Explorer For Complex Hierarchies", IEEE, pp. 87-92 (1996).
Bird et al., "Content-Driven Navigation of Large Databases", The Institution of Electrical Engineers, 1996, pp. 13/1 - 13/5.

Chen et al., "Internet Browsing and Searching: User Evaluations of Category Map and Concept Space Techniques", Wiley InterScience: Journal:Abstract, Jan. 6, 1999.

Chen et al., "Internet Browsing and Searching: User Evaluations of Category Map and Concept Space Techniques", Journal of the American Society for Information Science, vol. 49, pp. 582-603 (1998).

Chen et al., "Online Query Refinement on Information Retrieval Systems" A Process Model of Searcher/System Interactions, MID Department, University of Arizona, pp. 115-133 (1990).

Cilibrasi, R. et al., "Automatic Meaning Discovery Using Google", 31 Pages, www.bsik-bricks.nl/events/ab/google_abstract.shtml, www. arxiv.org/abs/cs.CL0412098, (2004).

Ellis, GP et al., "Hibrowse for Hotels: bridging the gap between user and system views of a database", extracts from a paper giving an overview of the Hibrowse for Hotels application, http://web.archive.org/web/19991109234626/http://www.hud.ac.uk/schoo...4 pages.

European Search Authority, European Search Report for European Patent Application No. 01945997.3, dated May 23, 2007, 6 pages.

Fua et al., "Structure-Based Brushes: A Mechanism For Navigating Hierarchically Organized Data and Information Spaces", IEEE Transactions on Visualization and Computer Graphics, vol. 6, No. 2, pp. 150-159, Apr.-Jun. 2000.

Garcia-Molina et al., "The Query Compiler" Database System Implementation, 2000, Prentice hall, Upper Saddle River, NJ, USA, XP002423997, pp. 329-364.

Gil et al., "A Visual Interface and Navigator for the P/FDM Object Database", Department of Computing Science, University of Aberdeen, IEEE, pp. 54-63 (1999).

Han et al., "Join Index Hierarchy: An Indexing Structure For Efficient Navigation in Object-Oriented Databases", IEEE Transactions on Knowledge and Data Engineering, vol. 11, No. 2, pp. 321-337, Mar./Apr. 1999.

Hearst, M. et al., "Integrating Browsing & Search Relevance Feedback", SIMS 202, UC Berkeley, SIMS, Fall 1999, 2 pages.

Hearst, M. et al., "Using MetaData in Search: Combining Browsing and Search", 39 sides, http:///www2.sims.berkeley.edu/courses/ls202/f98/Lecture27/sld001.htm.

Hearst, M., "Chapter 10: User Interfaces and Visualization", Modem Information Retrieval, Yates and Ribeiro-Neto, (1999), pp. 257-340.

http://www.searchtools.com/tools/endeca.html, Search Tools Product Report, "Endeca Faceted Metadata Search and Browse", 2 pages, updated Jul. 10, 2003.

Hua et al., "Object Skeletons: An Efficient Navigation Structure for Object-Oriented Database Systems", IEEE, pp. 508-517 (1994).

International Searching Authority, International Search Report for PCT/US2006/043538, mailed Mar. 26, 2007, 12 pages.

Kummamuru et al., "A Hierarchical Monothetic Document Clustering Algorithm for Summarization and Browsing Search Results", WWW2004, pp. 658-665, May 17-22, 2004.

McEneaney, John E., "Visualizing and Assessing Navigation in Hypertext", Hypertext 99, Darmstadt Germany, pp. 61-70 (1999).

Miller, Renee J., "Using Schematically Heterogeneous Structures", Department of Computer and Information Science, Ohio State University, 1998, pg. 189-200.

Mills, J., "The Problem of arrangement in a Library", A Modern Outling of Library Classification, Chapman & Hall Ltd, pp. 1-8, 1960.

Pollitt A.S., "Intelligent Interfaces to online Databases", Expert Systems for Information Management, vol. 3, No. 1, pp. 49-69, 1990.

Pollitt et al., "Faceted-Classification as Pre-Coordinated Subject Indexing: Multi-Dimensional Searching for OPAC Users", Oslo College, May 6-7, 1998.

Pollitt et al., "MenUse for Medicine: End-User Browsing and Searching of Medline via the MeSH Thesaurus", Int. Forum Inf. and Docum., pp. 547-573, 1988.

Pollitt et al., "MenUse for Medicine: End-User Browsing and Searching of Medline via the MeSH Thesaurus", Int. Forum Inf. and Docum., vol. 13, No. 4, pp. 11-17, Oct. 1998.

Pollitt et al., "Multilingual access to document databases", CAIS/ACSI '93 Information as a Global Commodity - Communication, Processing and Use, Proceedings of the 21st Annual Conference of the Canadian Association for Information Science, pp. 128-140, Antigonish, Nova Scotia Canada, Jul. 1993.

Pollitt, A.S., "A rule-based system as an intermediary for searching cancer therapy literature on Medline", Intelligent Information Systems: Progress and Prospects, pp. 82-126, 1986.

Pollitt, A.S., "An Expert Systems Approach to Document Retrieval, A thesis submitted to the Council for National Academic Awards in partial fulfillment of the requirements for the degree Doctor of Philosophy", May 1986.

Pollitt, A.S., "Expert Systems and the Information Intermediary: Tackling Some of the Problems of Naive End-User Search Specification and Formulation" , Intelligent Information Systems for the Information Society, pp. 100-108, 1986.

Pollitt, A.S., Information Storage and Retrieval Systems, Origin, Development and Applications, Ellis Horwood Books in Information Technology, 1989.

Pollitt, A.S., "Reducing complextiy by rejecting the consultation model as a basis for the design of expert systems", Expert Systems, vol. 3, No. 4, pp. 234-238, Oct. 1986.

Pollitt, A.S., "Taking a different view", British Library research, Library Technology, vol. 1, Nov. 1, 1996.

Pollitt, A.S., "The key role of classification and indexing in view-based searching", Centre for Database Access Research, University of Huddersfield, UK, Abstract, 8 pages.

Pollitt, Example from EMBASE entitled "Screen Shots from View-based searching with Hibrowse", (1998).

Pollitt, excerpt from "Prospects for using Dewey Classification in a View-based Searching OPAC Dewey Decimel Classification: Possibilities in View-based Searching OPAC", (1998).

Pollitt, S., "CanSearch: An Expert Systems Approach to Document Retrieval", Information Processing & Management, vol. 23, No. 2, pp. 119-138, (1987).

Priss, U. et al., "Utilizing Faceted Structures for Information Systems Design", School of Library and Information Science, Indiana University Bloomington, pp. 1-12.

Ramaswami et al., "Navigating a Protection-Engineering Data Base", IEEE, pp. 27-32, Apr. 1989.

Screenshots from "View-based searching with hibrowse", http://www.jbi.hio.no/bibin/kurs/korg98/oslo2.ppt, 10 pages.

Treglown, M. et al., "Hibrowse for Bibliographic Databases: A study of the application of usability techniques in view-based searching", British Library Research and Innovation Report 52, The University of Huddersfield, Apr. 1997.

Tu et al., "Agent Technology for Website browsing and Navigation, Proceedings of the 32nd Hawaii International Conference on Systems Sciences", IEEE, pp. 1-10, 1999.

Turine et al., "A Navigation-Oriented Hypertext Model Based on Statecharts", Hypertext 97, Southampton UK, 1997.

Velez et al., "Fast and Effective Query Refinement", SIGIR 1997, pp. 6-15.

Weiland et al., "A graphical query interface based on aggregation/generalization hierarchies."Information systems, vol. 18, No. 4, pp. 215-232 (1993).

Xiong et al., "Taper: A Two-Step Approach for All-Strong-Pairs Correlation Query in Large Databases", IEEE Transactions on Knowledge and Data Engineering, vol. 18, No. 4, Apr. 2006, pp. 493-508.

Yoo et al., "Towards A Relationship Navigation Analysis, Proceedings of the 32nd Hawaii International Conference on System Sciences", IEEE, pp. 1-10, (2000).

Chen et al., "Object Signatures For Supporting Efficient Navigation In Object-Oriented Databases", Proceeding of the 32nd Hawaii International Conference on System Sciences, IEEE, pp. 502-507 (1997).

International Searching Authority, International Search Report for PCT/US03/31770, mailed Jun. 29, 2004.

Carey, M. et al., "Info Navigator: A Visualization Tool for Document Searching and Browsing, Proceedings International Conference Distributed Multimedia Systems", (DMS Sep. 2003) pp. 23-28.

* cited by examiner opti-wine.com                                              Keyword Search
                                                           [          ] Find

Begin Your Search...  /24   /44
                          Your Selection Contains   Displaying results 1-10  30
  22–Wine Types ▷       21044 Items...
  22–Appellations ▷–24  Page: 1 2 3 4 5 6 7 8 9 10 >>         Next >  ~41
    22–Wineries ▷–24 Chardonnay Monterey County      price: $13.00
                          Bold, rich and spicy, with layers of           score: 90-94  ~42
      22–Year ▷–24  complex pear, toast, honey and vanilla
  22–Special Designations ▷–24  flavors that are intense and concentrated,
                          with a long, full finish. Delicious now.
      22–Flavors ▷–24  (12000 cases produced)
  22–Price Range ▷–24 Chardonnay Monterey County       price: $15.00
                          A bold, ripe and full-bodied white from        score: 90-94  ~42
    22–Regions ▷–24  California that offers lots of rich pear,
22–Wine Spectator Rating ▷–24  spice, honey flavors, all presented with a
22–Body & Characteristics ▷–24  light shading of hazelnut. This has a sense
                          of elegance and grace that goes on
                          through the finish. (22000 cases
                          produced)

/20
                          Marinus Carmel Valley                         price: $30.00
                          Young, tight and well focused, with rich,     score: 90-94  ~42
                          complex flavors of spicy currant, cedar,
                          leather, anise and berry at the core, it
                          unfolds slowly to reveal some exotic spice
                          and mineral notes. Given the level of
                          intensity, it's best to cellar this one unt Sauvignon Blanc Monterey County              price: $10.00
                          Bright and pure, pouring out its generous    score: 90-94  ~42
                          pear, pineapple and citrus flavors. An
/10                       incredible value in a California white
                          that's fresh and lively through the long
                          finish. Delicious now. (2700 cases
                          produced)

Chardonnay Monterey County                   price: $17.00
                          A big, ripe Chardonnay, with an              score: 90-94  ~42
                          abundance of rich pear, citrus, oak and
                          spice notes. Turns smooth and spicy on
                          the finish, where the flavors fan out.
                          (14676 cases produced)

Sauvignon Blanc Monterey County              price: $12.00
                          Smooth, rich and buttery, a spicy wine       score: 90-94  ~42
                          with generous layers of pear, honey and
                          exotic tropical fruit character sneaking in
                          on the silky finish. Ready now. (2100
                          cases produced)

Chardonnay Monterey County                   price: $18.00
                          Distinct for its bright citrus, especially   score: 90-94  ~42
                          lemony, flavors, this well-crafted white
                          also offers touches of pear, spice, earth
                          and oak, holding its focus while gaining
                          nuances of oak and hazelnut.
                          Delicious.Drink now through 2001. (35500
                          cases produ Merlot Monterey                              price: $9.00
                          Ripe plum and black cherry here, with        score: 80-89  ~42
                          touches of charry oak and spice on the
                          finish.Drink now. (4500 cases produced)

Chardonnay Monterey County La                price: $14.00
                          Reina Vineyard                               score: 90-94  ~42
                          Rich in texture and full of fruit and butter
FIG. 1                flavors. The oak is evident, b ut there are
                          ample pear, apricot, butterscotch and
                          spice for complexity. We ll-rounded in the
                          mouth and well-balanced with acidity,
                          making the flavors vivid and the feel opti-wine.com Keyword Search Find

Begin Your Search...

Your Selection Contains 21044 Items...

Displaying results 1-10

22 – Wine Types ▷
22 – Appellations ▷
Wineries ▷
Year ▷
Special Designations ▷
Flavors ▷
Price Range ▷
22 – Regions ◁
Wine Spectator Rating ▷
Body & Characteristics ▷

Page: 1 2 3 4 5 6 7 8 9 10 >>

Next > — 41

Chardonnay Monterey County
Bold, rich and spicy, with layers of complex pear, toast, honey and vanilla flavors that are intense and concentrated, with a long, full finish. Delicious now. (12000 cases produced)

price: $13.00
score: 90-94 — 42

Chardonnay Monterey County
Argentine Regions
Australian Regions
Austrian Regions
Canadian Regions
Chilean Regions
Croatia
French Regions
German Regions
Greek Regions
Hungarian Regions bodied white from lots of rich pear, all presented with a nut. This has a sense e that goes on 2000 cases price: $15.00
score: 90-94 — 42 ey focused, with rich, icy currant, cedar, leather, anise and berry at the core, it unfolds slowly to reveal some exotic spice and mineral notes. Given the level of intensity, it's best to cellar this one unt price: $30.00
score: 90-94

Sauvignon Blanc Monterey County
Bright and pure, pouring out its generous pear, pineapple and citrus flavors. An incredible value in a California white that's fresh and lively through the long finish. Delicious now. (2700 cases produced)

price: $10.00
score: 90-94

Chardonnay Monterey County
A big, ripe Chardonnay, with an abundance of rich pear, citrus, oak and spice notes. Turns smooth and spicy on the finish, where the flavors fan out. (14676 cases produced)

price: $17.00
score: 90-94

Sauvignon Blanc Monterey County
Smooth, rich and buttery, a spicy wine with generous layers of pear, honey and exotic tropical fruit character sneaking in on the silky finish. Ready now. (2100 cases produced)

price: $12.00
score: 90-94

Chardonnay Monterey County
Distinct for its bright citrus, especially lemony, flavors, this well-crafted white also offers touches of pear, spice, earth and oak, holding its focus while gaining nuances of oak and hazelnut. Delicious.Drink now through 2001. (35500 cases produ price: $18.00
score: 90-94

Merlot Monterey
Ripe plum and black cherry here, with touches of charry oak and spice on the finish.Drink now. (4500 cases produced)

price: $9.00
score: 80-89

Chardonnay Monterey County La Reina Vineyard
Rich in texture and full of fruit and butter flavors. The oak is evident, b ut there are ample pear, apricot, butterscotch and spice for complexity. We ll-rounded in the mouth and well-balanced with acidity, making the flavors vivid and the feel price: $14.00
score: 90-94

FIG. 2 opti-wine.com  50

Current Selection...

☐ Flavors > ／ 52
／ Spice and Floral Flavors >
54 Pepper — 52
☐ Regions >  ／ 52
54 Portugese Regions

[ Remove Terms ] ～56

Narrow My Selection...

27 ／ Wine Types ▷ ～24
22 ／ Appellations ▷ ～24
Wineries ▷
Year ▷
Special Designations ▷  26
Price Range ▷ ／
23 ～ Portugese Regions ◁  | Central Portugal |
27 ／ Wine Spectator Rating ▷ | Other Portugese Region |
Body & Characteristics ▷  ＼28

／
20

Keyword Search
[          ] Find
＼
44                              Displaying results 1-10   30
／
Your Selection
Contains 12 Items...
Page: 1 2                                  Next >  ～41

Baga Bairrada Marques de         price: $12.00
Marialva Reserva                 score: 80-89  ～42
  Distinctive aromas and flavors of wild
  berries, black pepper and cardamom
  enliven this dry, tannic red, whose
  flavors linger on the finish. Drink now
  through 1999.

Dao Meia Encosta                 price: $7.00
  Highlights of red cherry and   score: 80-89 ～42
  raspberry are elegantly displayed,
  with lively acidity and a touch of black
  pepper on the finish. Drink now.
  (67000 cases produced)

Late Bottled Port                price: $18.00
  Earthy and spicy but a bit oxidized,  score: 80-89
  with pepper, leather and cedar
  character. Medium-bodied, sweet and
  juicy, with a nutty finish. Tastes older price: $26.00
                                 score: 90-94
  edos
  delicious.
  and fruity in
  smooth texture
  alcohol and young
  ish echoes black
  te. Tempting to
  itiness, but proba Vintage Port                     price: N/A
  A solid Graham, with lots of fruit and  score: 90-94
  spice on the nose. Full-bodied and
  medium sweet, with chewy tannins
  and a pepper and berry aftertaste.

Chardonnay Terras do Sado Cova   price: N/A
da Ursa                          score: 80-89
  Already mature-tasting, despite its
  youth, with butter and ripe apple
  flavors. Notes of white pepper on the
  finish. Drink now.

Late Bottled Port                price: $20.00
  Medium-bodied and very sweet, with  score: 80-89
  raisin and spice character and
  chocolate, pepper and sweet-and-
  sour flavors on the finish. Lacks a bit
  of freshness. Drink now.

Late Bottled Port                price: $20.00
  Intense aromas of black pepper and  score: 80-89
  raisin, but then a slight letdown.
  Medium-bodied and medium sweet,
  with soft tannins and a light, slightly
  alcoholic finish. Drink now. (1215
  cases produced)

Late Bottled Port                price: $17.00
  Pretty cherry and floral aromas, with  score: 80-89
  a hint of pepper. Of medium body
  and sweetness, with an earthy,
  slightly nutty finish. Drink now.

Vintage Port                     price: $250.00
  Another Port shipper once mistook  score: 95-100
  this extraordinary wine for one 15
  years older. (2215 cases produced)

FIG. 4 opti-wine.com  50

Current Selection...

📂 Flavors > /52
54 Wood and Nut Flavors

[ Remove Terms ] —56

Narrow My Selection...

22—Wine Types ▷~24
22—Appellations ▷~24
　　　Wineries ▷
　　　　　Year ▷
Special Designations ▷
Wood and Nut Flavors ◁
　　　Price Range ▷
23
　　　　Regions ▷
Wine Spectator Rating ▷
Body & Characteristics ▷
　　　　　　　26—Oak
　　　　　　28—Pine
　　　　　　28—Resinous

44
/
Your Selection Contains 5438 Items...
Page: 1 2 3 4 5 6 7 8 9 10 >>

Displaying results 1-10

Chardonnay Monterey County
Bold, rich and spicy, with layers of complex pear, toast, honey and vanilla flavors that are intense and concentrated, with a long, full finish. Delicious now. (12000 cases produced)

Chardonnay Monterey County
A bold, ripe and full-bodied white from California that offers lots of rich pear, spice, honey flavors, all presented with a light shading of hazelnut. This

| Almond |
| Burnt |
| Cedar |
| Coffee |
| Hazelnut |
| Leafy |
| Nutty |
| Oak |
| Pine |
| Resinous | sense of elegance and grace goes on through the finish. 00 cases produced)

us Carmel Valley
g, tight and well focused, with complex flavors of spicy currant, leather, anise and berry at the it unfolds slowly to reveal some spice and mineral notes. Given vel of intensity, it's best to cellar this one unt Chardonnay Monterey County
Distinct for its bright citrus, especially lemony, flavors, this well-crafted white also offers touches of pear, spice, earth and oak, holding its focus while gaining nuances of oak and hazelnut. Delicious.Drink now through 2001. (35500 cases produ Chardonnay Santa Cruz Mountains Special Reserve Vineyards Spring Ridge Vineyard
Smooth, rich and creamy, with an alluring, substantial core of pear, spice, honey and vanilla. Altogether impressive for its complexity and finesse. (400 cases produced)

Chardonnay Santa Cruz Mountains
Displays wonderful aromas and rich, complex flavors, serving up a mouthful of creamy pear, smoke, fig and melon, adding a dash of hazelnut and spice. Finishes with a long, zesty aftertaste. (600 cases produced)

Chardonnay Santa Cruz Mountains Dirk Vineyard Special Reserve Vineyards
Smooth and polished, with a creamy core of ripe pear, apple, spice and hazelnut flavors that stay lively through the finish, where the hazelnut and anise become more pronounced. (300 cases produced)

Chardonnay Santa Cruz Mountains Bald Mountain Vineyard Special Reserve Vineyards
Smooth, ripe, rich and creamy, with clearly focused, pear, anise, butter Keyword Search
[        ] Find
30

Next >  41 price: $13.00
score: 90-94  42 price: $15.00
score: 90-94  42 price: $30.00
score: 90-94 price: $18.00
score: 90-94 price: $23.00
score: 90-94 price: $20.00
score: 90-94 price: $24.00
score: 90-94 price: $24.00
score: 90-94 opti-wine.com

Current Selection...

- Flavors >
  - Spice and Floral Flavors >
    - Pepper
- Regions >
  - Portugese Regions >
    - Central Portugal

[ Remove Terms ]

Narrow My Selection...

- Appellations ▷
- Wineries ▷
- Year ▷
- Special Designations ▷
- Price Range ▷

Your Selection Contains 3 Items...

Page: 1

Keyword Search [ ] Find

Displaying results 1-3

Baga Bairrada Marques de Marialva Reserva — price: $12.00, score: 80-89
Distinctive aromas and flavors of wild berries, black pepper and cardamom enliven this dry, tannic red, whose flavors linger on the finish. Drink now through 1999.

Dao Meia Encosta — price: $7.00, score: 80-89
Highlights of red cherry and raspberry are elegantly displayed, with lively acidity and a touch of black pepper on the finish. Drink now. (67000 cases produced)

Dao Reserva — price: $12.00, score: 80-89
A juicy red, on the light side, with plenty of appealing berry and currant flavors. Finishes with some pepper and leather notes. Drink now.

△ Other Characteristics That These Items Have In Common

| Wine Types: Appellational Wines |
| Wine Spectator Rating: 80-89 |

FIG. 6 opti-wine.com                                                Keyword Search

44                                    [        ] Find
Begin Your Search... 24    Your Selection                                  30
                           Contains 2337    Displaying results 1-10
    22 — Wine Types    ▷   Items...      28
    22 — Appellations ◁ | Adelaide Hills              |    Next >    — 41
              Wineries ▷ | Alexander Valley — 29      |
                         | Alicante — 28              | ice: $3.00
                  Year ▷ | Alsace                     | core: N/A  — 42
                         | Alsace Grand Cru — 28      |
   Special Designations ▷| Amarone della Valpolicella— 28 |
                         | Anderson Valley — 28       | e: $15.00
               Flavors ▷ | Arroyo Grande Valley— 28   | re: 90-94  — 42
                         | Arroyo Seco — 28           |
    Price Range (Wine) ▷ | Arzig — 28                 |

Regions ▷     Cabernet Sauvignon Napa    price: $105.00
   Wine Spectator Range ▷ 26 Valley                      score: 90-94
                             Awkward in aroma when
   Body & Characteristics ▷  first poured, but it has
                             plenty of vigor in the firm
       /                     tannins and deep flavors of
      20                     cherry, tomato and spice.
                             By the end of the tasting, it
                             had blossomed into a well-
                             aged, harmonious wine.
                             Drink now.--Chappellet
                             Cabernet vertical.

/                      Zinfandel Paso Robles Dusl   price: $9.00
     10                      Ranch                        score: N/A
                             (No Description Available)

Cabernet Sauvignon Napa      price: $95.00
                             Valley                       score: 90-94  — 42
                             An outstanding wine from
                             a great vintage for
                             California Cabernet. A big
                             bouquet of meaty, herbal,
                             toasty aromas gives way to
                             lively fruit flavors and a
                             firm, fresh texture. Drink
                             now through 1996.--
                             Chappellet Cabernet
                             vertical.

Petite Sirah Napa Valley     price: N/A
                             (No Description Available)   score: 90-94

Cabernet Sauvignon Napa      price: N/A
                             Valley Red Rock Terrace      score: 90-94
                             Very complex, with a broad
                             range of earthy currant,
                             plum, berry, sage and
                             spice flavors. Long,
                             intricate, lingering
                             aftertaste.--Diamond Creek
                             vertical.

Cabernet Sauvignon Napa      price: N/A
                             Valley Volcanic Hill         score: 80-89
                             Austere, with a thin band
                             of mature Cabernet
                             flavors. Less complex,
   FIG. 7                    flavorful and interesting
                             than the 1972.--Diamond
                             Creek vertical.

FIG. 12 opti-wine.com

Keyword Search

[          ] Find

30

Return to Browsing

Chardonnay Monterey County

70

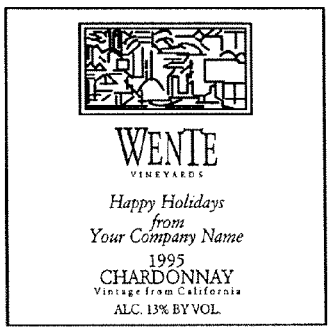

A bold, ripe and full-bodied white from California that offers lots of rich pear, spice, honey flavors, all presented with a light shading of hazelnut. This has a sense of elegance and grace that goes on through the finish. (22000 cases produced)

72

| | |
|---|---|
| Wine Types | ☐ Chardonnay — 74 |
| Wineries | ☐ Bernardus — 74 |
| Year | ☐ 1994 |
| Flavors | ☐ Hazelnut, ☐ Spice |
| Price Range | ☐ $10-$15 |
| Regions | ☐ US Regions |
| Wine Spectator Rating | ☐ 90-94 |

The characteristics above have been used to describe this bottle of wine. Select any combination of different characteristics to see similar bottles of wine...

10

[ Build My Store ]

FIG. 13

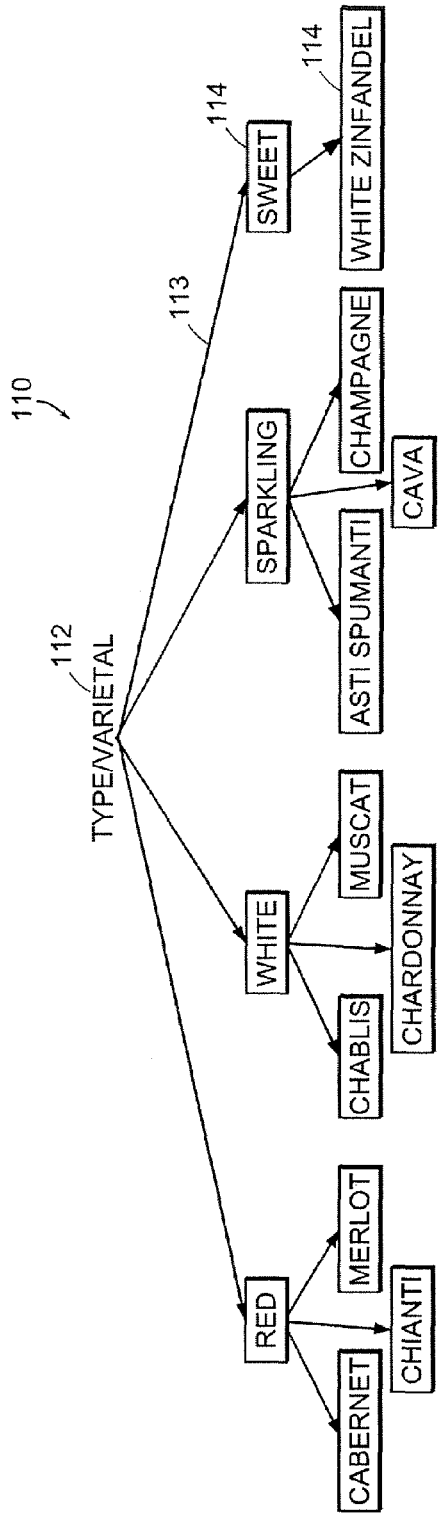
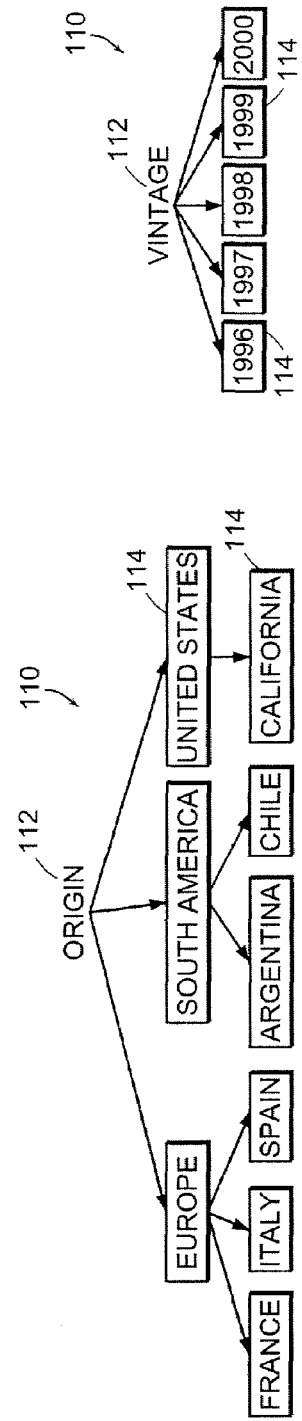
FIG. 14A
FIG. 14B
FIG. 14C

| Doc# | Text Description | Terms |
|---|---|---|
| 1 | Trapiche (award-winning Argentine wine) | Merlot, Argentina, 1998 |
| 2 | Bully Hill (New York's best) | Chardonnay, United States, 1999 |
| 3 | Martini & Rossi Asti Spumante | Asti Spumante, Italy |
| 4 | Gato Negro ("black cat") | Red, Chile |
| 5 | Gato Blanco ("white cat") | White, Chile |
| 6 | Chianti "Classico Riserva" Piccini | Chianti, Italy, 1997 |
| 7 | Gekeikan USA domestic sake | Sweet, California |
| 8 | Camernet (Cabernet Franc) | Cabernet, France, 1996 |
| 9 | Carlo Rossi Chablis (4 L) | Chablis, California |
| 10 | Freixenet Cordon Negro (gift box) | Cava, Spain |
| 11 | George DuBoeuf Beaujolais Nouveaux | Red, France, 2000 |

ENDECA // FINANCE // MUTUAL FUNDS
DEMO

POWER SEARCH

Results: 1-10 out of 248 mutual funds

Fund Type
Investment Objective
Fund Family
○ Fidelity Investments
○ Vanguard Group
Performance
Overall Rating
Expense Ratio
Net Assets
Manager Tenure
Turnover Ratio
Risk Measures
>>RESET POWER SEARCH Featured Top 10 Holdings
for Current Result Set
Cisco Sys
Intel
General Elec
Citigroup
Microsoft
Pfizer
ExxonMobil
Oracle
Wal-Mart Stores
IBM Pages: 1 2 3 4 5 6 7 8 9 10 >>

| Symbol Name | YTD | 1 yr | 3 yr | 5 yr | Net Assets | Exp Ratio |
|---|---|---|---|---|---|---|
| FFIDX Fidelity | -2.82 | 12.02 | 19.10 | 21.74 | $18,983M | 0.55% |
| FDEGX Fidelity Aggressive Growth | -10.48 | 19.09 | 38.83 | 27.47 | $21,359M | 0.97% |
| FIVFX Fidelity Aggressive Intl | -25.75 | -4.66 | 9.61 | 10.32 | $586M | 1.14% |
| FASMX Fidelity Asset Manager | 5.54 | 14.10 | 13.41 | 14.62 | $13,581M | 0.73% |
| FAMRX Fidelity Asset Manager: Aggressive | 23.64 | 42.03 | : | : | $564M | 1.20% |
| VFINX Vanguard 500 Index | -1.78 | 6.20 | 17.63 | 21.64 | $104,792M | 0.13% |
| VAITX Vanguard Admiral Interm-Term Treasury | 9.14 | 8.09 | 5.78 | 6.06 | $1,326M | 0.15% |
| VALGX Vanguard Admiral Long -Term Treasury | 13.53 | 11.06 | 6.58 | 6.84 | $431M | 0.15% |
| VASTX Vanguard Admiral Short-Term Treasury | 6.26 | 6.40 | 5.49 | 5.70 | $1,056M | 0.15% |
| VAAPX Vanguard Asset Allocation | 6.82 | 8.61 | 13.92 | 17.02 | $8,761M | 0.40% |

NEXT 10 FUNDS>>

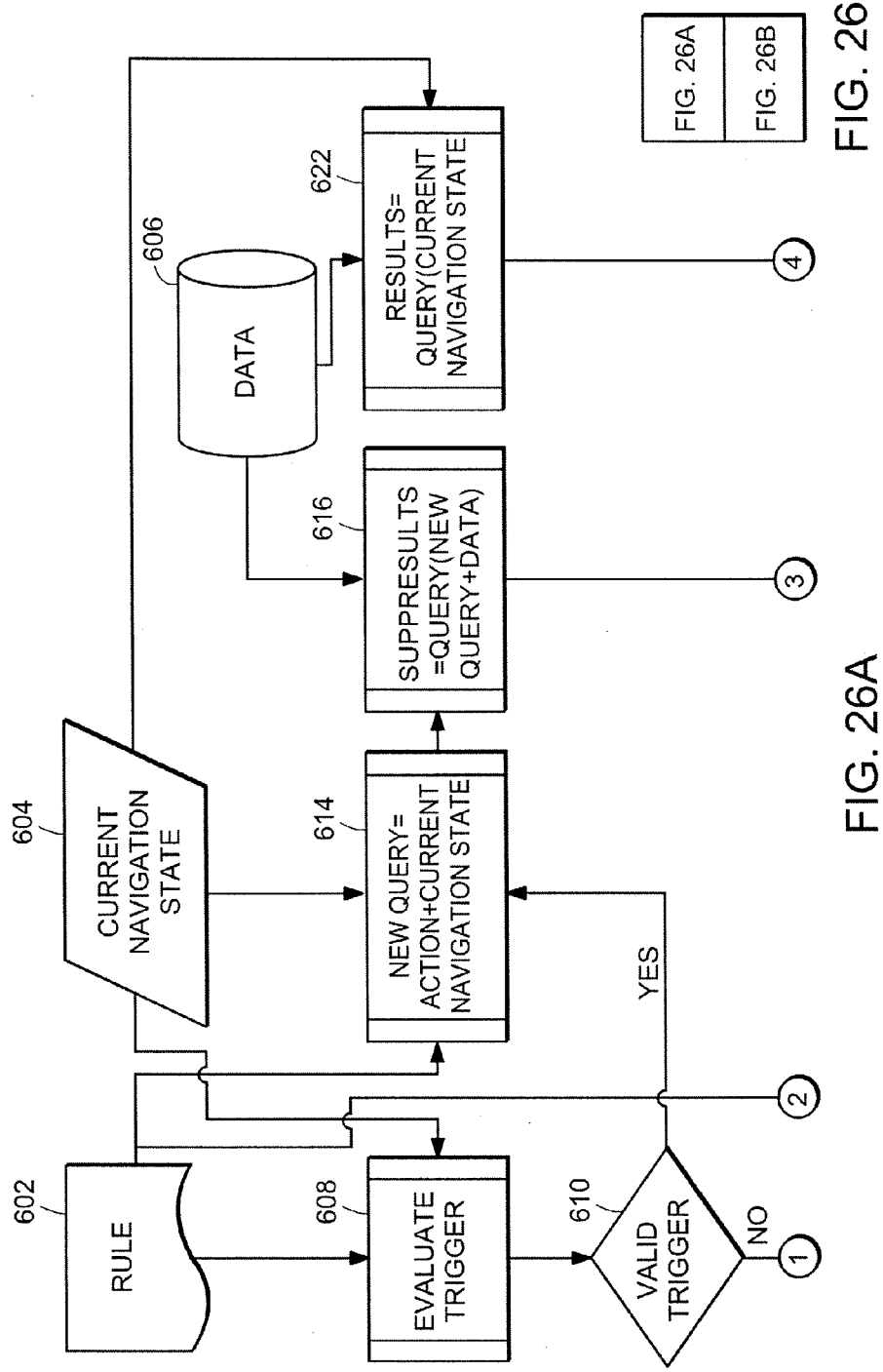

ENDECA // E-COMMERCE// *Wine directory*

Keyword Search

Narrow Current Selection by...

Red Wines
Appelational Red, Red Wines Other, Caberne Sauvignon, Merlot, More...

Flavors
Fruit Flavors, Other Flavors, Plant Flavors, Spice and Floral Flavors, More...

Country
United States, France, Italy, Australia, More...

Price Range
Below $10, $10-$15, $15-$20, $20-$40, More...

Wineries
United States Wineries, French Wineries, Italian Wineries, Australian Wineries, More...

Rating
100-95, 94-90, 89-80, 79-70, More...

Year
2000, 1999, 1998, 1997, More...

Body & Characteristics
Tannins Types, Ripe, Long and Full, Firm, More...

Special Designations
Auslese, Barrel Fermented, Beerenauslese, Best Buy, More...

Drinkability
Drink Now, Drink or Hold, Hold, Past Prime

Red Wines  >> Reset all

652 — Expand Your Horizons, Try a White Wine!

Gunderioch, Riesling Trockenbeerenhauslese Rheinhessen Nackenheim Rothenberg 1996
654 — Phenomenal German elixir. As thick as maple syrup with mind blowing sweetness and richness.

Domaine Leflaive, Chevalier-Montrachet 1995
Wine of the vintage. Ultra refined and sweet tasting elegant and amazingly seamless this 95 white

Joseph Drouhin, Montrachet Marquis de Laguiche 1985

Chateau Petrus, Pamerol 1945
Release Price N/A Rating 100 Date Reviewed: 02/15/91
I have only tasted a handful of wines as ripe and magnificent as this. It is so thick you can almost spread it with a knife: with wonderful chocolate, berry, earth and violet flavors. Drink now.-Petrus vertical.

Paul Jaboulet Aine, Hermitage La Chapelle 1961
Release Price N/A Rating 100 Date Reviewed: 02/15/91
Always 100 points, still 100 points. From a vintage with a minuscule crop and great summer weather through the end of the harvest. Dark at the core, it lightens at the edge to the color of prune juice. Full-bodied, it lays thick on the palate, with loads of ripe berry, plum, mineral and game layers intense and harmonious. Should hold for years. La Chapelle vertical. Drink now through 2025

| Rule # | Rule Condition | Trigger Predicate | Action(s) |
|---|---|---|---|
| 1 | TRUE | TRUE | Include_Navigation_State(N AND Rating: 96-100); X:=X+1 |
| 2 | X<3 | Query.GetValue(Type/Varietal)=Champagne | Include_Document(Dom Perignon 1972); X:=X+1; Y=TRUE |
| 3 | X<3 AND Y ==FALSE | TRUE | Include_Document(Beaujoulais Nouveau 2002); X:=X+1 |
| 4 | TRUE | Query.ContainsKeyword("cheap") | Sort_Results(Price) |
| 5 | X<3 | Query.GetValue(Type/Varietal).IsDescendantOf(Red) | Include_Navigation_State(Type/Varietal:White); X:=X+1 |
| 6 | X<3 | Query.GetValue(Type/Varietal).IsDescendantOf(White) | Include_Navigation_State(Type/Varietal:Red); X:=X+1 |
| 7 | X<3 | Query.GetValue(Region)=Chile | Include_Navigation_State(N OR Region: Argentina); X:=X+1 |

FIG. 30

SYSTEM AND METHOD FOR MANIPULATING CONTENT IN A HIERARCHICAL DATA-DRIVEN SEARCH AND NAVIGATION SYSTEM

This application is a continuation-in-part of application Ser. No. 09/998,682 entitled "Hierarchical Data-Driven Search and Navigation System and Method for Information Retrieval," filed Oct. 31, 2001, which is a continuation-in-part of application Ser. No. 09/961,131, entitled "Scalable Hierarchical Navigation System and Method for Information Retrieval," filed Sep. 21, 2001, which is a continuation-in-part of application Ser. No. 09/573,305, entitled "Hierarchical Data-Driven Navigation System and Method for Information Retrieval," filed May 18, 2000, which are incorporated herein by this reference.

1. FIELD OF THE INVENTION

The present invention generally relates to information search and navigation systems.

2. BACKGROUND OF THE INVENTION

Information retrieval from a database of information is an increasingly challenging problem, particularly on the World Wide Web (WWW), as increased computing power and networking infrastructure allow the aggregation of large amounts of information and widespread access to that information. A goal of the information retrieval process is to allow the identification of materials of interest to users. The information provider, user, or a third party may also desire to supplement or otherwise manipulate the content presented to the user.

As the number of materials that users may search and navigate increases, identifying relevant materials becomes increasingly important, but also increasingly difficult. Challenges posed by the information retrieval process include providing an intuitive, flexible user interface and completely and accurately identifying materials relevant to the user's needs within a reasonable amount of time. Another challenge is to provide an implementation of this user interface that is highly scalable, so that it can readily be applied to the increasing amounts of information and demands to access that information. The information retrieval process comprehends two interrelated technical aspects, namely, information organization and access.

As the number of materials that users may search and navigate increases, manipulating content presentation also becomes more difficult. It becomes impractical to manipulate content by manually designing every possible view of the material presented to the users as they maneuver through the information retrieval process. In order to perform this design process efficiently, there is a need for a system that allows a party, such as the information provider, to specify what content is presented to users in response to a query, as well as how that content is presented with more flexibility.

Current information search and navigation systems usually follow one of three paradigms. One type of information search and navigation system employs a database query system. In a typical database query system, a user formulates a structured query by specifying values for fixed data fields, and the system enumerates the documents whose data fields contain those values. PriceSCAN.com uses such an interface, for example. Generally, a database query system presents users with a form-based interface, converts the form input into a query in a formal database language, such as SQL, and then executes the query on a relational database management system. Disadvantages of typical query-based systems include that they allow users to make queries that return no documents and that they offer query modification options that lead only to further restriction of the result set (the documents that correspond to the user's specifications), rather than to expansion or extension of the result set. In addition, database query systems typically exhibit poor performance for large data sets or heavy access loads; they are often optimized for processing transactions rather than queries.

A second type of information search and navigation system is a free-text search engine. In a typical free-text search engine, the user enters an arbitrary text string, often in the form of a Boolean expression, and the system responds by enumerating the documents that contain matching text. Google.com, for example, includes a free-text search engine. Generally a free-text search engine presents users with a search form, often a single line, and processes queries using a precomputed index. Generally this index associates each document with a large portion of the words contained in that document, without substantive consideration of the document's content. Accordingly, the result set is often a voluminous, disorganized list that mixes relevant and irrelevant documents. Although variations have been developed that attempt to determine the objective of the user's query and to provide relevance rankings to the result set or to otherwise narrow or organize the result set, these systems are limited and unreliable in achieving these objectives.

A third type of information search and navigation system is a tree-based directory. In a tree-based directory, the user generally starts at the root node of the tree and specifies a query by successively selecting refining branches that lead to other nodes in the tree. Shopping.yahoo.com uses a tree-based directory, for example. In a typical implementation, the hard-coded tree is stored in a data structure, and the same or another data structure maps documents to the node or nodes of the tree where they are located. A particular document is typically accessible from only one or, at most, a few, paths through the tree. The collection of navigation states is relatively static—while documents are commonly added to nodes in the directory, the structure of the directory typically remains the same. In a pure tree-based directory, the directory nodes are arranged such that there is a single root node from which all users start, and every other directory node can only be reached via a unique sequence of branches that the user selects from the root node. Such a directory imposes the limitation that the branches of the tree must be navigationally disjoint—even though the way that documents are assigned to the disjoint branches may not be intuitive to users. It is possible to address this rigidity by adding additional links to convert the tree to a directed acyclic graph. Updating the directory structure remains a difficult task, and leaf nodes are especially prone to end up with large numbers of corresponding documents.

In all of these types of search and navigation systems, it may be difficult for a user to revise a query effectively after viewing its result set. In a database query system, users can add or remove terms from the query, but it is generally difficult for users to avoid underspecified queries (i.e. too many results) or overspecified queries (i.e. no results). The same problem arises in free-text search engines. In tree-based directories, the only means for users to revise a query is either to narrow it by selecting a branch or to generalize it by backing up to a previous branch.

Having an effective means of revising queries is useful in part because users often do not know exactly what they are looking for. Even users who do know what they are looking for may not be able to express their criteria precisely. And the state of the art in information retrieval technology cannot guarantee that even a precisely stated query will be interpreted as intended by the user. Indeed, it is unlikely that a perfect means for formation of a query even exists in theory. As a result, it is helpful that the information retrieval process be a dialogue with interactive responses between the user and the information retrieval system. This dialogue model may be more effectively implemented with an effective query revision process.

Some information retrieval systems combine a search engine with a vocabulary of words or phrases used to classify documents. These systems enable a three-step process for information retrieval. In the first step, a user enters a text query into a search form, to which the system responds with a list of matching vocabulary terms. In the second step, the user selects from this list, to which the system responds with a list of documents. Finally, in the third step, the user selects a document.

A problem with such systems is that they typically do not consider the possibility that a user's search query may match a conjunction of two or more vocabulary terms, rather than an individual term. For example, in a system whose vocabulary consists of consumer electronics products and manufacturers, a search for Sony DVD players corresponds to a conjunction of two vocabulary terms: Sony and DVD players. Some systems may address this problem by expanding their vocabularies to include vocabulary terms that incorporate compound concepts (e.g., all valid combinations of manufacturers and products), but such an exhaustive approach is not practical when there are a large number of independent concepts in a system, such as product type, manufacturer, price, condition, etc. Such systems also may fail to return concise, usable search results, partially because the number of compound concepts becomes unmanageable. For example, a search for software in the Yahoo category directory returns 477 results, most of which represent compound concepts (e.g., Health Care>Software).

Another disadvantage of current search and navigation systems is that available techniques for manipulating the content to be displayed have limited flexibility. For example, in some cases, in addition to providing a user with query results, the information provider finds it desirable to supplement those results with additional information or sort or aggregate the results according to criteria that depend on the query or the user. Often, the information provider finds it desirable to guide users in particular directions.—in some cases, this objective may be tied primarily to the interests of users (e.g., viewing popular content); in other cases, this objective may be tied primarily to the interests of the information provider (e.g., displaying sponsored content). Current information search and navigation systems usually follow one of four approaches for providing this function.

One approach is to associate supplemental content with individual materials. For example, an online DVD retailer might associate with a given DVD other DVDs likely to appeal to users who are interested in that given DVD. These other DVDs can then be displayed whenever the given DVD is displayed. These other DVDs might be determined through an editorial process or using an automated procedure like collaborative filtering.

A second approach is to associate content with search key words. For example, some search engines auction keywords to advertisers and then show advertisements to users based on their search key words.

A third approach is to custom-design content for particular queries. For example, in a tree-based directory, each directory node could include supplemental content relevant to that node.

A fourth approach is to provide customized content based on the user's profile or history. For example, some online shopping sites remember what product a user has purchased or viewed and use this information in order to merchandise other products.

These approaches suffer from various limitations. Associating content with individual materials or search key words is a cumbersome approach when the goal is to associate content with general classes of materials, e.g., recent documents or documents with a particular classification. Custom-designing content for particular queries is only practical when the number of such queries is small. Pushing content based on a user profile raises numerous issues, among them accuracy, scalability, and privacy. Various other systems for information retrieval are also available. For example. U.S. Pat. Nos. 5,715,444 and 5,983,219 to Danish et al., both entitled "Method and System for Executing a Guided Parametric Search," disclose an interface for identifying a single item from a family of items. The interface provides users with a set of lists of features present in the family of items and identifies items that satisfy selected features. Other search and navigation systems include i411's Discovery Engine, Cybrant's Information Engine, Mercado's IntuiFind, and Requisite Technology's BugsEye.

3. SUMMARY OF THE INVENTION

One aspect of the invention is a system and method that allows an information provider, user, or third party to use rules to manipulate content presentation in a search and navigation system. The invention can be used in conjunction with a highly scalable, hierarchical, data-driven information search and navigation system and method enables the search and navigation of a collection of documents or other materials using certain common attributes associated with those materials. In some search and navigation systems, the search interface allows the user to enter queries that may correspond to either single terms or combinations of terms from a vocabulary used to classify documents. The navigation interface allows the user to select values for the attributes associated with the materials in the current navigation state and returns the materials that correspond to the user's selections. In some search and navigation systems, the user's selections may be combined using Boolean operators. A search and navigation system may enable this navigation mode by associating terms (attribute-value pairs) with the documents, defining a set of hierarchical refinement relationships (i.e., a partial order) among the terms, and providing a guided navigation mechanism based on the association of terms with documents and the relationships among the terms. In some embodiments, the materials returned to the user and the format of the display are manipulated using a rules engine. The rules engine allows the information provider, user, or third party to implement rules that supplement, annotate, or otherwise manipulate query results based on a user's query and current navigation state.

Although the invention is described herein primarily with reference to a particular WWW-based system for searching and navigating a product database, it should be understood that a similar rules engine could be employed in any database context where materials may be associated with terms and users can identify materials of interest by way of those terms.

The present invention can be used in conjunction with a search and navigation system that uses a knowledge base of information regarding the collection of materials to formulate and to adapt the interface to guide the user through the collection of navigation states by providing relevant navigation options. The knowledge base includes an enumeration of attributes relevant to the materials, a range of values for each attribute, and a representation of the partial order that relates terms (the attribute-value pairs). Attribute-value pairs for materials relating to entertainment, for example, may be Products: Movies and Director: Spike Lee. (Attribute-value pairs are represented throughout this specification in this Attribute: Value format; navigation states are represented as bracketed expressions of attribute-value pairs.) The knowledge base also includes a classification mapping that associates each item in the collection of materials with a set of terms that characterize that item.

Some search and navigation systems with which the present invention can be used include a user interface for searching. This interface allows users to use a free-text search to find terms of interest. A free-text query may be composed of one or more words. The system may interpret free-text queries in various ways; the interpretations used to execute a free-text query will determine the nature of the search results for that query. A single-term interpretation maps the complete query to an individual term in the knowledge base. A multi-term interpretation maps the query to a conjunction of two or more terms in the knowledge base—that is, a plurality of terms that corresponds to a conjunctive navigation state. Depending on the particular implementation and application context, a free-text query may be mapped to one or more single-term interpretations, one or more multi-term interpretations, or a combination of both. In some search and navigation systems, the user interface allows users to use a free-text search either merely to find matching terms or further to find navigation states or materials associated with the matching terms.

The present invention may also be used in conjunction with a search and navigation system that also includes a user interface for navigation. In some systems, the user interface presents the user's navigation state as an expression of terms organized by attribute. For a given expression of terms, the user interface presents materials that are associated with those terms in accordance with that expression and presents relevant navigation options for narrowing or for generalizing the navigation state. Users navigate through the collection of materials by selecting and deselecting terms.

The present invention may be used in conjunction with search and navigation systems in which the user interface presents users with context-dependent navigation options for modifying the navigation state. In some systems, the user interface does not present the user with options whose selection would correspond to no documents in the resulting navigation state. Also, the user interface presents new navigation options as they become relevant. The knowledge base of such a system may contain rules that determine when particular attributes or terms are made available to users for navigation.

One aspect of the invention is a rules engine that allows the information provider, user, or third party to specify rules that manipulate content presentation. Each rule is composed of a trigger and one or more actions. The trigger is generally evaluated using information about a query. In certain embodiments, the trigger is explicitly or implicitly defined using one or more attribute-value pairs, which in some cases are related as expressions of attribute-value pairs, or represent navigation states, that activate the rule. In some embodiments, a trigger may also be defined in terms of keywords, or a combination of keywords and attribute-value pairs.

In another aspect of the invention, an action specifies how the system provides supplemental content, annotates content, or otherwise manipulates the content presentation when the rule is activated. In some embodiments, an action can be dependent on information about a query. In some embodiments, an action can be defined in terms of a navigation state.

In some embodiments, a script determines how the rules are processed. The information provider, user, or third party builds a script that combines the selected rules using sequential, conditional, or randomized logic. The rules engine can process the script when appropriate, e.g., in response to each query, to manipulate the content displayed to the user according to the rules, the user's query and present navigation state.

4. BRIEF DESCRIPTION OF THE DRAWINGS

The invention, including these and other features thereof, may be more fully understood from the following description and accompanying drawings, in which:

FIG. 1 is a view of a user interface to a search and navigation system.

FIG. 2 is a view of the user interface of FIG. 1, showing a drop-down pick list of navigable terms.

FIG. 4 is a view of the user interface of FIG. 1, showing a navigation state.

FIG. 5 is a view of the user interface of FIG. 1, showing a navigation state.

FIG. 6 is a view of the user interface of FIG. 1, showing a navigation state.

FIG. 7 is a view of the user interface of FIG. 1, showing a navigation state.

FIG. 12 is a view of a user interface, showing the result of a free-text search.

FIG. 13 is a view of a user, showing information about a particular document.

FIGS. 14A-C are representative examples of how the range of values for an attribute could be partially ordered.

Figure 15:
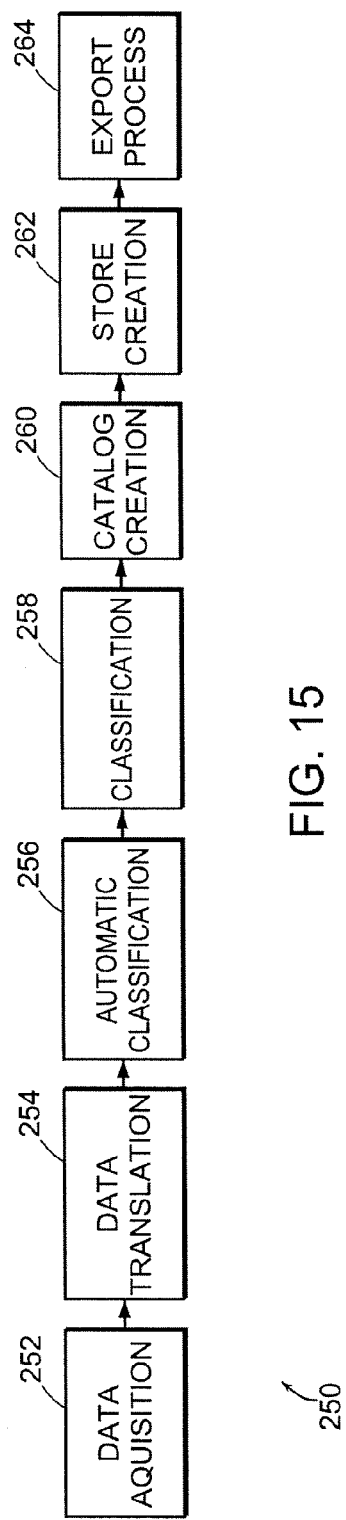

FIG. 15 is a block diagram of a process for collecting and classifying documents.

FIG. 16 is a table illustrating how a set of documents may be classified.

Figure 17:
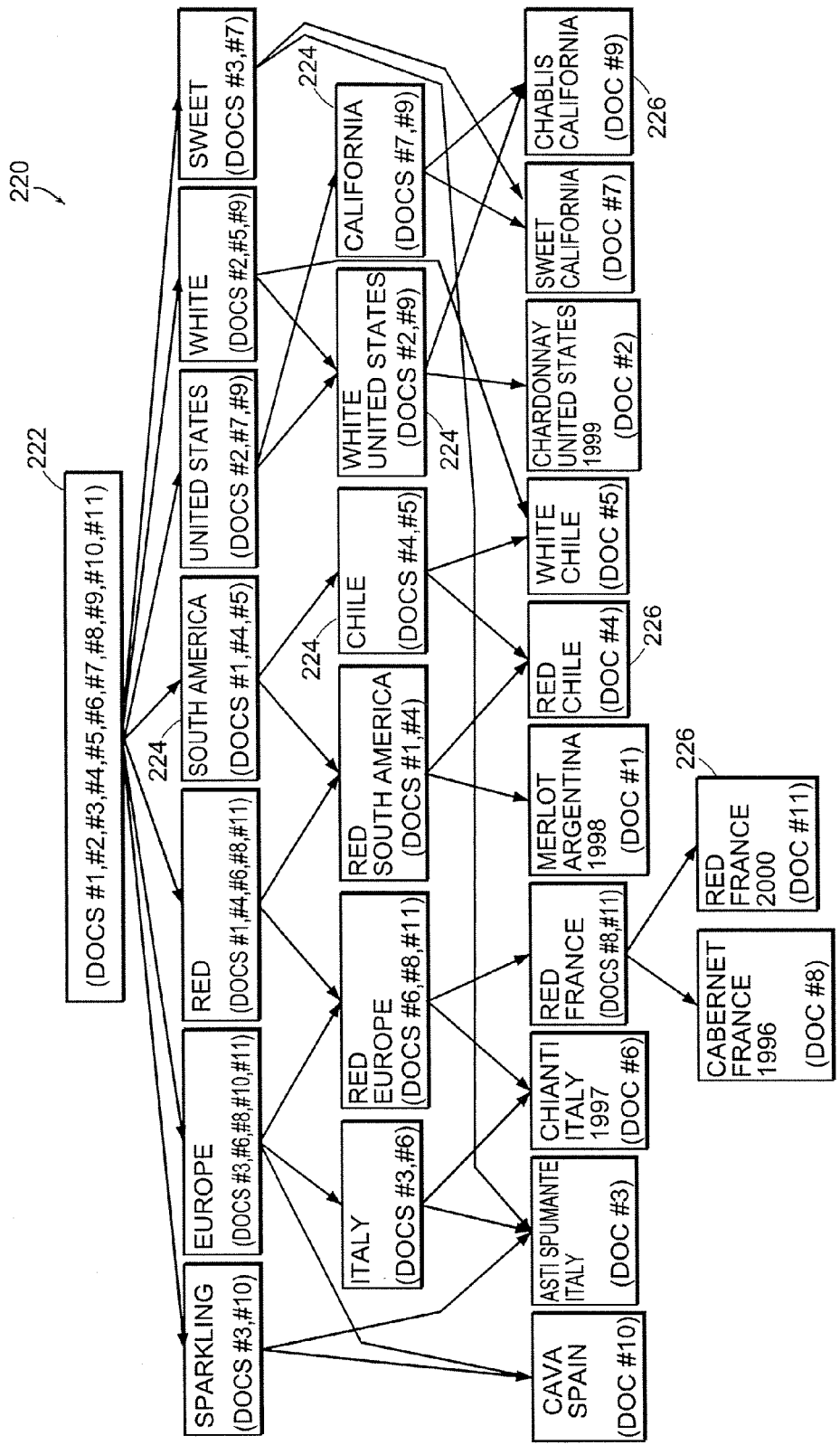

FIG. 17 is a representative partial order of navigation states.

Figure 18:
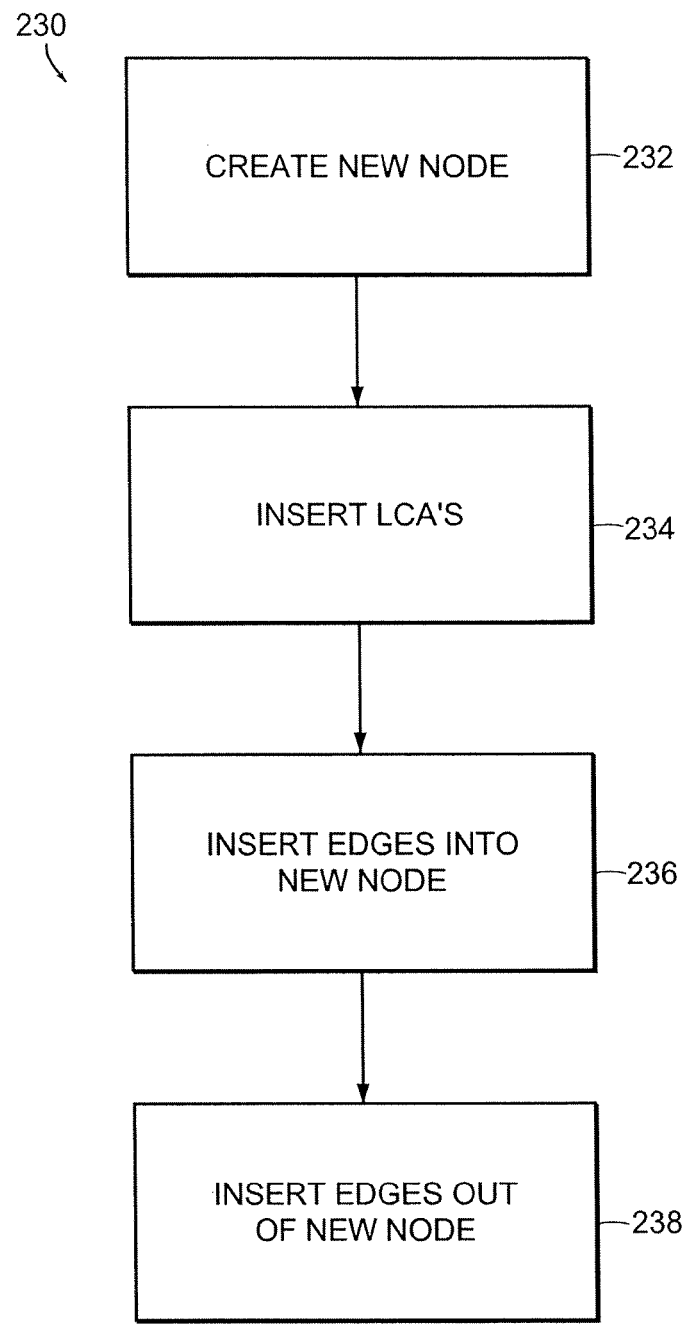

FIG. 18 is a block diagram of a process for precomputing a navigation state.

Figure 19:
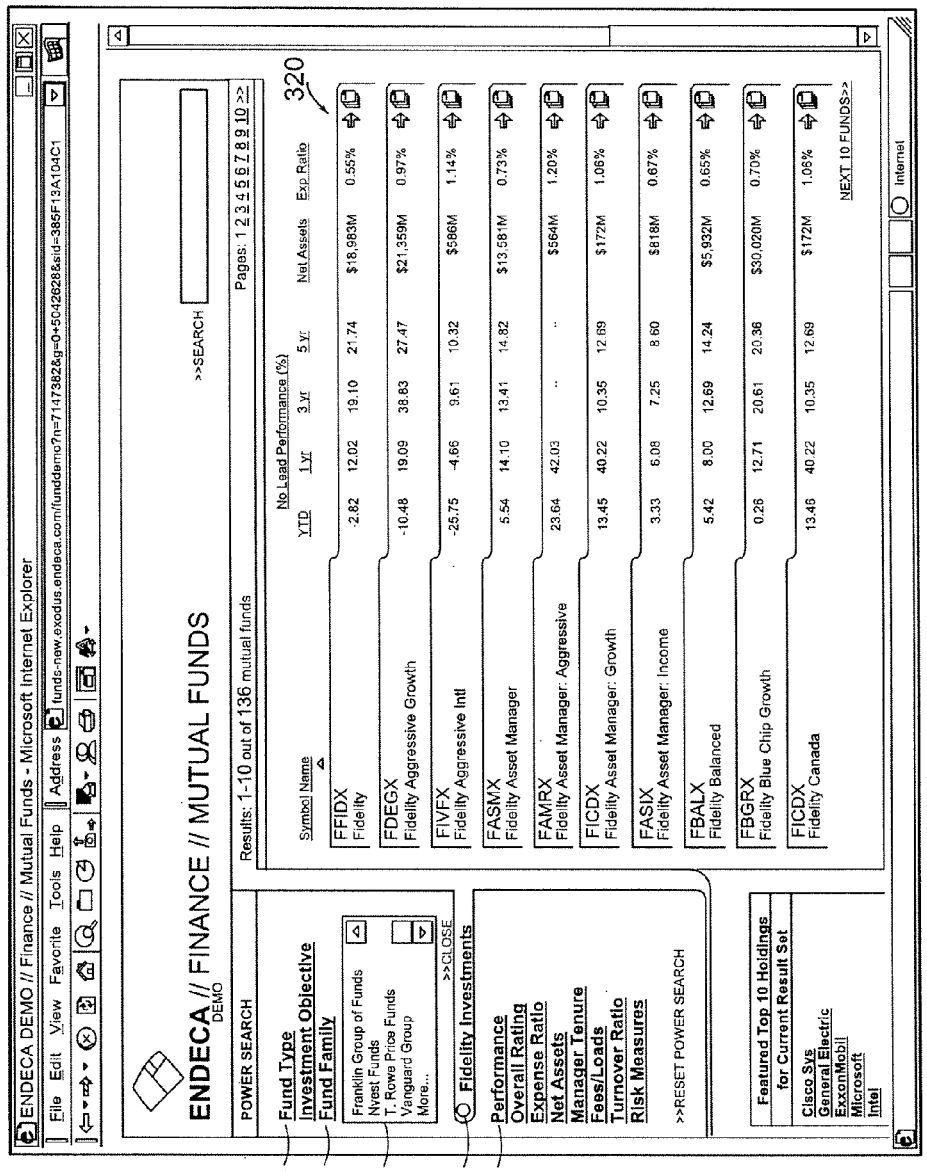

FIG. 19 is a view of a user interface to a search and navigation system, showing disjunctive selection.

FIG. 20 is a view of a user interface to a search and navigation system, showing disjunctive selection.

Figure 21:
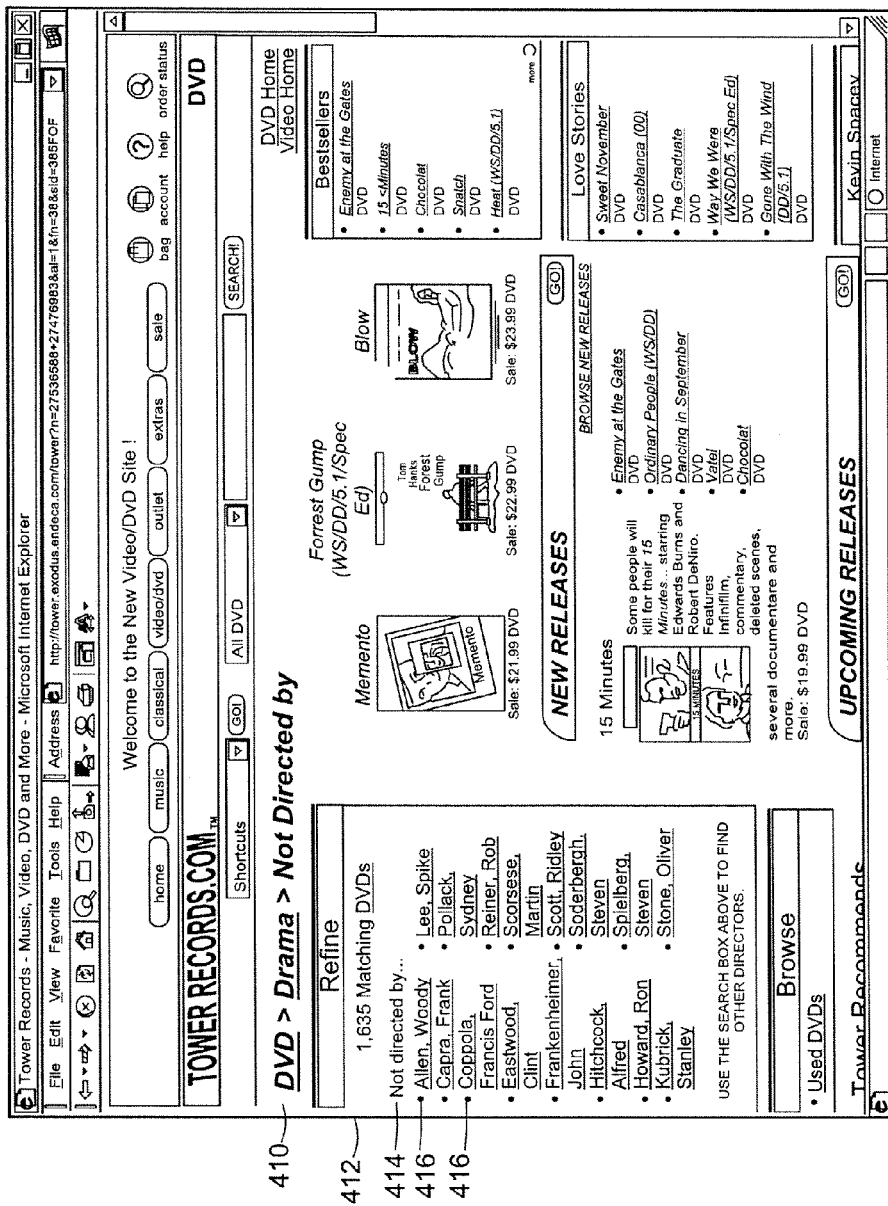

FIG. 21 is a view of a user interface to a search and navigation system, showing negational selection.

Figure 22:
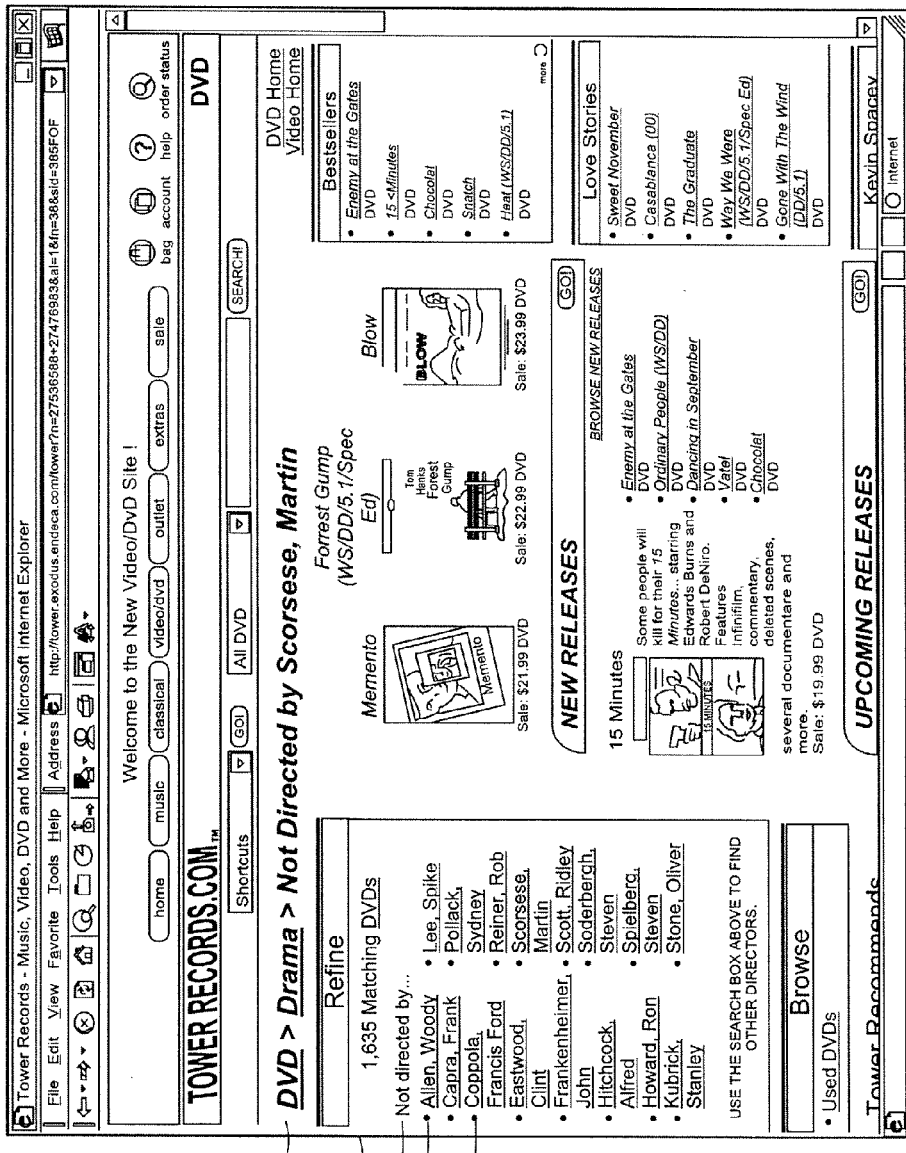

FIG. 22 is a view of a user interface to a search and navigation, showing negational selection.

Figure 23:
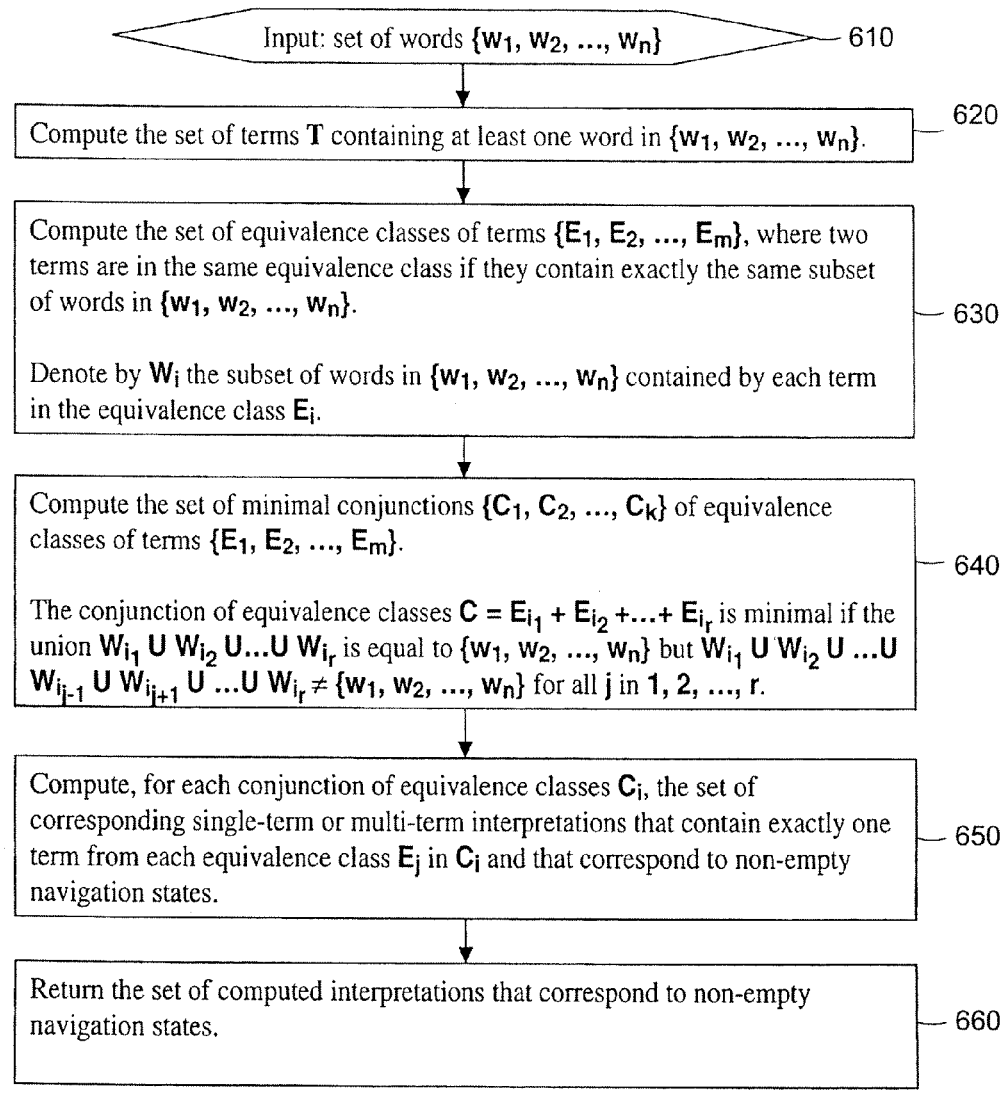

FIG. 23 is a block diagram of a method for processing a free-text search query.

Figure 24:
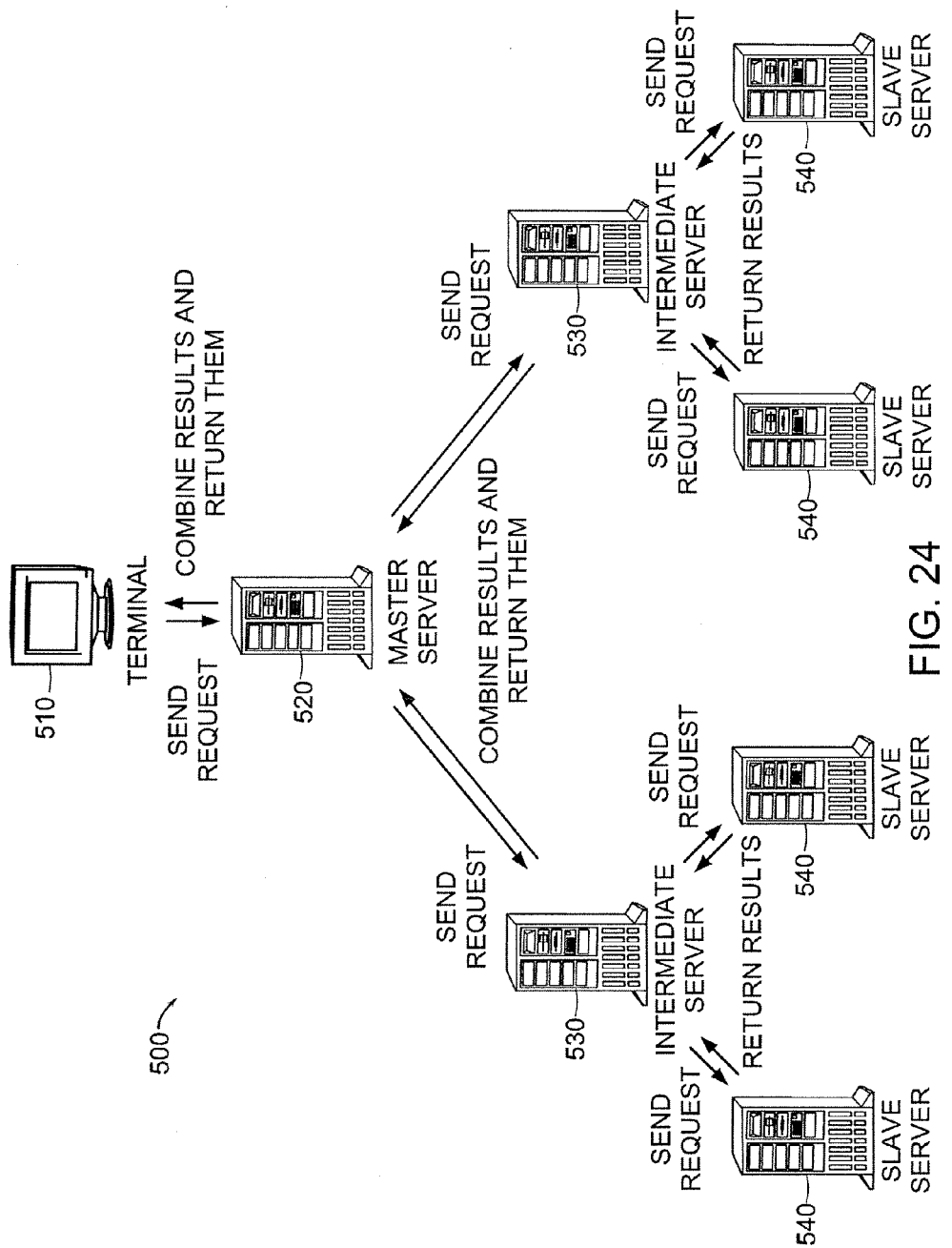

FIG. 24 is a block diagram of a system and a method for processing a request across multiple servers.

Figure 25:
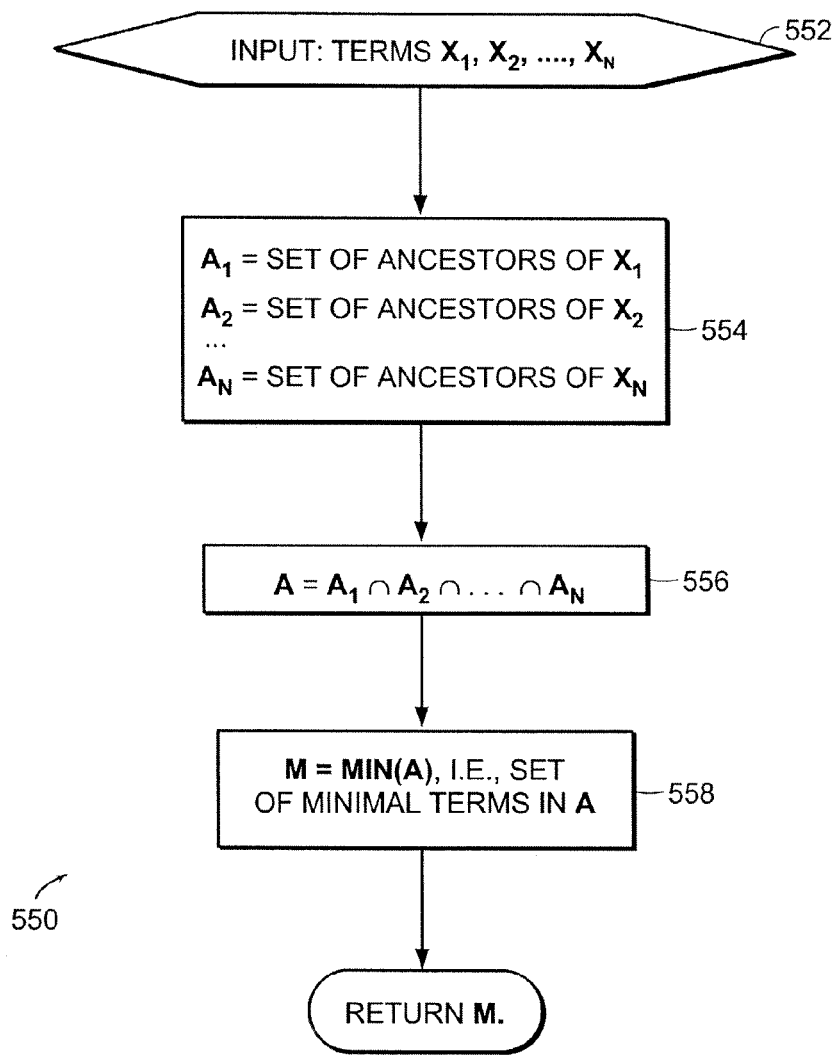

FIG. 25 is a flow diagram of steps for combining refinement options from slave servers.

Figure 26B:
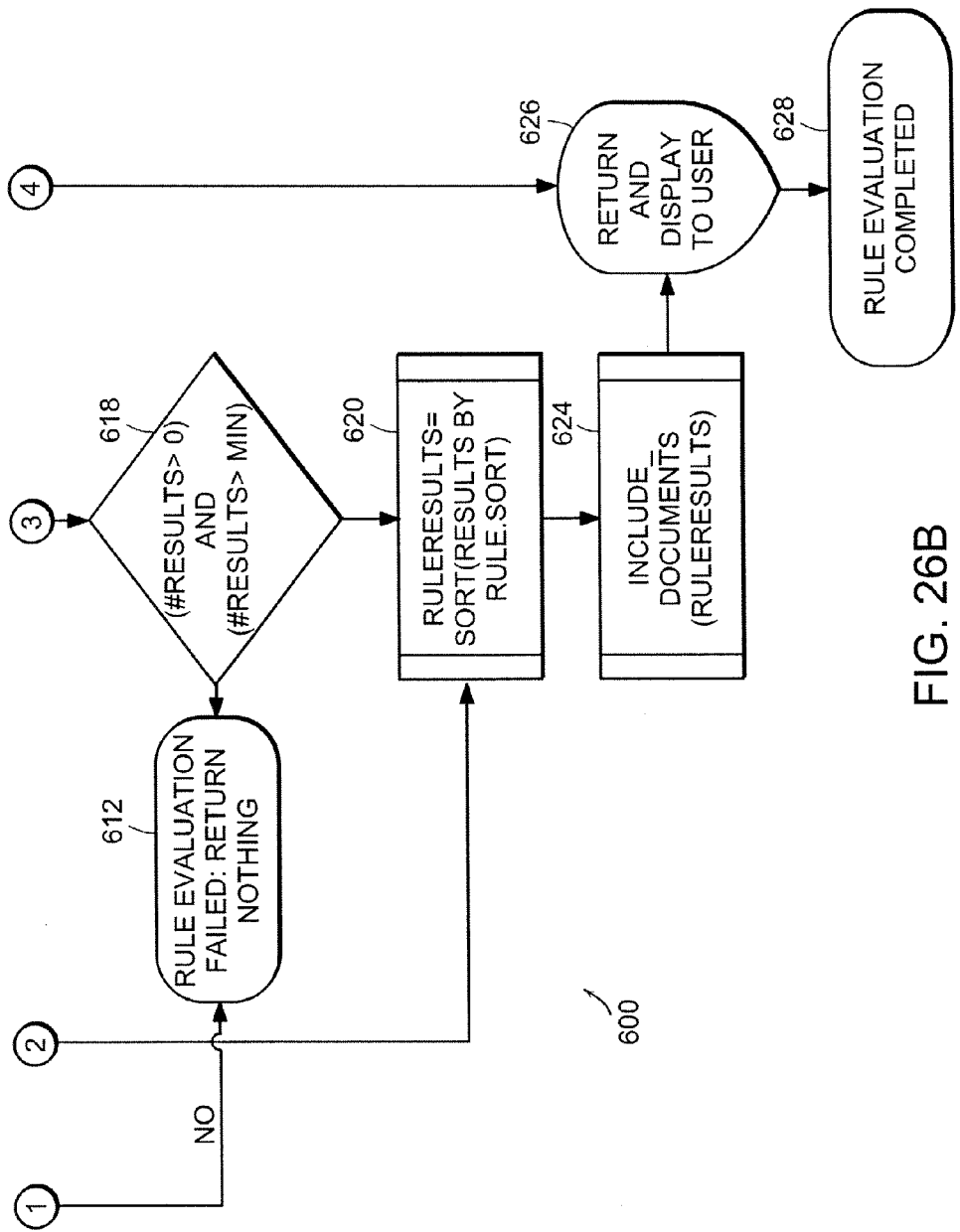

FIGS. 26a-26b is a flow diagram of a process for evaluating an exemplary rule for supplementing results of a query in accordance with an embodiment of the invention.

Figure 27:
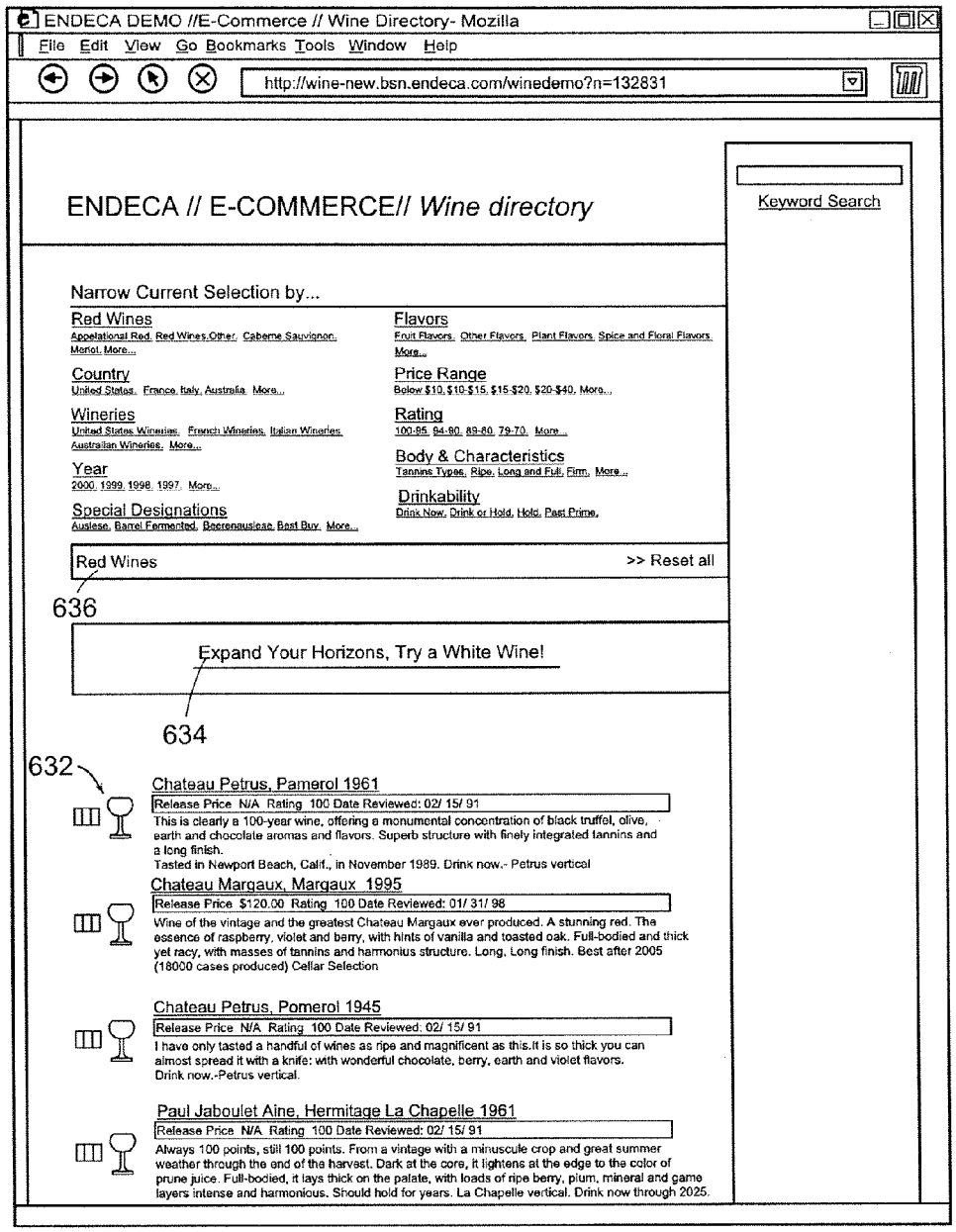

FIG. 27 is a view of a user interface to a search and navigation system in accordance with an embodiment of the invention, showing content that has been manipulated to add text to a search result.

Figure 28:
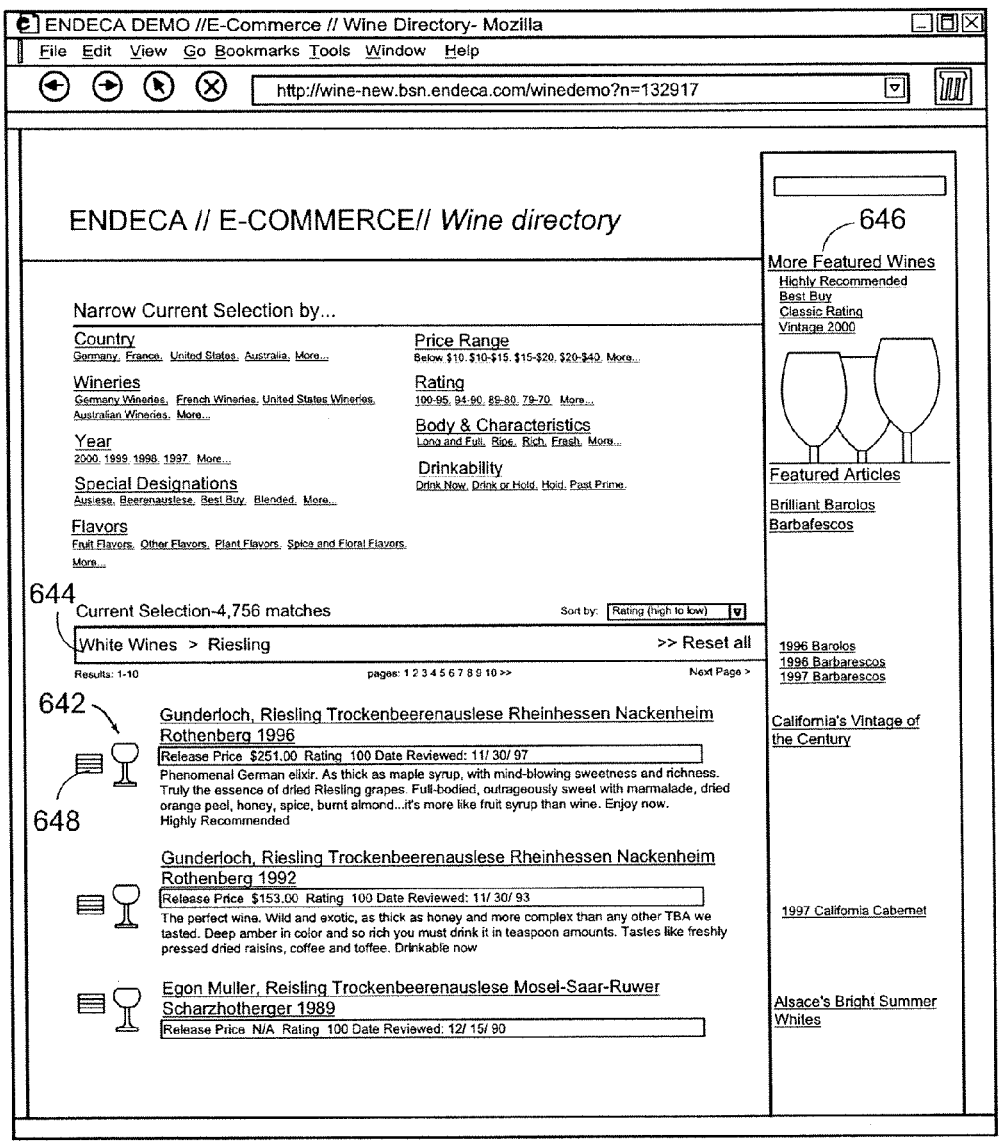

FIG. 28 is a view of a user interface to a search and navigation system in accordance with an embodiment of the invention, showing content that has been manipulated to add featured content.

FIG. 29 is a view of a user interface to a search and navigation system in accordance with an embodiment of the invention, showing content that has been manipulated to add text and supplemental content that is not directly responsive to the query.

FIG. 30 is a table representing a script for a rules engine in accordance with an embodiment of the invention.

5. DETAILED DESCRIPTION OF THE PREFERRED EMBODIMENTS

User Interface

FIG. 1 shows a user interface 10 to a hierarchical, data-driven search and navigation system. The search and navigation system operates on a collection of documents defined in a knowledge base. As is shown, the user is preferably presented with at least two alternative methods of using the search and navigation system: (1) by selecting terms to navigate through the collection of documents, or (2) by entering a desired query in a search box.

The search and navigation system preferably organizes documents by domain. The user interface 10 shown in FIGS. 1-9 is operating on a set of documents that are part of a wine domain. Preferably, a domain defines a portion of the collection of documents that reflects a natural grouping. Generally, the set of attributes used to classify documents in a domain will be a manageable subset of the attributes used to classify the entire collection of documents. A domain definition may be a type of product, e.g., wines or consumer electronics. A domain may be divided into subdomains to further organize the collection of documents. For example, there can be a consumer electronics domain that is divided into the subdomains of televisions, stereo equipment, etc. Documents may correspond to goods or services.

The user interface may allow users to navigate in one domain at a time. Alternatively, the user interface may allow the simultaneous navigation of multiple domains, particularly when certain attributes are common to multiple domains.

The user interface allows the user to navigate through a collection of navigation states. Each state is composed of an expression of terms and of the set of documents associated with those terms in accordance with that expression. In the embodiment shown in FIGS. 1-9, users navigate through the collection of navigation states by conjunctively selecting and deselecting terms to obtain the navigation state corresponding to each expression of conjunctively selected terms. Preferably, as in FIG. 4, the user interface 10 presents a navigation state by displaying both the list 50 of terms 52 and a list 41 of some or all of the documents 42 that correspond to that state. Preferably, the user interface presents the terms 52 of the navigation state organized by attribute. Preferably, the initial navigation state is a root state that corresponds to no term selections and, therefore, to all of the documents in the collection.

As shown in FIG. 2, the user interface 10 allows users to narrow the navigation state by choosing a value 28 for an attribute 22, or by replacing the currently selected value with a more specific one (if appropriate). Preferably, the user interface 10 presents users with the options available to narrow the present navigation state, preferably with relevant terms organized by attribute. As shown in FIG. 2, users can select values 28 from drop-down lists 26 denoted by indicators 24, that are organized by attributes 22 in the current navigation state. The user interface may present these navigation options in a variety of formats. For example, values can be presented as pictures or as symbols rather than as text. The interface may allow for any method of selecting terms, e.g., mouse clicks, keyboard strokes, or voice commands. The interface may be provided through various media and devices, such as television or WWW, and telephonic or wireless devices. Although discussed herein primarily as a visual interface, the interface may also include an audio component or be primarily audio-based.

Preferably, in the present navigation state, the user interface only presents options for narrowing the navigation state that lead to a navigation state with at least one document. This preferred criteria for providing navigation options ensures that there are no "dead ends," or navigation states that correspond to an empty result set.

Preferably, the user interface only presents options for narrowing the navigation state if they lead to a navigation state with strictly fewer documents than the present one. Doing so ensures that the user interface does not present the user with choices that are already implied by terms in the current navigation state.

Preferably, the user interface presents a new navigation state as soon as the user has chosen a term 28 to narrow the current navigation state, without any further triggering action by the user. Because the system responds to each user with immediate feedback, the user need not formulate a comprehensive query and then submit the query.

Figure 3:
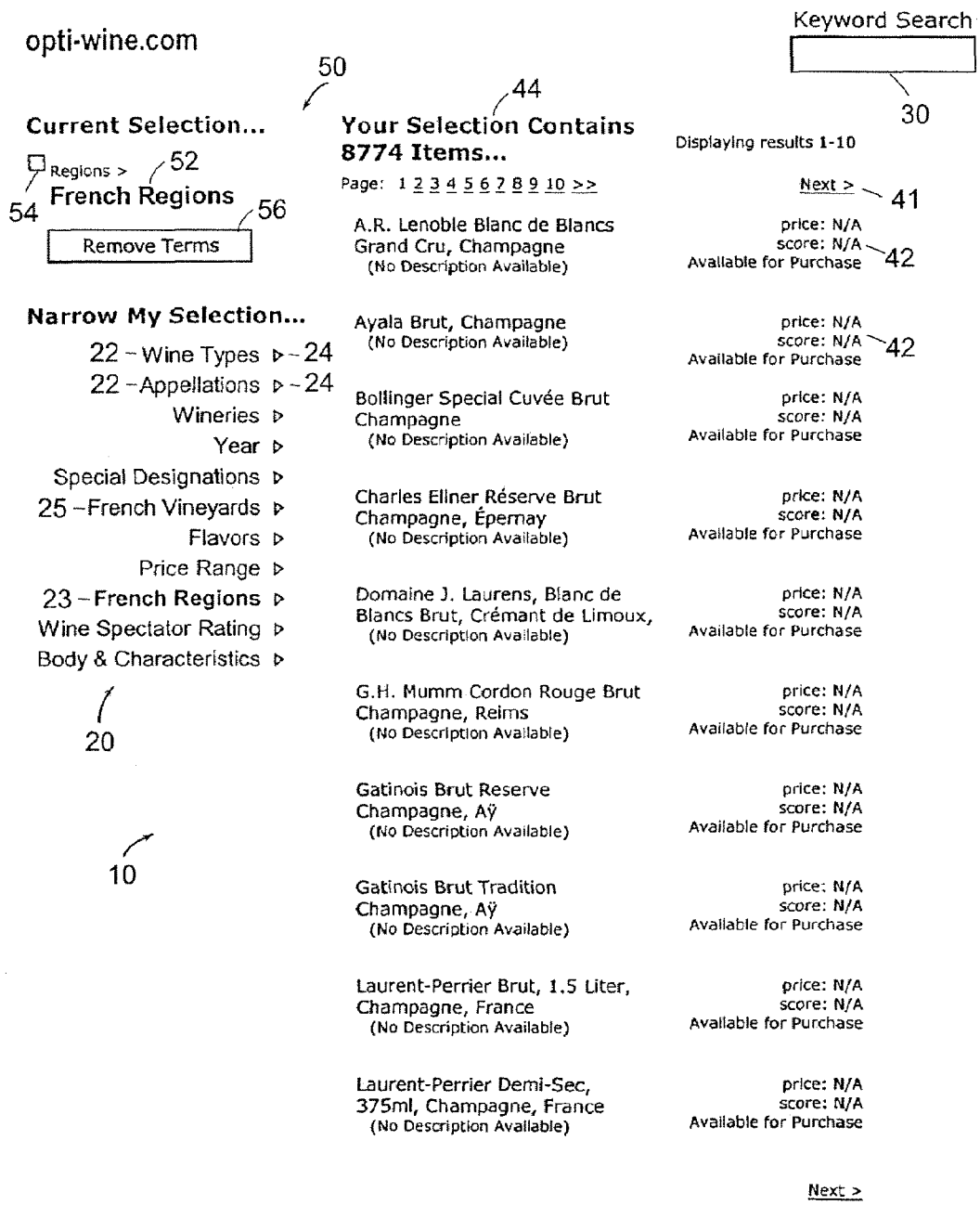
FIG. 3 is a view of the user interface of FIG. 1, showing a navigation state.
Figure 8:
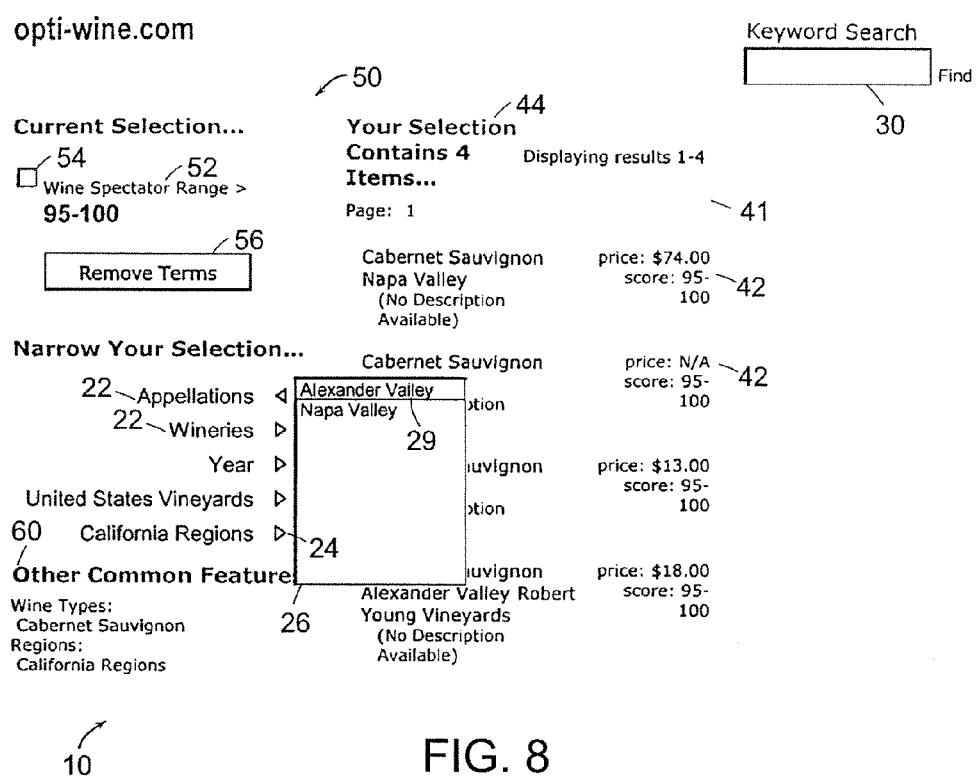
FIG. 8 is a view of the user interface of FIG. 1, showing a navigation state.

As shown in FIGS. 3 and 4, the user interface 10 may enable broadening of the current navigation state by allowing the user to remove terms 52 from the list 50 of terms conjunctively selected. For example, the interface 10 may provide a list 50 with checkboxes 54 for removing selections and a button 56 to trigger the computation of the new navigation state. In the illustrated embodiment, the user can remove conjunctively selected terms 52 in any order and can remove more than one selection 52 at a time.

Preferably, the navigation options presented to the user are context-dependent. For example, terms that refine previously selected terms may become navigation options in the resulting navigation state. For example, referring to FIG. 5, after the term Flavors: Wood and Nut Flavors 52 is conjunctively selected (the user has selected the value Wood and Nut Flavors 23 for the attribute Flavors), Wood and Nut Flavors 23 then appears in the interface for the new navigation state in the list 20 of attributes and allows conjunctive selection of values 28 that relate to that specific attribute for further refinement of the query. The user interface may also present certain attributes that were not presented initially, as they become newly relevant. For example, comparing FIG. 3 to FIG. 2, the attribute French Vineyards 25 appears in the list 20 of attributes only after the user has already conjunctively selected the term Regions: French Regions in a previous navigation state. Attributes may be embedded in this way to as many levels as are desired. Presenting attributes as navigation options when those attributes become relevant avoids overwhelming the user with navigation options before those options are meaningful.

Additionally, for some attributes 22, multiple incomparable (non-refining) conjunctive selections of values 28 may be applicable. For example, for the attribute Flavor, the values Fruity and Nutty, neither of which refines the other, may both be conjunctively selected so that the terms Flavors: Fruity and Flavors: Nutty narrow the navigation state. Thus, users may sometimes be able to refine a query by conjunctively selecting multiple values under a single attribute.

Preferably, certain attributes will be eliminated as navigation options if they are no longer valid or helpful choices. For example, if all of the documents in the result set share a common term (in addition to the term(s) selected to reach the navigation state), then conjunctive selection of that term will not further refine the result set; thus, the attribute associated with that term is eliminated as a navigation option. For example, comparing FIG. 6 with FIG. 4, the attribute Wine Types 27 has been eliminated as a navigation option because all of the documents 42 in the result set share the same term, Wine Types: Appellational Wines. In preferred embodiments, an additional feature of the interface 10 is that this information is presented to the user as a common characteristic of the documents 42 in the result set. For example, referring to FIG. 6, the interface 10 includes a display 60 that indicates the common characteristics of the documents 42 in the result set. Removing a term as a navigation option when all of the documents in the result set share that term prevents the user from wasting time by conjunctively selecting terms that do not refine the result set.

Preferably, the user interface also eliminates values as navigation options if their selection would result in no documents in the result set. For example, comparing FIG. 8 to FIG. 7, after the user selects the term Wine Spectator Range: 95-100, the user interface eliminates as navigation options all the values 28, 29 in the list 26 of values for the attribute Appellations 22 except for the values Alexander Valley 29 and Napa Valley 29. Alexander Valley 29 and Napa Valley 29 are the only two values in the list 26 of values for the attribute Appellations that return at least one document in the result set; all other values 28 return the empty set. Removing values as navigation options that would result in an empty result set saves the user time by preventing the user from reaching dead-ends.

Preferably, the user interface allows users to enter free-text search queries that may be composed of one or more words. The system may interpret free text queries in various ways. In particular, the system may map a free-text query to two types of search results: single-term interpretations and multi-term interpretations. A single-term interpretation maps the complete query to an individual term in the knowledge base. A multi-term interpretation maps the query to a conjunction of two or more terms in the knowledge base—that is, a plurality of terms that corresponds to a conjunctive navigation state. Depending on the particular implementation and application context, a free-text query may be mapped to one or more single-term interpretations, one or more multi-term interpretations, or a combination of both types of interpretations. The user interface may allow users to use a free-text search either to find matching terms or further to find materials associated with matching terms.

Figure 9:
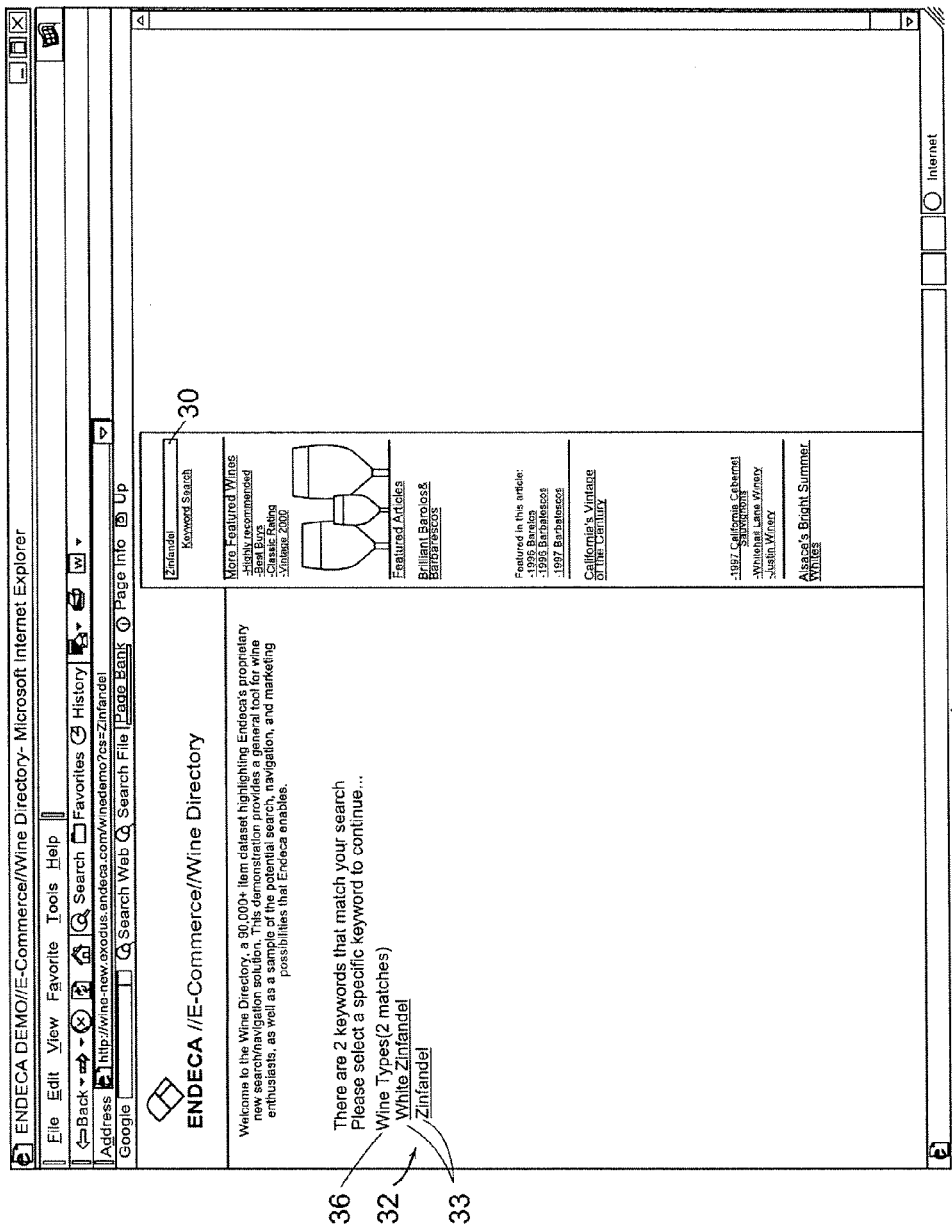
FIG. 9 is a view of the user interface of FIG. 1, showing the result of a free-text search.

As illustrated in FIG. 9, in interface 90, a search box 30 preferably allows users to perform a free-text search for terms of interest, rather than performing a full-text search of the documents themselves. Preferably, the user interface responds to such a search by presenting a list 32 of single-term interpretations 33 including terms organized by attribute 36, and allowing the user to select from among them. Preferably, the user interface responds to the user's selection by presenting the user with the navigation state corresponding to the selection of that term. The user may then either navigate from that state (i.e., by narrowing or broadening it) or perform additional free-text searches for terms.

Figure 10:
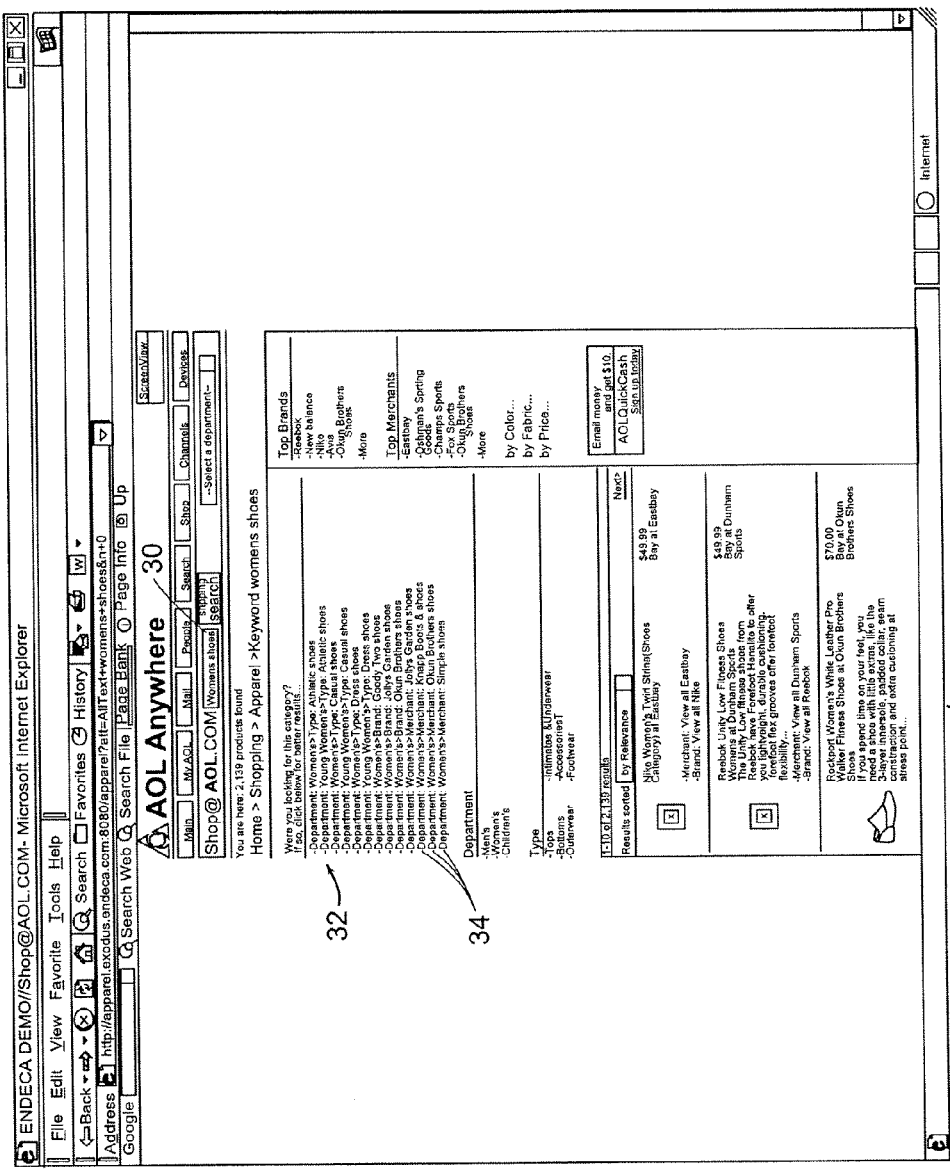
FIG. 10 is a view of a user, showing the result of a free-text search.

As illustrated in FIG. 10, the user interface 100 responds to free-text search queries by presenting a list 32 of multi-term interpretations 34, and allowing the user to select from among them. Preferably, the user interface responds to the user's selection by presenting the user with the navigation state corresponding to the selection of that conjunction of terms. The user may then either navigate from that state (i.e., by narrowing or broadening it) or perform additional free-text searches for terms.

Figure 11:
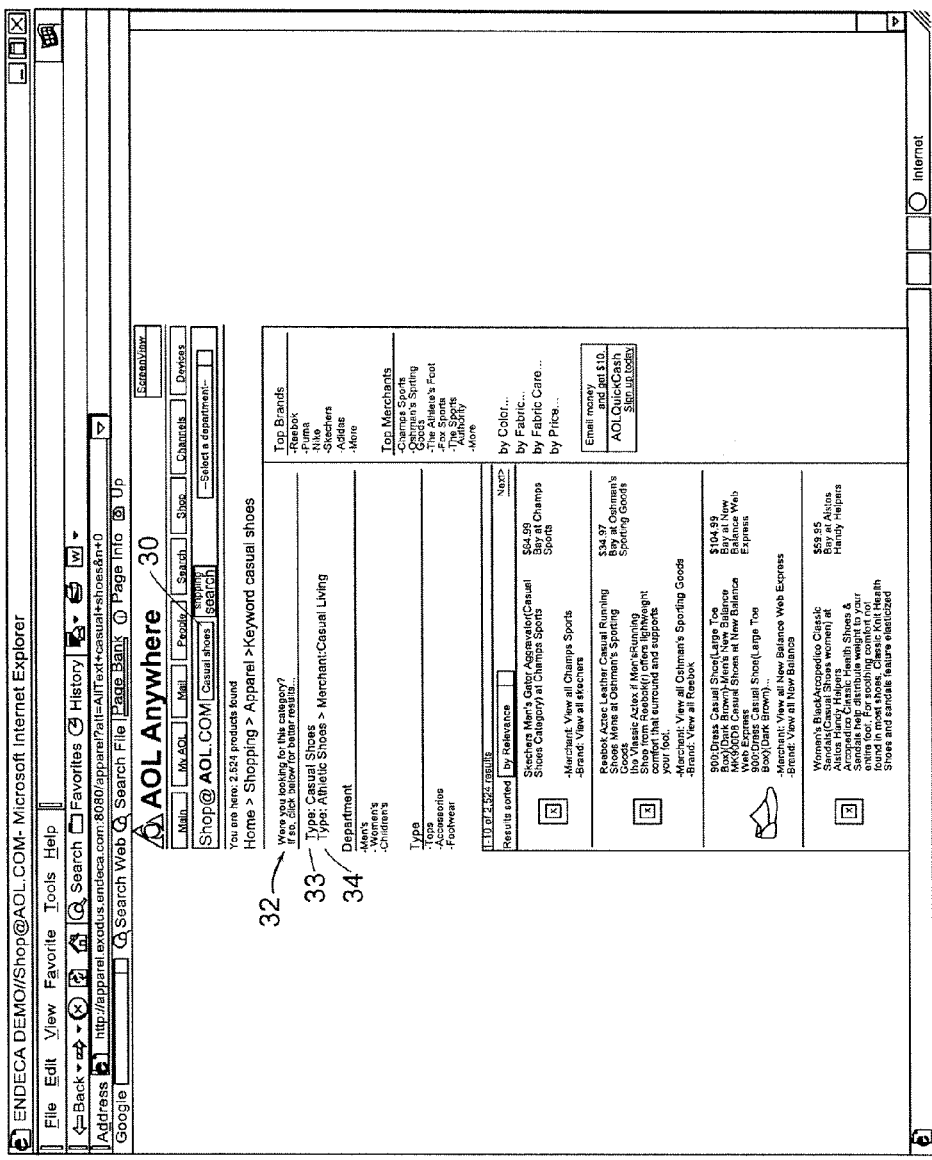
FIG. 11 is a view of the user interface of FIG. 10, showing the result of a free-text search.

As illustrated in FIG. 11, the user interface 100 responds to free-text search queries by presenting a list 32 of single-term interpretations 33 and multi-term interpretations 34, and allowing the user to select from among them. Preferably, the user interface responds to the user's selection by presenting the user with the navigation state corresponding to the selection of that term or conjunction of terms. The user may then either navigate from that state (i.e., by narrowing or broadening it) or perform additional free-text searches for terms.

Figure 12:
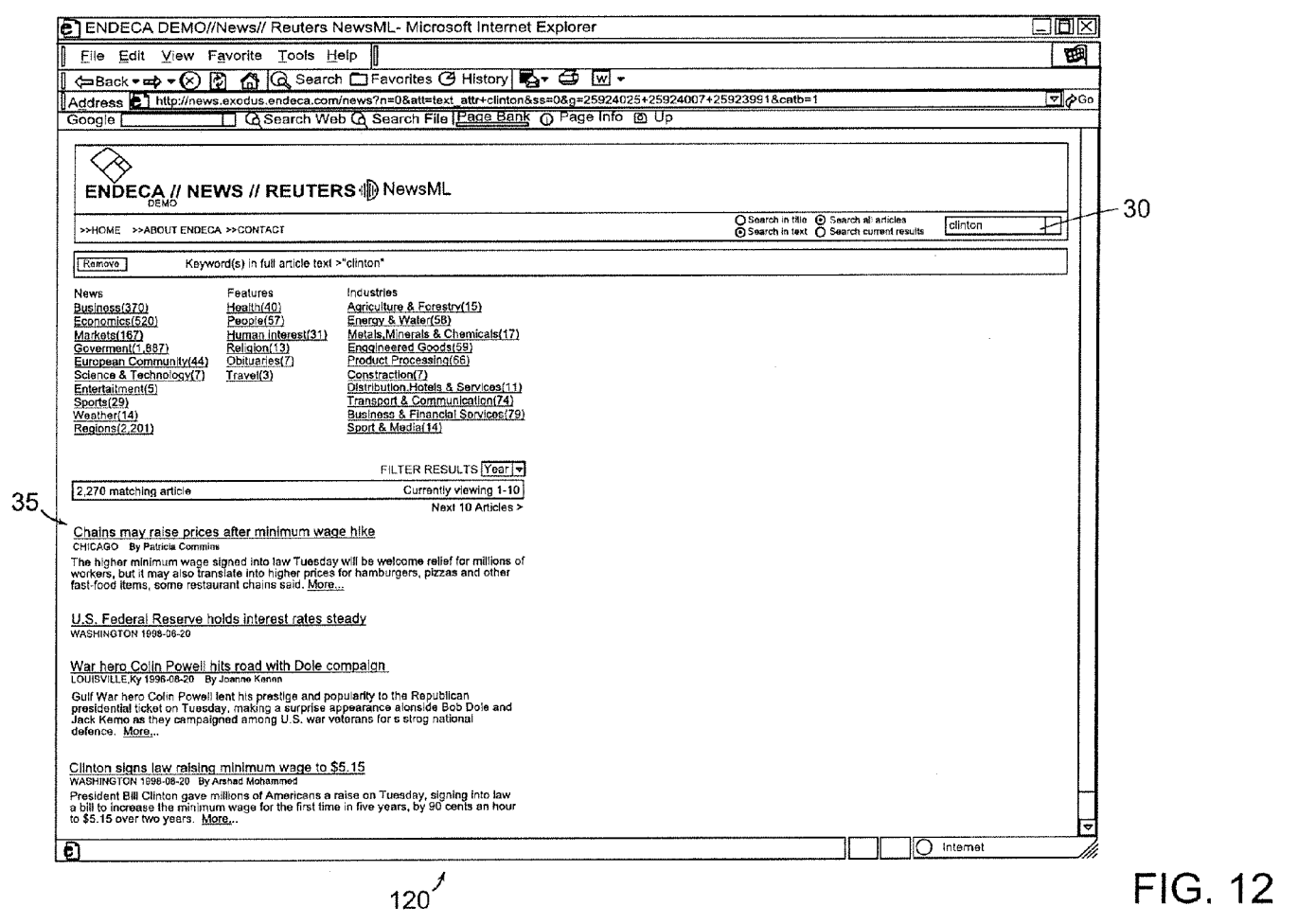

As illustrated in FIG. 12, the user interface 105 responds to free-text search queries by directly presenting the set of matching documents 35, for example, in accordance with full-text search of the documents. The user may then either navigate from that result (i.e., by narrowing or broadening it) or perform additional free-text searches for terms.

Preferably, the user interface 10 presents a full or partial list 41 of the documents that correspond to the current navigation state. Preferably, if a user is interested in a particular document 42, the user may select it and obtain a record 70 containing further information about it, including the list 72 of terms 74 that are associated with that document, as shown in FIG. 13. Preferably, the user interface 10 allows the user to conjunctively select any subset of those terms 74 and thereby navigate to the navigation state that corresponds to the selected term expression.

Preferably, the user interface 10 also offers navigation options that directly link to an associated navigation state that is relevant to, but not necessarily a generalization or refinement of, the present navigation state. These links preferably infer the user's interests from the present navigation state and enable the user to cross-over to a related topic. For example, if the user is visiting a particular navigation state in a food domain, links may direct the user to navigation states of wines that would complement those foods in the wine domain.

In some systems, the user is preferably presented with additional methods of using the search and navigation system such as: (1) by conjunctively selecting terms, (2) by disjunctively selecting terms, (3) by negationally selecting terms, or (4) by entering a desired keyword in a search box.

The user may broaden the navigation state by disjunctively selecting additional terms. For example, a user could start at {Products: DVDs}, and then broaden by disjunctively selecting a term to {Products: DVDs OR Products: Videos}, and then narrow by conjunctively selecting a term to {(Products: DVDs OR Products: Videos) AND Director: Spike Lee}. FIG. 19 shows a user interface 300 to a hierarchical, data-driven search and navigation system. The user interface 300 is operating on a collection of records relating to mutual funds. The interface 300 presents navigation options, including a list of attributes 310 relating to mutual funds and a list of terms 314 for a particular attribute 312, such as Fund Family, under consideration by a user. A selected term 316 is highlighted. As shown, the attribute-value pair {Fund Family: Fidelity Investments} has previously been selected. The illustrated search and navigation system allows the user to select attribute-value pairs disjunctively. As shown in FIG. 20, after the user subsequently selects {Fund Family: Vanguard Group} in addition, the interface 300 presents a new navigation state {Fund Family: Fidelity Investments OR Fund Family: Vanguard Group}, including mutual funds 320 that match either selected attribute-value pair. Accordingly, both selected attribute-value pairs 316 are highlighted. In some embodiments, for example, to reduce computational requirements, disjunctive combination of attribute-value pairs may be limited to mutually incomparable attribute-value pairs that correspond to the same attribute.

The user may narrow the navigation state by negationally selecting additional terms. For example, a user could start at {Products: DVDs}, narrow by conjunctively selecting a term to {Products: DVDs AND Genre: Comedy}, and then narrow by negationally selecting a term to {Products: DVDs AND Genre: Comedy AND (NOT Director: Woody Allen)}. FIG. 21 shows another interface 400 to a hierarchical, data-driven search and navigation system. The user interface 400 is operating on a collection of records relating to entertainment products. The user interface 400 includes a header 410 and a navigation area 412. The header 410 indicates the present navigation state {Products: DVDs AND Genre:Drama}, and implies the refinement options currently under consideration by the user. The leader "Not Directed By" 414 indicates a negational operation with respect to the Director attribute. The interface lists the attribute-value pairs 416 that can be combined with the expression for the present navigation state under this operation. As shown in FIG. 22, after the user-selects the term Director: Martin Scorsese, the interface 400 presents a new navigation state {Products: DVDs AND Genre:Drama AND (NOT Director: Martin Scorsese}.

In some embodiments of the invention, the content presented to the user is manipulated based on information about the user's query and the current navigation state using rules specified in a rules engine. The following kinds of content manipulation are examples of techniques for manipulating content that can be implemented in accordance with the present invention. Particular embodiments may include only some or even none of these types of content manipulation. One kind of content manipulation is the inclusion of documents that may not be in the set of documents specified by the present navigation state, but rather are provided by a rule or plurality of rules activated by the present query or navigation state. The supplemental documents may not be directly responsive to the user's query but may be related to the query in some way that is identified in the rules. Another kind of content manipulation is the providing of options to navigate to a new navigation state based on a rule or plurality of rules activated by the present query or navigation state. The new navigation states can be states that would otherwise require multiple refinements and/or generalizations from the present state to reach.

The content may be manipulated by filtering the documents in the navigation state based on a rule or plurality of rules activated by the present query or navigation state. Also, the content may be manipulated by sorting the documents in the navigation state based on a rule or plurality of rules activated by the present query or navigation state. Or, the content may be manipulated by aggregating the documents in the navigation state into equivalence classes based on an explicit or derived property of those documents. For example, documents representing books might be aggregated according to author and title, so that multiple editions of the same book are grouped into the same equivalence class. Such an aggregation scheme treats two books that share both author and title are equivalent.

The content manipulation may also take the form of rendering the documents in a particular way in the navigation state based on a rule or plurality of rules activated by the present query or navigation state.

Also, the content may be manipulated by providing a transformation of the query based on a rule or plurality of rules activated by the present query or navigation state. The displayed result corresponds to the new query or adds the results of the new query to the results of the original query.

FIGS. 27, 28 and 29 show an interface displaying query results in which content has been manipulated in accordance with some aspects of the invention. FIG. 27 shows a result 630 displayed to the user that includes a list 632 of documents that are directly responsive to the user's query 636. The content of result 630 has also been manipulated to add the text "Expand Your Horizons, Try a White Wine!" 634 in response to the user's query 636 directed to red wines. The text also represents a navigation option that takes the user to a navigation state including white wines. FIG. 28 shows a result 640 displayed to a user that includes a list 642 of documents that are directly responsive to the user's query 644. The list of responsive documents 642 has been sorted to present wines with the highest rating first. In addition, the rendering includes adding the flag of the corresponding country 648 to each responsive document shown in the display. The content of result 640 has been manipulated to add featured content 646. The featured content 646 includes featured items in the collection, as well as featured articles that relate to the collection. FIG. 29 shows a result 650 in which the content has been supplemented by adding a list 654 of documents that are not responsive to the user's query 652 directed to red wines. This may be accomplished, for example, by triggering a rule that generates a new query in its action and returns the results of the new query for inclusion in the display.

Although the interface to the search and navigation system has been described herein as a user interface, the interface could provide other forms of access to the search and navigation system. In alternative embodiments, the interface may be an applications program interface to allow access to the search and navigation system for or through other applications. The interface may also enhance the functionality of an independent data-oriented application. The interface may also be used in the context of a WWW-based application or an XML-based application. The search and navigation system may also support multiple interface modes simultaneously. The search and navigation system may be made available in a variety of ways, for example via wireless communications or on handheld devices.

Knowledge Base

Preferably, the search and navigation system stores all information relevant to navigation in a knowledge base. The knowledge base is the repository of information from two processes: taxonomy definition and classification. Taxonomy definition is the process of identifying the relevant attributes to characterize documents, determining the acceptable values for those attributes (such as a list or range of values), and defining a partial order of refinement relationships among terms (attribute-value pairs). Classification is the process of associating terms with documents. The knowledge base may also be used to maintain any information assets that support these two processes, such as domains, classification rules and default expectations. Additionally, the knowledge base may be used to maintain supplementary information and materials that affect users' navigation experience.

The taxonomy definition process identifies a set of attributes that appropriately characterize documents. A typical way to organize the taxonomy definition process is to arrange the collections of documents into domains, which are sets of documents that conform to a natural grouping and for which a manageable number of attributes suffice to effectively distinguish and navigate among the documents in that domain. The knowledge base preferably includes a characterization of each domain, which might include rules or default expectations concerning the classification of documents in that domain.

The taxonomy definition process also identifies a full set of values, at varying levels of specificity when appropriate, for each attribute. The values preferably identify the specific properties of the documents in the collection. The values may be enumerated explicitly or defined implicitly. For example, for a "color" attribute, a full set of valid color values may be specified, but for a "price" or "date" attribute, a range within which the values may fall or a general data type, without defining a range, may be specified. The process of identifying these values may include researching the domain or analyzing the collection of documents.

The taxonomy definition process also defines a partial order of refinement relationships among terms (attribute-value pairs). For example, the term Origin: France could refine the term Origin: Europe. The refinement relationship is transitive and antisymmetric but not necessarily total. Transitivity means that, if term A refines term B and term B refines term C, then term A refines term C. For example, if Origin: Paris refines Origin: France and Origin: France refines Origin: Europe, then Origin: Paris refines Origin: Europe. Antisymmetry means that, if two terms are distinct, then both terms cannot refine each other. For example, if Origin: Paris refines Origin: France, then Origin: France does not refine Origin: Paris.

Further, the partial order of refinement relationships among terms is not necessarily a total one. For example, there could be two terms, Origin: France and Origin: Spain, such that neither term refines the other. Two terms with this property are said to be incomparable. Generally, a set of two or more terms is mutually incomparable if, for every pair of distinct terms chosen from that set, the two terms are incomparable. Typically, but not necessarily, two terms with distinct attributes will be incomparable.

Given a set of terms, a term is a maximal term in that set if it does not refine any other terms in the set, and it is a minimal term in that set if no other term in the set refines it. For example, in the set {Origin: France, Origin: Paris, Origin: Spain, Origin: Madrid}, Origin: France and Origin: Spain are maximal, while Origin: Paris and Origin: Madrid are minimal. In the knowledge base, a term is a root term if it does not refine any other terms and a term is a leaf term if no other term refines it.

FIGS. 14A, 14B, and 14C illustrate attributes 112 and values 114, arranged in accordance with the partial order relationships, that could be used for classifying wines. The attributes 112 are Type/Varietal, Origin, and Vintage. Each attribute 112 corresponds to a maximal term for that attribute. An attribute 112 can have a flat set of mutually incomparable values (e.g., Vintage), a tree of values (e.g., Origin), or a general partial order that allows a value to refine a set of two or more mutually incomparable values (e.g., Type/Varietal). The arrows 113 indicate the refinement relationships among values 114.

Attributes and values may be identified and developed in several ways, including manual or automatic processing and the analysis of documents. Moreover, this kind of analysis may be top-down or bottom-up; that is, starting from root terms and working towards leaf terms, or starting from leaf terms and working towards root terms. Retailers, or others who have an interest in using systems in conjunction with the present invention to disseminate information, may also define attributes and terms.

The classification process locates documents in the collection of navigation states by associating each document with a set of terms. Each document is associated with a set of mutually incomparable terms, e.g., {Type/Varietal: Chianti, Origin: Italy, Vintage: 1996}, as well as any other desired descriptive information. If a document is associated with a given term, then the document is also associated with all of the terms that the given term refines.

The classification process may proceed according to a variety of workflows. Documents may be classified in series or in parallel, and the automatic and manual classification steps may be performed one or more times and in any order. To improve accuracy and throughput, human experts may be assigned as specialists to oversee the classification task for particular subsets of the documents, or even particular attributes for particular subsets of the documents. In addition, the classification and taxonomy processes may be interleaved, especially as knowledge gained from one process allows improvements in the other.

FIG. 15 illustrates the stages in a possible flow for the classification process 250. The data acquisition step 252, that is, the collection of documents for the database, may occur in several different ways. For example, a retailer with a product catalog over which the search and navigation system will operate might provide a set of documents describing its products as a pre-defined set. Alternatively, documents may be collected from one source, e.g., one Web site, or from a number of sources, e.g., multiple Web sites, and then aggregated. If the desired documents are Web pages, the documents may be collected by appropriately crawling the Web, selecting documents, and discarding documents that do not fit in the domain. In the data translation step 254, the collected documents are formatted and parsed to facilitate further processing. In the automatic classification step 256, the formatted and parsed documents are processed in order to automatically associate documents with terms. In the manual classification step 258, human reviewers may verify and amend the automatic classifications, thereby ensuring quality control. Preferably, any rules or expectations violated in either the automatic classification step 256 or the manual classification step 258 would be flagged and presented to human reviewers as part of the manual classification step 258. If the collection of documents is divided into domains, then there will typically be rules that specify a certain minimal or preferred set of attributes used to classify documents from each domain, as well as other domain-specific classification rules. When the classification process is complete, each document will have a set of terms associated with it, which locate the document in the collection of navigation states.

In FIG. 16, table 180 shows a possible representation of a collection of classified wine bottles. Preferably, each entry is associated with a document number 182, which could be a universal identifier, a name 184, and the associated terms 186. The name is preferably descriptive information that could allow the collection to be accessed via a free-text search engine as well as via term-based navigation.

The knowledge base may also include a catalog of canonical representations of documents. Each catalog entry represents a conceptually distinct item that may be associated with one or more documents. The catalog allows aggregation of profile information from multiple documents that relate to the item, possibly from multiple sources. For example, if the same wine is sold by two vendors, and if one vendor provides vintage and geographic location information and another provides taste information, that information from the two vendors can be combined in the catalog entry for that type of wine. The catalog may also improve the efficiency of the classification process by eliminating duplicative profiling. In FIG. 15, the catalog creation step 260 associates classified documents with catalog entries, creating new catalog entries when appropriate. For ease of reference, an item may be uniquely identified in the catalog by a universal identifier.

The knowledge base may also define stores, where a store is a subcollection of documents that are grouped to be retrievable at one time. For example, a particular online wine merchant may not wish to display documents corresponding to products sold by that merchant's competitors, even though the knowledge base may contain such documents. In this case, the knowledge base can define a store of documents that does not include wines sold by the merchant's competitors. In FIG. 15, the store creation step 262 may define stores based on attributes, terms, or any other properties of documents. A document may be identified with more than one store. The knowledge base may also contain attributes or terms that have been customized for particular stores.

In FIG. 15, the export process step 264 exports information from the knowledge base to another stage in the system that performs further processing necessary to generate a navigable data structure.

Navigation States

The search and navigation system represents, explicitly or implicitly, a collection of navigation states. A navigation state can be represented either by an expression of terms, or by the subset of the collection of documents that correspond to the term expression.

By way of example, types of navigation states include conjunctive navigation states, disjunctive navigation states and negational navigation states. Conjunctive navigation states are a special case of navigation states in which the term expression is conjunctive—that is, the expression combines terms using only the AND operator. Conjunctive navigation states are related by a partial order of refinement that is derived from the partial order that relates the terms.

A conjunctive navigation state may have two representations. First, a conjunctive navigation state corresponds to a subset of the collection of documents. Second, a conjunctive navigation state corresponds to a conjunctive expression of mutually incomparable terms. FIG. 18 illustrates some navigation states for the documents and terms based on the wine example discussed above. For example, one navigation state 224 is {Origin: South America} (documents #1, #4, #5); a second navigation state 224 is {Type/Varietal: White AND Origin: United States} (documents #2, #9). The subset of documents corresponding to a conjunctive navigation state includes the documents that are commonly associated with all of the terms in the corresponding expression of mutually incomparable terms. At the same time, the expression of mutually incomparable terms corresponding to a conjunctive navigation state includes all of the minimal terms from the terms that are common to the subset of documents, i.e., the terms that are commonly associated with every document in the subset. A conjunctive navigation state is preferably unique and fully specified; for a particular conjunctive expression of terms, or for a given set of documents, there is no more than one corresponding conjunctive navigation state.

One way preferred to define the collection of conjunctive navigation states is to uniquely identify each conjunctive navigation state by a canonical conjunctive expression of mutually incomparable terms. A two-step mapping process that maps an arbitrary conjunctive expression of terms to a canonical conjunctive expression of mutually incomparable terms creates states that satisfy this property. In the first step of the process, an arbitrary conjunctive expression of terms is mapped to the subset of documents that are associated with all of those terms. Recalling that if a document is associated with a given term, then the document is also associated with all of the terms that the given term refines, in the second step of the process, this subset of documents is mapped to the conjunctive expression of minimal terms among the terms that are common to all of the documents in that document set. The result of this second step is a conjunctive expression of mutually incomparable terms that uniquely identifies the corresponding subset of documents, and, hence, is a canonical representation for a conjunctive navigation state. By way of illustration, referring to the wine example in FIG. 17, the term expression {Origin: France} maps to the subset of documents {documents #8, #11}, which in turn maps to the canonical term expression {Type/Varietal: Red AND Origin: France}.

The conjunctive navigation states 222, 224, 226 are related by a partial order of refinement relationships 220 derived from the partial order that relates terms. This partial order can be expressed in terms of either the subsets of documents or the term expressions that define a conjunctive navigation state. Expressed in terms of subsets of documents, a navigation state A refines a navigation state B if the set of documents that corresponds to state A is a subset of the set of documents that corresponds to state B. Expressed in terms of term expressions, a conjunctive navigation state A refines a conjunctive navigation state B if all of the terms in state B either are in state A or are refined by terms in state A. Referring to FIG. 17, the navigation state 226 corresponding to the term expression {Type/Varietal: Red AND Origin: Chile} (document #4) refines the navigation state 224 corresponding to {Origin: Chile} (documents #4, #5). Since the refinement relationships among navigation states give rise to a partial order, they are transitive and antisymmetric. In the example, {Type/Varietal: Red AND Origin: Chile} (document #4) refines {Origin: Chile} (documents #4, #5) and {Origin: Chile} (documents #4, #5) refines {Origin: South America} (documents #1, #4, #5); therefore, {Type/Varietal: Red AND Origin: Chile} (document #4) refines {Origin: South America} (documents #1, #4, #5). The root navigation state 222 is defined to be the navigation state corresponding to the entire collection of documents. The leaf navigation states 226 are defined to be those that cannot be further refined, and often (though not necessarily) correspond to individual documents. There can be arbitrarily many intermediate navigation states 224 between the root 222 and the leaves 226. Given a pair of navigation states A and B where B refines A, there can be multiple paths of intermediate navigation states 224 connecting A to B in the partial order. For convenience of definition in reference to the implementation described herein, a navigation state is considered to refine itself.

A user browses the collection of documents by visiting a sequence of one or more navigation states typically starting at the root navigation state 222. In one example, there are three basic modes of navigation among these states. The first mode is refinement, or moving from the current navigation state to a navigation state that refines it. The user can perform refinement either by adding a term through conjunctive selection to the current navigation state or by refining a term in the current navigation state; i.e., replacing a term with a refinement of that term. After the user adds or refines a term, the new term expression can be mapped to a canonical term expression according to the two-step mapping described above. The second mode is generalization, or moving from the current navigation state to a more general navigation state that the current state refines. The user can perform generalization either by removing a term from the current navigation state or by generalizing a term in the current navigation state; i.e., replacing a current term with a term that the current term refines. After the user removes or generalizes a term, the new term expression can be mapped to a canonical term expression. The third mode is simply creating a query in the form of a desired term expression, which again can be mapped to a canonical term expression to obtain a navigation state.

In search and navigation systems that can be used with the present invention, there may be additional modes of navigation. In systems that support the corresponding types of navigation states, these modes may include generalization of the navigation state through disjunctive selection, as shown in FIG. 19, as well as refinement of the navigation state through negational selection, as shown in FIG. 20. In general, terms can be combined using Boolean logic. Although term expressions that are not conjunctive do not necessarily have canonical forms, some implementations may be based on a system that uses a collection of conjunctive navigation states. One implementation is based on logical equivalence rules as described below.

Rules Engine

In one aspect of the invention, the rules engine allows an information provider, a user, or a third party to specify rules that manipulate content presentation. In certain embodiments, each rule is composed of a trigger and one or more actions. The trigger is a predicate that identifies a set of conditions that, if satisfied, activate the rule. An action specifies how the system manipulates content presentation when the rule is activated. In certain embodiments, the rules are processed and applied in order to generate a response to a query. The information provider, user, or third party can build a script that combines rules using sequential, conditional, or randomized logic.

A rule's trigger explicitly or implicitly identifies conditions, that if satisfied, make the rule applicable. In some embodiments, when the rule is processed, the conditions are evaluated using information about the query. If the query satisfies the specified conditions of the trigger, the rule's action will be performed. In certain embodiments, triggers are defined in terms of attribute-value pairs. Triggers may be defined in terms of expressions of attribute-value pairs. If the expressions of attribute-value pairs in a trigger correspond to valid navigation states in the search and navigation system, then the trigger is defined in terms of a set of navigation states that is a subset of the collection of all possible navigation states. The rule is activated when the current query, or the current navigation state responsive to that query, satisfies one or more of the expressions that make up the trigger. In other embodiments, a trigger is defined in terms of one or more keywords. The rule is activated when the current query is a free-text query that includes the specified term or terms. In some embodiments, a trigger can be defined in terms of one or more keywords in combination with an expression of attribute-value pairs.

In some embodiments, the rules engine allows a trigger to specify conditions that correspond to a single navigation state. For example, a trigger might only be activated by an initial navigation state that a user first encounters while navigating the document collection. A rule with such a trigger might be used to push content likely to be of interest to most users, such as the set of documents recently added to the collection. In contrast, a trigger might only include a single navigation state that only a fraction of users are likely to encounter. A rule with such a trigger might be used to push content likely to be of interest to only that fraction of users, such as the option to navigate to a closely related navigation state. For example, in an application that represents movies in its collection of materials, a trigger might be activated by a single-term navigation state {Genre: Comedy}. Another trigger might be activated by the conjunctive 2-term navigation state {Genre: Comedy AND Release Year: 1980-1989}. Because the latter trigger is more specific than the first trigger, it can be useful to deliver more specific supplemental content.

In some embodiments, the rules engine allows a trigger to be activated by a plurality of navigation states. This flexibility allows designers of systems with large numbers of materials to avoid the impracticality of writing a different rule for each navigation state. For example, a trigger can be activated by all possible navigation states. In addition, a trigger can be activated by some but not all of the possible navigation states. A plurality of navigation states can be identified without explicitly representing each navigation state. For example, a plurality of navigation states can be included by specifying a particular attribute-value pair and incorporating all navigation states with that attribute-value pair implicitly. For example, in an application that represents movies in its collection of materials, a trigger might be activated by all navigation states that include the term {Genre: Classics}, i.e., the single-term navigation state {Genre: Classics} as well multi-term navigation states like {Genre: Classics AND Release Year: 1980-1989}, {Genre: Classics OR Genre: Drama}.

In some embodiments, the rules engine allows a trigger to be defined in terms of the descendants of a given navigation state. Such a trigger designates a target subset of the document collection—either explicitly as a set of documents or implicitly by characterizing the navigation state—without enumerating every corresponding navigation state, and causes the rule to be activated when the present query is associated with a set of documents that are contained by the target subset. For example, in an application that represents movies in its collection of materials, a trigger might be activated by navigation states that are descendants of the single-term navigation state {Genre: Classics}; the descendants include {Genre: Classics AND Release Year: 1980-

1989} but not navigation states like {Genre: Classics OR Genre: Drama}, which is a generalizing rather than a narrowing refinement.

In some embodiments, the rules engine allows the definition of a trigger to refer to the ancestors of a given navigation state—that is, navigation states that represent generalizing refinements from the given navigation state. Such a trigger also designates a target subset of the document collection—either explicitly as a set of documents or implicitly by characterizing the navigation state—and causes the rule to be activated when the navigation state is associated with a set of documents that contain the documents in the target subset. In particular, such a rule could refer to navigation states that do not contain a document or plurality of documents. For example, in an application that represents movies in its collection of materials, a trigger might be activated by navigation states that are ancestors of the single-term navigation state {Genre: Romantic Comedy}; the ancestors include {Genre: Comedy} but not navigation states like {Genre: Romantic Comedy AND NOT Director: Woody Allen}, which is a narrowing rather than a generalizing refinement.

In some embodiments, the rules engine allows the definition of a trigger to refer to the navigation states within a given distance of a given navigation state. In some embodiments, distance may be measured using a set difference function, such as the size of the symmetric difference between two sets of attribute-value pairs. In some embodiments, distance may be measured using a graph distance function, such as the length of the shortest path in the graph of navigation states. In some embodiments, distance may be measured using a dissimilarity measure, such as the measure described in co-pending patent application "Method and System for Similarity Search and Clustering", application Ser. No. 10/027,195, filed Dec. 20, 2001, incorporated herein by reference.

In some embodiments, the rules engine allows a trigger to include Boolean operators like AND, OR, and NOT to specify an expression of attribute-value pairs, which may correspond to a navigation state or a plurality of navigation states. For example, in an application that represents movies in its collection of materials, a trigger might be activated by navigation states that are descendants of {Genre: Comedy} OR descendants of {Genre: Drama} AND are descendants of {Release Year: 1980-1989} but are NOT descendants of {Director: Woody Allen}, A trigger can also make use of additional information as a component of the query, such as information about the user. For example, in some embodiments, a trigger can use demographic information about the user to manipulate content. The information may be obtained, for example, from a user profile In some embodiments, the rules engine allows the definition of a trigger to make use of a random or pseudorandom process. For example, a trigger can be specified so that even when the present navigation state otherwise satisfies the trigger the corresponding action is only performed some fraction of the time, based on the results of a random or pseudorandom number generator.

In some embodiments, the rules engine allows the evaluation of a trigger to set or update variables that may be used by the rule's action or by subsequent rules. For example, in an application that represents movies in its collection of materials, a trigger might set a variable to be the Director term in the navigation state (if there is one), so that the action can push featured movies by that director.

The action component of a rule specifies one or more ways in which the system manipulates content presentation when that rule is activated.

In some embodiments, the rules engine allows an action to specify that a document or a plurality of documents be included as supplemental content. The included document or plurality of documents may depend on the query that activated the rule's trigger, or it may be independent of the query that activated the rule's trigger. For example, the action is dependent on the query if the document or plurality of documents that are considered for inclusion are restricted to the documents associated with the present navigation state that satisfies the query. For example, in an application that represents wines in its collection of materials, an action might specify the inclusion, as supplemental content, of a document corresponding to a featured wine associated with the current navigation state.

In some embodiments, actions of a rule may cause content to supplement a query response with documents, navigation states, queries, or other content. In the interface, supplemental content may be offered as a separate section than the results of the query or maybe itself be integrated with the results of the query.

For example, an action could cause a set of documents to be returned along with the query results. These documents could be integrated into the set of documents associated with the query results. Alternatively, the documents pushed by the rule could be returned in a section separately from the query results.

In addition, the supplemental content may itself stand alone, that is the response to the query displayed to the user may include only the results of the activated rules. Thus, in this example, the only content presented to the user would be from rules, i.e., the supplemental content would be the only content presented to users.

By way of example, a flow diagram 600 for processing a rule that supplements the given query results with additional documents is shown in FIGS. 26A-26B. Block 602 represents the rule presently being processed and block 604 represents the current navigation state, e.g., the navigation state that is directly responsive to the user's query. In step 608, the current navigation state is used to evaluate the trigger. In block 610, if the trigger is valid, i.e., has evaluated to "True," then the action is executed beginning with step 614, otherwise the rule evaluation fails as indicated in block 612. In step 614, the current navigation state 604 and the rule 602 are used to generate a new query. Subsequently, in step 616, the new query is executed on the appropriate data 606 to obtain the supplemental results that are responsive to the new query. In block 618, the results are checked to determine whether they satisfy certain criteria, namely, whether the supplemental results include at least one document and whether the results are greater than some minimum threshold of results that may have been specified in the rule. If not, the process terminates, in block 612. In step 620, the supplemental documents are sorted as specified in the action of the rule 602. In step 622, the results for the original query, i.e., the results corresponding to the navigation state 604, are also computed. In step 624, the documents corresponding to the current navigation state are then combined with the supplemental documents. In step 626, the combined results are returned by the rules engine and eventually displayed to the user. The process then terminates.

In some embodiments, an action can include supplementing the result with options to navigate to one or more navigation states. The included navigation state or plurality of navigation states may depend on the navigation state that activated the rule's trigger, or they may be independent of the navigation state that activated the rule's trigger. For example, the included navigation state or plurality of navigation states could be restricted to descendants of the navigation state that activated the rule's trigger. In an application that represents wines in its collection of materials, an action that specifies the inclusion as supplemental content of the navigation state that narrows the current state by adding the term {Rating: 96-100} is an example of this type of dependent action.

In some embodiments, an action may not only provide the option to navigate to a navigation state, but also provide a preview of the results of using such an option to navigate. Such a preview could include a document or a plurality of documents, or some other information that summarizes or otherwise describes the navigation state or states in the supplemental content. For example, in an application that represents wines in its collection of materials, an action might specify the inclusion as supplemental content of a preview of the documents in the navigation state that narrows the current state by adding the term {Rating: 96-100}.

In some embodiments, the rules engine allows an action to specify text and/or graphics as supplemental content. Such text and/or graphics may serve to promote particular content, or to fine-tune how the user experiences the content returned in response to a query. The text and/or graphics may depend on the navigation state that activated the rule's trigger, or it may be independent of the navigation state that activated the rule's trigger. For example, in an application that represents wines in its collection of materials, an action triggered by the inclusion of a term like {Price: Under $10} might specify the inclusion as supplemental content of text that says "We have the best prices in the business!".

In some embodiments, the rules engine allows an action to specify how content presented to a user is logically or physically arranged. A potential logical arrangement may arrange content into groups. These logical groups could be mapped to a physical arrangement of content such as breaking up content into discrete sections. Other kinds of arrangement may include sorting, aggregation, geometric placement, or other arrangement details. The arrangement may depend on the navigation state that activated the rule's trigger, or it may be independent of the navigation state that activated the rule's trigger. For example, in an application that represents movies in its collection of materials, an action triggered by the inclusion of a term like {Price: Under $10} might specify that movies in the navigation state are sorted by price.

In some embodiments, the rules engine allows an action to specify how content presented to a user is rendered. In the context of a visual user interface, rendering includes such considerations as font, size, and color. The rendering may depend on the navigation state that activated the rule's trigger, or it may be independent of the navigation state that activated the rule's trigger. For example, in an application that represents wines in its collection of materials, an action might specify that documents corresponding to wines with a high ratio of rating to price be annotated with a text and/or graphics indicating that these are "best buys."

In some embodiments, the rules engine allows an action to specify the inclusion of a transformation of the query with the results. This transformation may modify the query by adding, removing, or replacing attribute-value pairs or keywords. The transformation can have the effect of narrowing or generalizing the query, or can have an effect that neither narrows not generalizes the query, but otherwise modifies the query received from the user (e.g., by replacing an attribute-value pair with a related attribute-value pair that neither narrows nor generalizes the given term, or by replacing a keyword with a related attribute-value pair). The query transformation may depend on the query or navigation state that activated the rule's trigger, or it may be independent of the query or navigation state that activated the rule's trigger. For example, in an application that represents wines in its collection of materials, an action might specify that a query that included "red" in a full-text search query add {Type/Varietal: Red} as a term to generate a response to the query; this query transformation is dependent on the user's query.

In some embodiments, the rules engine allows an action to specify the setting or updating of variables to be used by subsequent rules. In some cases, an action may do nothing more than manipulate variables. Such manipulation may be useful for a rules script that uses conditional logic based on those variables. For example, a variable can be defined that stores the number of rules that have been triggered for a given navigation state; this variable would be incremented whenever a rule is triggered for that navigation state. A rules script might specify, using conditional logic, a maximum number of rules to trigger for a navigation state; it could refer to this variable in the conditional logic to determine whether to evaluate additional rules or terminate the script for that navigation state.

The action of a particular rule may include a number of individual actions. These individual actions can be combinations of different types of actions supported by the rules engine in a particular embodiment. For example, the action of a particular rule may include (1) identifying one type of supplemental content; (2) identifying a second type of supplemental content; (3) rendering the response to the query in a particular format; and (4) rendering the supplemental content in a different format.

In some embodiments, the rules engine processes the rules according to a script. The rules engine includes a component for building a script. In various embodiments, an information provider, user, or third party can build a script that combines rules using sequential, conditional, or randomized logic. In certain embodiments, the script uses the current navigation state, e.g., the navigation state responsive to the user's query, to process the rules. The current navigation state is used to evaluate triggers and perform actions.

In some embodiments, a script specifies that rules be ordered in a particular sequence. The order of rules in the sequence may affect the ordering of supplemental content displayed to the user. For example, if the actions of rules cause documents to be included as supplemental content, they may be included in the order of the rules that caused their inclusion. Since rules may also cause variables to be set or updated, the order of rules may be relevant to the overall effect of the script. For example, if a script is intended to return a maximum of 10 supplemental documents for a given navigation state, a variable may be used to store the number of supplemental documents returned as the script progresses. In this example, the order of rules is important, as it may determine which rules supply those 10 documents.

In some embodiments, a script specifies that rules be applied conditionally. In some embodiments, the rules engine allows the result of earlier rules in the sequence—in particular, variables set or updated by those earlier rules—to affect subsequent rules in the sequence. For example, if a present navigation state satisfies the trigger of an earlier rule in the sequence, then the rules engine might not consider later rules in the sequence. For example, if a script is intended to execute a maximum of 3 rules for a given navigation state, a variable may be used to store the number of rules executed as the script progresses. In this example, the order of rules is important, as it may determine which 3 rules are executed. Conditional logic may also be use to avoid duplication in the supplemental content. For example, a rule may be specified so that it does not include content already included by the execution of previous rules.

A script can specify that rules be applied using randomized logic. For example, the rules engine, rather than execute deterministically, could choose which rules to execute according to a procedure that includes a random or pseudo-random process.

Implementation

The knowledge base is transferred to a navigable data structure in order to implement the system. The navigation states may be fully precomputed, computed dynamically at run-time, or partially precomputed. A cache may be used to avoid redundant computation of navigation states.

In preferred embodiments, the collection of conjunctive navigation states may be represented as a graph—preferably, a directed acyclic multigraph with labeled edges. A graph is a combinatorial structure consisting of nodes and edges, where each edge links a pair of nodes. The two nodes linked by an edge are called its endpoints. In some systems that can be used in conjunction with the present invention, the nodes correspond to conjunctive navigation states, and the edges represent transitions that refine from one conjunctive navigation state to another. Since refinement is directional, each edge is directed from the more general node to the node that refines it. Because there is a partial order on the navigation states, there can be no directed cycles in the graph, i.e., the graph is acyclic. Preferably, the graph is a multigraph, since it allows the possibility of multiple edges connecting a given pair of nodes. Each edge is labeled with a term. Each edge has the property that starting with the term set of the more general end point, adding the edge term, and using the two-step map to put this term set into canonical form leads to a refinement which results in the navigation state that is the other endpoint. That is, each edge represents a refinement transition between nodes based on the addition of a single term.

The following definitions are useful for understanding the structure of the graph: descendant, ancestor, least common ancestor (LCA), proper ancestor, proper descendant, and greatest lower bound (GLB). These definitions apply to the refinement partial order among terms and among nodes. If A and B are terms and B refines A, then B is said to be a descendant of A and A is said to be an ancestor of B. If, furthermore, A and B are distinct terms, then B is said to be a proper descendant of A and A is said to be a proper ancestor of B. The same definitions apply if A and B are both nodes.

If C is an ancestor of A and C is also an ancestor of B, then C is said to be a common ancestor of A and B, where A, B, and C are either all terms or all nodes. The minimal elements of the set of common ancestors of A and B are called the least common ancestors (LCAs) of A and B. If no term has a pair of incomparable ancestors, then the LCA of two terms—or of two nodes—is unique. For example, the LCA of Origin: Argentina and Origin: Chile is Origin: South America in the partial order of terms 110 of FIG. 14B. In general, however, there may be a set of LCAs for a given pair of terms or nodes.

In an implementation that fully precomputes the collection of nodes, computation of the nodes in the graphs is preferably performed bottom-up.

The leaf nodes in the graph—that is, the nodes corresponding to leaf navigation states—may be computed directly from the classified documents. Typically, but not necessarily, a leaf node will correspond to a set containing a single document. The remaining, non-leaf nodes are obtained by computing the LCA-closure of the leaf nodes—that is, all of the nodes that are the LCAs of subsets of the leaf nodes.

The edges of the graph are determined according to a refinement function, called the R function for notational convenience. The R function takes as arguments two nodes A and B, where A is a proper ancestor of B, and returns the set of maximal terms such that, if term C is in R (A, B), then refining node A with term C results in a node that is a proper descendant of A and an ancestor (not necessarily proper) of B. For example, in FIG. 17, R ({Type/Varietal: Red}, {Type/Varietal: Merlot AND Origin: Argentina AND Vintage: 1998})={Type/Varietal: Merlot AND Origin: South America AND Vintage: 1998}. If $B_1$ is an ancestor of $B_2$, then R (A, $B_1$) is a subset of R (A, $B_2$)—assuming that A is a proper ancestor of both $B_1$ and $B_2$. For example, R ({Type/Varietal: Red}, {Type/Varietal: Red AND Origin: South America})={Origin: South America}.

In the graph, the edges between nodes A and B will correspond to a subset of the terms in R (A, B). Also, no two edges from a single ancestor node A use the same term for refinement. If node A has a collection of descendant nodes $\{B_1, B_2, \ldots\}$ such that term C is in all of the R (A, $B_i$), then the only edge from node A with term C goes to LCA ($B_1$, $B_2, \ldots$), which is guaranteed to be the unique maximal node among the $B_i$. In FIG. 17, for example, the edge from node {Type/Varietal: Red} with term Origin: South America goes to node {Type/Varietal: Red AND Origin: South America} rather than to that node's proper descendants {Type/Varietal: Merlot AND Origin: South America AND Vintage: 1998} and {Type/Varietal: Red AND Origin: Chile}. The LCA-closure property of the graph ensures the existence of a unique maximal node among the $B_i$. Thus, each edge maps a node-term pair uniquely to a proper descendant of that node.

The LCA-closure of the graph results in the useful property that, for a given term set S, the set of nodes whose term sets refine S has a unique maximal node. This node is called the greatest lower bound (GLB) of S.

The graph may be computed explicitly and stored in a combinatorial data structure; it may be represented implicitly in a structure that does not necessarily contain explicit representations of the nodes and edges; or it may be represented using a method that combines these strategies. Because the search and navigation system will typically operate on a large collection of documents, it is preferred that the graph be represented by a method that is scalable.

The graph could be obtained by computing the LCAs of every possible subset of leaf nodes. Such an approach, however, grows exponentially in the number of leaf nodes, and is inherently not scalable. An alternative strategy for obtaining the LCA closure is to repeatedly consider all pairs of nodes in the graph, check if each pair's LCA is in the graph, and add that LCA to the graph as needed. This strategy, though a significant improvement on the previous one, is still relatively not scalable.

A more efficient way to precompute the nodes is to process the document set sequentially, compute the node for each document, and add that node to the graph along with any other nodes necessary to maintain LCA-closure. The system stores the nodes and edges as a directed acyclic multigraph. The graph is initialized to contain a single node corresponding to the empty term set, the root node. Referring to FIG. 18, in process 230 for inserting a new node into the graph, in step 232, for each new document to be inserted into the graph that does not correspond to an existing node, the system creates a new node. In step 234, before inserting the new node into the graph, the system recursively generates and inserts any missing LCA nodes between the root node (or ancestor node) and the new node. To ensure LCA-closure after every node insertion, the system inserts the document node last, in steps 236 and 238, after inserting all the other nodes that are proper ancestors of it.

Inserting a new node requires the addition of the appropriate edges from ancestors to the node, in step 236, and to descendants out of the new node, in step 238. The edges into the node are preferably determined by identifying the ancestors that have refinement terms that lead into the new node and do not already have those refinement terms used on edges leading to intermediate ancestors of the new node. The edges out of the node are preferably determined by computing the GLB of the new node and appropriately adding edges from the new node to the GLB and to nodes to which the GLB has edges.

The entire graph of conjunctive navigation states may be precomputed by following the above procedures for each document in the collection. Computation of other types of navigation states is discussed below. Precomputing of the graph may be preferred where the size of the graph is manageable, or if users are likely to visit every navigation state with equal probability. In practice, however, users typically visit some navigation states more frequently than others. Indeed, as the graph gets larger, some navigation states may never be visited at all. Unfortunately, reliable predictions of the frequency with which navigation states will be visited are difficult. In addition, it is generally not practical to precompute the collection of navigation states that are not conjunctive, as this collection is usually much larger than the collection of conjunctive navigation states.

An alternative strategy to precomputing the navigation states is to create indexes that allow the navigation states to be computed dynamically. Specifically, each document can be indexed by all of the terms that are associated with that document or that have refinements associated with that document. The resulting index is generally much smaller in size than a data structure that stores the graph of navigation states. This dynamic approach may save space and precomputation time, but it may do so at the cost of higher response times or greater computational requirements for operation. A dynamic implementation may use a one-argument version of the R function that returns all refinement terms from a given navigation state, as well a procedure for computing the GLB of a term set.

It is also possible to precompute a subset of the navigation states. It is preferable to precompute the states that will cost the most to compute dynamically. For example, if a state corresponds to a large subset of the documents, it may be preferable to compute it in advance. In one possible partial-precomputation approach, all navigation states, particularly conjunctive ones, corresponding to a subset of documents above a threshold size may be precomputed. Precomputing a state is also preferable if the state will be visited frequently. In some instances it may be possible to predict the frequency with which a navigation state will be visited. Even if the frequency with which a navigation state will be visited cannot be predicted in advance, the need to continually recompute can be reduced by caching the results of dynamic computation. Most recently or most frequently visited states may be cached.

As described above with respect to the interface, the system supports at least three kinds of navigational operations—namely refinement, generalization, and query by specifying an expression of terms. These operations may be further described in terms of the graph. For query refinement, the system enumerates the terms that are on edges from the node corresponding to the current navigation state. When the user selects a term for refinement, the system responds by presenting the node to which that edge leads. Similarly, for query generalization options, the system enumerates and selects edges that lead to (rather than from) the node corresponding to the current navigation state. Alternatively, query generalization may be implemented as a special case of query by specifying a set of terms. For query by specifying a set of keywords, the system creates a virtual node corresponding to the given term set and determines the GLB of the virtual node in the graph. If no GLB is found, then there are no documents that satisfy the query. Otherwise, the GLB node will be the most general node in the graph that corresponds to a navigation state where all documents satisfy the query.

The above discussion focuses on how the system represents and computes conjunctive navigation states. The user interface may allows users to navigate among the collection of conjunctive navigation states. In some cases, users may be able to navigate to navigation states that are not conjunctive. In particular, when the system supports navigation states that are not conjunctive, the user interface may allow users to select terms disjunctively or negationally.

If the system includes navigation states that are both conjunctive and disjunctive (e.g., {(Products: DVDs OR Products: Videos) AND Director: Spike Lee}), then in some embodiments, the system only precomputes a subset of the states, particularly if the total number of navigation states is likely to be too large to maintain in memory or even secondary (e.g., disk) storage. By using rules for equivalence of Boolean expressions, it is possible to express any navigation state that mixes conjunction and disjunction in terms of a union of conjunctive navigation states. The above example can be rewritten as {(Products: DVDs AND Director: Spike Lee) OR (Products: Videos AND Director: Spike Lee)}. This approach leads to an implementation combining conjunctive and disjunctive navigation states based on the above discussion, regardless of whether all, some, or none of the graph of conjunctive navigation states is precomputed.

In preferred embodiments, disjunctive selections may be made within, but not between, attributes. When determining the set of disjunctive generalizations, the system does not consider other terms from the attribute of the given disjunction to be in the navigation state. For example, if the navigation state is {Type/Varietal: Red AND Origin: Chile} and the system is allowing the disjunctive selection of other countries of origin, then the GLB and R function will be applied to the set {Type/Varietal: Red} rather than to {Type/Varietal: Red AND Origin: Chile}. Accordingly, the other terms for the attribute of country of origin that are incomparable to "Chile" become generalization options for the navigation state.

If the system includes navigation states that use negation (e.g., {Products: DVDs AND Genre: Comedy AND (NOT Director: Woody Allen)}), then the negationally selected terms can be applied to navigation states as a post-process filtering operation. The above example can be implemented by taking the conjunctive navigation state {Products: DVDs AND Genre: Comedy} and applying a filter to it that excludes all movies associated with the term Director: Woody Allen. This approach leads to an implementation including negational navigation states based on the above discussion, regardless of whether all, some, or none of the graph of conjunctive navigation states is precomputed.

As with disjunction, when determining the set of negational generalizations, the system does not consider other terms from the attribute of the given negation to be in the navigation state. For example, if the navigation state is {Medium: Compact Disc AND Artist: Prince} and the system is allowing the negational selection of other artists (e.g., {Artist: Prince AND NOT (Artist: The Revolution)}), then the GLB and R function will be applied to the set {Medium: Compact Disc} rather than to {Medium: Compact Disc AND Artist: Prince)}.

Another aspect of the system is the interpretation of free-text search queries. As discussed above,, a free-text query may be interpreted in two ways. A single-term interpretation maps the query to an individual term in the knowledge base. A multi-term interpretation maps the query to a conjunction of two or more terms in the knowledge base—that is, a combination of terms that corresponds to a conjunctive navigation state.

A free-text query may be formed of one or more words. In one example, a single-term interpretation of a free-text query maps the query to a term that either contains or is associated with a word or words in that query. A query may have more than one single-term interpretation. For example, a query of computer science might have {Department: Computer Science Department} and {School: School of Computer Science} as single-term interpretations. For another example, a query of zinfandel might have {Wine Type: Zinfandel} and {Wine Type: White Zinfandel} as single-term interpretations. Various query semantics can be used to parse the search query and determine the set of single-term interpretations for a given free-text query. Under conjunctive query semantics, a matching term must contain all of the words in the query. Under disjunctive query semantics, a matching term must contain at least one of the words in the query. Under partial match query semantics, a matching term must contain a subset of the words in the query; the particular rules are application-dependent. It is also possible to vary the above to meet particular application needs. Variations include ignoring common "stop words" such as the and of, treating related words or word forms (e.g., singular and plural forms of nouns, or synonyms) as equivalent, automatic spelling correction, allowing delimited phrases (i.e., two or more words required to occur contiguously in a phrase), and support for negation (i.e., excluding terms that contain particular words).

By way of example, in some systems, a multi-term interpretation of a free-text query maps the query to a conjunction of terms that either contain or are associated with a word or words in that query and that correspond to a conjunctive navigation state in the system. A query may have more than one multi-term interpretation. For example, a query of security books might have {Media Type: Books AND Subject: Computer Security} and {Media Type: Books AND Subject: Financial Security} as multi-term interpretations. As with single-term interpretations, various query semantics can be used to parse the query and determine the set of multi-term interpretations for a given free-text query. Under conjunctive query semantics, a matching conjunction of terms must contain all of the words in the query. Under partial match query semantics, a matching conjunction of terms must contain a subset of the words in the query; the particular rules are application-dependent. It is also possible to vary the above to meet particular application needs. Variations, as discussed above, include ignoring common "stop words", treating related words or word forms as equivalent, automatic spelling correction, allowing delimited phrases, and support for negation. Regardless of the query semantics used, multi-term interpretations are themselves conjunctions of terms, and therefore preferably correspond to conjunctive navigation states.

In typical embodiments, one-word queries will only have single-term interpretations, while multi-word queries may have single-term interpretations, multi-term interpretations, or both. For example, a query of casual shoes might have {Type: Casual Shoes} as a single-term interpretation and {Type: Athletic Shoes AND Merchant: Casual Living} as a multi-term interpretation.

In some systems, a multi-term interpretation is minimal—that is, the removal of any term from the interpretation would result in an interpretation that no longer satisfies the query. For example, the conjunction of terms {Media Type: Books AND Subject: Computer Security} is a minimal interpretation of the query security books; it is not, however, a minimal interpretation of the query computer security, since removing the term {Media Type: Books} results in the single-term interpretation {Subject: Computer Security} that satisfies the query. For another example, the conjunction of terms {Flower Type: Red Roses AND Quantity: Dozen} is a minimal interpretation of the query dozen red roses; in contrast, the conjunction of terms {Flower Type: Red Roses AND Quantity: Dozen AND Color: Red} is not a minimal interpretation for this query, since removing the term {Color: Red} results is a minimal multi-term interpretation that satisfies the query. In some systems, disjunctive query semantics are not used for multi-term interpretations. Under disjunctive query semantics, all minimal interpretations of a query are single-term interpretations. Single-term interpretations are always minimal, since there is only one term to remove.

In some systems, the computation of single-term search results uses an inverted index data structure that maps words to the terms containing them. Conjunctive query semantics may be implemented by computing the intersection of the term sets returned by looking up each query word in the inverted index, while disjunctive query semantics may be implemented by computing the union of the term sets.

In some systems, the computation of multi-term search results uses both an inverted index data structure that maps words to the terms containing them and an inverted index data structure that maps terms to the materials associated with them.

In some systems, the computation of multi-term search results that correspond to conjunctive navigation states involves a four step procedure. However, alternative procedures may be used. The steps of an algorithm 600 for receiving a query and returning the multi-term search results are indicated in FIG. 23.

Once a query is received in step 610, in the first step 620, the system determines the set of terms that contain at least one word in the search query. This step is equivalent to computing single-term search results using disjunctive query semantics.

In the second step 630, the system partitions the set of terms into equivalence classes. Each equivalence class corresponds to a non-empty subset of words from the query. Two terms which match the same subset of words in the query will be assigned to the same equivalence class.

In the third step 640, the system considers the word subsets corresponding to the equivalence classes from the previous step, and computes which combinations of these subsets correspond to minimal interpretations of the query. A combination of subsets corresponds to a minimal interpretation if its union is equal to the entire query, but the removal of any of its subsets causes the union to not be equal to the entire query.

In the fourth step 650, the system considers, for each combination of subsets that corresponds to a minimal interpretation, the set of multi-term interpretations that can be obtained from terms in the corresponding equivalence classes. These multi-term interpretations can be computed by enumerating, for each combination of subsets, all possible ways of choosing one term from each of the equivalence classes in the combination. Each resulting set of terms that corresponds to a conjunctive navigation state is added to the set of search results as a single-term (if it only contains one term) or multi-term interpretation. Finally in step 660, the results are returned.

For example, a search query of 1996 sweet red in the wines domain obtains multi-term interpretations as follows.

In the first step, the following terms contain at least one of the words in the query:
Year: 1996
Wine Types: Sweet Wines
Flavors: Sweet
Wine Types: Appellational Red
Wine Types: Red Wines
Wineries: Red Birch
Wineries: Red Hill
In the second step, there are 3 equivalence classes:
Terms containing 1996
    Year: 1996
Terms containing sweet
    Wine Types: Sweet Wines
    Flavors: Sweet
Terms containing red
    Wine Types: Appellational Red
    Wine Types: Red Wines
    Wineries: Red Birch
    Wineries: Red Hill In the third step, there is 1 combination of equivalence classes that is a minimal interpretation—namely, the combination of all 3 equivalence classes.

In the fourth step, the 8 candidates for minimal interpretations are:
{Year: 1996 AND Wine Types: Sweet Wines AND Wine Types: Appellational Red}
{Year: 1996 AND Wine Types: Sweet Wines AND Wine Types: Red Wines}
{Year: 1996 AND Wine Types: Sweet Wines AND Wineries: Red Birch}
{Year: 1996 AND Wine Types: Sweet Wines AND Wineries: Red Hill}
{Year: 1996 AND Flavors: Sweet AND Wine Types: Appellational Red}
{Year: 1996 AND Flavors: Sweet AND Wine Types: Red Wines}
{Year: 1996 AND Flavors: Sweet AND Wineries: Red Birch}
{Year: 1996 AND Flavors: Sweet AND Wineries: Red Hill}

Of these, the following map to conjunctive navigation states in the system and are thus returned as search results:
{Year: 1996 AND Wine Types: Sweet Wines AND Wineries: Red Birch}
{Year: 1996 AND Wine Types: Sweet Wines AND Wineries: Red Hill}
{Year: 1996 AND Flavors: Sweet AND Wine Types: Appellational Red}
{Year: 1996 AND Flavors: Sweet AND Wine Types: Red Wines}
{Year. 1996 AND Flavors: Sweet AND Wineries: Red Birch}
{Year: 1996 AND Flavors: Sweet AND Wineries: Red Hill}

The other two minimal interpretations do not having matching documents and do not map to a navigation state in the system.

For another example, a search query of casual shoes obtains multi-term interpretations as follows.

In the first step, the following terms contain at least one of the words in the query:
Type: Casual Shoes
Merchant: Casual Living
Brand: Casual Workstyles
Type: Athletic Shoes
Type: Dress Shoes
Brand: Goody Two Shoes
Merchant: Simple Shoes
In the second step, there are 3 equivalence classes:
Terms containing casual
    Merchant: Casual Living
    Brand: Casual Workstyles
Terms containing shoes
    Type: Athletic Shoes
    Type: Dress Shoes
    Brand: Goody Two Shoes
    Merchant: Simple Shoes
Terms containing both casual and shoes
    Type: Casual Shoes In the third step, there are 2 combinations of equivalence classes that are minimal interpretations. The first combination consists of the first two equivalence classes. The second combination consists of the third equivalence class by itself.

In the fourth step, the 9 candidates for minimal interpretations are:
{Merchant: Casual Living AND Type: Athletic Shoes}
{Merchant: Casual Living AND Type: Dress Shoes}
{Merchant: Casual Living AND Brand: Goody Two Shoes}
{Merchant: Casual Living AND Merchant: Simple Shoes}
{Brand: Casual Workstyles AND Type: Athletic Shoes}
{Brand: Casual Workstyles AND Type: Dress Shoes}
{Brand: Casual Workstyles AND Brand: Goody Two Shoes}
{Brand: Casual Workstyles AND Merchant: Simple Shoes}
{Type: Casual Shoes}

Of these, the following map to conjunctive navigation states in the system and are thus returned as search results:
{Merchant: Casual Living AND Type: Athletic Shoes}
{Type: Casual Shoes}

The other minimal interpretations do not have matching documents and do not map to a navigation state in the system. For example, the brand Casual Workstyles does not sell Athletic Shoes in the system.

Another aspect of the system is its scalability through parallel or distributed computation. One way to define scalability in a search and navigation system is in terms of four problem dimensions: the number of materials in the collection, the number of terms associated with each material in the collection, the rate at which the system processes queries (throughput), and the time necessary to process a query (latency). In this definition, a system as scalable if it can be scaled along any of these four dimensions at a subquadratic cost. In other words:

1. If the number of materials in the collection is denoted by the variable $n_1$ and the other three problem dimensions are held constant, then the resource requirements are subquadratic in $n_1$.
2. If the number of terms associated with each material in the collection is denoted by the variable $n_2$ and the other three problem dimensions are held constant, then the resource requirements are subquadratic in $n_2$.
3. If the number of queries that the system processes per second (i.e., the throughput) is denoted by the variable $n_3$ and the other three problem dimensions are held constant, then the resource requirements are subquadratic in $n_3$.
4. If the time necessary to process a query (i.e., the latency) is denoted by the variable $n_4$ and the other three problem dimensions are held constant, then the resource requirements are subquadratic in $1/n_4$.

Preferably, these resource requirements would be not only subquadratic, but linear. Also included within the concept of scalability, there is an allowance for overhead in creating a network of distributed resources. Typically, this overhead will be logarithmic, since the resources may be arranged in a hierarchical configuration of bounded fan-out.

In some embodiments, the system surmounts the limitations of a single computational server's limited resources by allowing for distributing the task of computing the information associated with a navigation state onto a hierarchy of multiple computational servers that act in parallel.

One insight that drives this feature is that it is possible to partition the collection of materials among multiple "slave" servers, all of which implement the single-server algorithm for multidimensional navigation, and then to have a "master" server compute navigation states by passing requests onto the set of slave machines and combining the responses. From the outside, the collection of servers appears to act like a single server, but with far greater computational resources than would be possible on a single computational device. Indeed, the distinction between master and slave servers is arbitrary; a slave server can itself have slaves, thus creating a nested hierarchy of servers. Such nesting is useful when the number of slaves exceeds the fan-out capability of a single master server. An exemplary embodiment of such a system is illustrated in FIG. 24. In the hierarchical arrangement 500, a master server 520 works with slave servers 530, 540. In the hierarchical arrangement shown, slave servers 530 are in turn master servers with respects to slave servers 540. The search and navigation results are made available to a user on a terminal 510 through a user interface.

The collection of materials may be partitioned by splitting (arbitrarily or otherwise) the materials into disjoint subsets, where each subset is assigned to its own server. The subsets may be roughly equal in size, or they might vary in size to reflect the differing computational resources available to each server.

The algorithm for distributing the task of computing the information associated with a navigation state includes three steps. The steps of the algorithm are indicated in FIG. 24. In the first step, the query, which is a request for a valid navigation state, is submitted to the master server 520, which forwards the query to each of the slave servers 530. If the servers are nested, the requests are forwarded through the hierarchy of servers 500 until they reach the leaf servers 540 in the hierarchy. In the second step, each slave server 530, 540 processes the query independently, based on the subset of the collection of materials that is in its partition. In the third step, the master server 520 combines the responses from the slave servers to produce a response for the original query. The master server 520 returns the response to the terminal 510.

The master server receives the original request and farms it out to the slave servers. Thus, in preferred embodiments, the only computation performed by the master server is to combine the results from the slave servers. Each slave server that receives a request computes the navigation state based on the subset of the collection assigned to it. The computation may involve any combination of conjunction, disjunction, and negation.

The master server, in contrast, only performs a combination step. The combination step involves producing a valid navigation state, including documents and corresponding refinement options, from the responses from the slave servers. Since the collection of materials has been partitioned into disjoint subsets, the documents identified by each of the slave servers can be combined efficiently as a disjoint union. Combining the various refinement options returned by each of the slave servers may require additional processing, as described below.

The slave servers all process the same query, but on different partitions of the collection of materials. They will generally return different sets of refinement options because a set of refinement options that is valid for one partition may be invalid for another. If the different sets are disjoint, and if the refinement options involve terms that do not themselves have refinement relationships, then the combination is a disjoint union.

Typically, there will be some overlap among the different sets of refinement options returned by each slave server. If the sets are not disjoint, duplicates can be eliminated in this combination step.

When there are refinement relationships among the terms that are refinement options returned by the slave servers, the combination algorithm computes, for every set of related terms, the least common ancestor or ancestors (LCA) of the terms, as defined by the partial order among the terms. One algorithm for combining the refinement options is outlined in FIG. 25. In step 552, the master server receives and takes the union of all of the terms, $x_1, x_2, \ldots x_n$, returned as refinement options for the navigation state from the slave servers. In step 554, the master server computes the set of ancestors $A_1, A_2, \ldots An$, for each of the terms, $x_1, x_2, \ldots xn$, respectively. In step 556, the master server computes the intersection A of all of the sets of ancestors, $A_1, A_2, \ldots An$. In step 558, the master server computes the set M of minimal terms in A. The set M, formed of the least common ancestors of the terms $x_1, x_2, \ldots x_n$, returned by the slave servers, is the set of refinement options corresponding to the result navigation state. This combination procedure is applied whether the refinement options are conjunctive, disjunctive, or negational.

In summary, the master server receives a request for a navigation state, forwards this request to each of the slave servers, combines their results with a union operation, and then computes, for every set of terms, the least common ancestor or ancestors of the set.

There are at least two ways to compute the LCA of the terms. One approach is to store all non-leaf terms on the master server. This strategy is reasonably memory efficient, since, in practice, most of the terms are leaves (minimal elements) in the partial order. A second approach is to include the ancestors when returning the terms that are refinements. This approach saves memory at the expense of increasing the size of the data being transferred. The latter overhead is reasonable, since, in practice, a term typically has very few ancestors.

The task of computing results for a free-text search query may also be distributed. In the arrangement described above, for example, the master can simply compute the union of the free-text search results returned by the slave servers. This approach applies to both single-term and multi-term search under both conjunctive and disjunctive query semantics. More complex approaches may be used to accommodate customized query semantics.

Implementation of Rules Engine

Some embodiments of the present invention include an implementation of the rules engine that defines a language for specifying a rules script and a system for executing that rules script to manage the presentation of content.

In some embodiments in which a trigger is defined in terms of expressions of attribute-value pairs, a trigger is a function that takes a query or its corresponding navigation state as an argument and returns a Boolean value. When the rule is processed, the trigger is first evaluated. When the trigger is evaluated, a return value of true indicates that the query or navigation state satisfies the criteria for activating the rule, while a return value of false indicates that the query or navigation state does not satisfy the criteria for activating the rule. The action is only executed if the trigger is true.

In one embodiment of the present invention, the language for specifying a trigger may include the following Boolean-valued functions:

Query.Equals(Q: Query) returns true if the query being considered by the rule is equal to Q, false otherwise.

Navigation_State.Equals(N: Navigation_State) returns true if the navigation state being considered by the rule is equal to N, false otherwise.

Query.Contains_Attribute_Value_Pair(A: Attribute, V: Value) returns true if the query contains the attribute-value pair (A, V), false otherwise.

Navigation_State.Contains_Attribute_Value_Pair(A: Attribute, V: Value) returns true if the navigation state contains the attribute-value pair (A, V), false otherwise.

Query.Contains_Keyword (K: Keyword) returns true if the query contains the keyword (K), false otherwise.

Navigation_State.Is_Ancestor_Of(N: Navigation_State) returns true if the navigation state being considered by the rule is an ancestor of N, false otherwise.

Navigation_State.Is_Descendant_Of(N: Navigation_State) returns true if the navigation state being considered by the rule is a descendant of N, false otherwise.

Navigation_State.Contains_Document(D: Document) returns true if the navigation state being considered by the rule contains document D, false otherwise.

True is simply the literal Boolean value for true.

In some embodiments of the present invention, the language for specifying a trigger includes the Boolean operators AND, OR, and NOT.

In some embodiments of the present invention, the language for specifying a trigger allows for variables local to the rule to be populated based on the navigation state being considered by the rule. Such variables might correspond to terms in the navigation state, and could be specified positionally (e.g., the second term in the navigation state) or in terms of the partial order of terms (e.g., the term or terms in the navigation state that are descendants of a given term). These variables, once populated, can be used by the rule's action.

In one embodiment of the present invention, the language for specifying an action may include the following operations or a combination thereof:

Include_Document(D: Document), where document D either is hard-coded or is partially or fully determined based on variables populated by the trigger.

Include_Query(Q: Query), where query Q either is hard-coded or is partially or fully determined based on variables populated by the trigger. In some embodiments of the present invention, this operation might provide a preview of the navigation state corresponding to query Q. Such a preview could include a document or a plurality of documents, or some other information that summarizes or otherwise describes the navigation state.

Include_Navigation_State(N: Navigation_State), where navigation state N either is hard-coded or is partially or fully determined based on variables populated by the trigger. In some embodiments of the present invention, this operation might provide a preview of the included navigation state. Such a preview could include a document or a plurality of documents, or some other information that summarizes or otherwise describes the navigation state.

Include_Text(T: Text), where text T either is hard-coded or is partially or fully determined based on variables populated by the trigger.

Include_Graphics (G: Graphics), where graphics G either is hard-coded or is partially or fully determined based on variables populated by the trigger.

In some embodiments of the present invention, the language for specifying an action includes operations for filtering, sorting, aggregation, and truncation. These operations can be applied to documents or navigation states. These operations can be applied to query results, to content pushed by rules, or to both. In some embodiments of the present invention, these operations may act in a way that either is hard-coded or is partially or fully determined based on variables populated by the trigger. In some embodiments of the present invention, these operations may make use of randomization.

Document filtering may reduce the number of documents in the query results or the content pushed by rules by restricting the documents in either or both sets to those satisfying a predicate, e.g., the documents containing a particular term specified by the rule. In some embodiments, a document filter can be composed using Boolean operations. Navigation state filtering is analogous, only that it is applied to the set of navigation states included in the results or pushed content rather than to the documents.

Document sorting may reorder the documents in the results, e.g., ordering them by recency or popularity. In some embodiments, a document sort key can be based on explicitly represented document information or can be derived from such information. Navigation state sorting is analogous, only that it is applied to the set of navigation states included in the results or pushed content rather than to the documents.

Document aggregation may group the documents in the results into equivalence classes based on an explicit or derived property of those documents. In some embodiments, the aggregation key can be specified using an attribute or plurality of attributes. In some embodiments, the aggregation key can be based on explicitly represented document information or can be derived from such information.

Document truncation may reduce the number of documents in the results by restricting them to a particular number of documents. In some embodiments, truncation respects document ordering, i.e., truncating to 10 documents eliminates all but the first 10 documents from the results. Navigation state truncation is analogous, only that it is applied to the set of navigation states included in the results rather than to the documents.

These operations may act in a way that either is hard-coded or is partially or fully determined based on variables populated by the trigger. For example, a rule may filter included documents to include only those that contain a majority of the terms in the navigation state. Alternatively, a rule may sort included documents by the first term in the navigation state. In yet another example, a rule may include a number of navigation states that is truncated based on the number of terms in the navigation state.

In some embodiments of the present invention, these operations may make use of randomization. For example, a rule may determine a set of candidate documents or navigation states to include, and then use a random or pseudo-random process to determine which of those candidates to actually include.

In embodiments of the invention, a single rule may use one or more of these operations. It may order and apply them in any combination, possibly using the same operation more than once. For example, a set of included documents may be (1) filtered, then (2) sorted according to a given sort key, then (3) aggregated according to a given aggregation key, and then (4) truncated to 10 aggregates.

In some embodiments of the present invention, a language allows a rule or plurality of rules to be specified in a script. In such an embodiment, rules may be combined using sequential, conditional, or randomized execution.

In sequential execution, rules are considered in the order they are specified. For example if two rules triggered by the same query or navigation state are executed sequentially, then the first rule is considered before the second. Sequential execution may be used for prioritization: for example, higher priority rules may be considered before lower priority rules, and the priority may be reflected in the order of results.

In conditional execution, the execution of a rule depends on specified criteria. In some embodiments of the present invention, conditional execution can be specified using if . . . then . . . else logic. Conditional execution may be combined with sequential execution: the results of considering an earlier rule may partially or completely determine whether a later rule is executed. For example, a rule may be specified to conditionally execute only if less than 3 previous rules have been executed for a given query or navigation state.

In randomized execution, the execution of a rule depends on a random or pseudorandom process. For example, a rule may be specified as executing only half the time that it is considered, in order to vary the results randomly. Randomized execution may be useful in combination with conditional execution. For example, it may be used to execute a randomly selected subset of 3 out of 10 applicable rules.

In some embodiments of the present invention, the execution of a rules script for a given query or navigation state includes the identification of applicable rules and the execution of those applicable rules. In some embodiments, the identification of applicable rules by evaluating their triggers precedes their execution; for example, the identified rules may be batched up before any are executed. In other embodiments, the identification of applicable rules may be interleaved with their execution; for example, a rule may be executed as soon as it is identified as applicable.

In some embodiments of the present invention, specified rules may be stored in a linear array. On evaluation of a query, the array may be scanned looking for the applicable rules for a given query or navigation state by evaluating to see if the rule's criteria are met by the query or navigation state. Such a scan approach may be utilized, for example, if the number of rules is not so large as to raise performance concerns.

In addition, the script may specify the step of selecting a subset of rules before processing the rules to narrow the overall set of rules to those that are, for example, more likely to evaluate to true in the given query or navigation state, but without actually evaluating their triggers. In some embodiments of the present invention, the selected rules to be processed may be identified using index structures that map terms to rules that may be triggered by the presence of those terms in the query or navigation state. The use of such index structures may address performance concerns that arise from a large number of rules. Once a subset of the rules has been selected, their execution depends on the sequential, conditional, and randomized logic specified in the rule script.

In accordance with the sequential logic of the rules script, the rules are considered in order. The order of rules may be represented by assigning an order field to each rule, e.g., 1, 2, 3, . . . In some embodiments of the present invention, a plurality of rules might be assigned the same order value in order to indicate that those rules can be performed in arbitrary order, thus making the ordering of rules a partial rather than total order.

In accordance with the conditional logic of the rules script, the execution of a rule depends on two factors. The first factor is any conditional criterion specified for the rule, such as an expression that depends on the results of executing previous rules. Conditional criteria need not be specified for every rule, in which case the second factor is always true for that rule. The second factor is the trigger. Only if both of these evaluate to true is the action of a rule performed. For example, conditional logic and sequential logic may be incorporated in a rule script that includes a set of ten rules numbered 1 to 10, to be executed in numerical sequence. But the evaluation of rules in this set is subject to the condition that a maximum of 2 of these rules may be executed in a single pass, e.g., for a single query from the user, after which time the remaining rules in the group are no longer considered. Logic is built into the script to process the rules sequentially, while also keeping track of how many rules have been performed (i.e., the rule condition and trigger have both been met and the action has been performed) for the given query.

FIG. 30 shows a script 660 constructed in accordance with an embodiment of the invention for a collection of materials relating to wines. The script 660 uses sequential logic, and includes seven rules. The script 660 uses the current query to process the rules. For each rule, the script 660 includes its number in the sequence, defined as Rule # in column 662, any applicable conditions, defined as Rule Condition in column 664, the trigger, defined as Trigger Predicate in column 668, and the action, defined as Action(s) in column 668.

Rule #1 has no corresponding conditions, thus Rule Condition 664 is always set to "True." Rule #1 also has a trigger that is always set to "True;" thus, Rule #1 is applied to the results of every query. Rule #1 specifies in the Action(s) 670 that the result includes documents responsive to the query that have a rating in the specified range. X is a variable that represents the number of rules that have already been applied to include documents in the desired content for that query. X is initially set to zero. X is incremented after the action is performed.

As indicated by Rule Condition 664, Rule #2 is only evaluated if X<3. The Trigger Predicate 668 for Rule #2 is satisfied if the current query includes the attribute-value pair {Type:Varietal:Champagne}. In that case, Dom Perignon 1972 is added to the result. X is incremented. A second variable Y is also set to "True." Y is used in the Rule Condition 664 of Rule #3—in part because of the way the Rule Condition 664 and Trigger Predicate 668 for Rule #3 is specified, Rule #2 and Rule #3 are alternatives and only one of the two will be applied for a given query.

Rule #4 uses a Keyword in its Trigger Predicate 668. If the word "cheap" is in the query, then the Action(s) 670 specifies that the results are sorted by Price. Here, X is not incremented because the action Sort_Results does not add documents to the result.

Rules #5 and #6 have Trigger Predicates 668 defined in terms of descendants of attribute-value pairs. Rule #7 has an Action(s) 670 that generates a new query by adding a term to the query disjunctively.

In some embodiments of the present invention, randomized logic can be implemented using standard random or pseudorandom number generators. Randomized logic in the script, for example, in a rule condition, can also be combined with randomized logic in the trigger of a rule.

In another example of the execution of a rule, the rules engine could execute another query composed using the originating navigation state and include the results of that navigation state in the displayed response of the query. In this example, the invention could take the navigation state, add a specific element and execute another query with the augmented navigation state. The results of this secondary query could be then sorted and a subset of which included in the response of the original query by the user. The results of execution of this rule could then be displayed in the response to the user.

In some embodiments of the present invention, an implementation of the rules engine may overcome the limitations of a single computational server's limited resources by distributing the evaluations of rules in a parallel manner amongst multiple computational servers. Such an implementation could be built to distribute computation while preserving the same semantics as a non-distributed rules engine.

In such an implementation, a master computational server could orchestrate the computation by broadcasting the query and combining the results of the rule evaluation of multiple slave computational servers. In this implementation, the collection of rules is replicated on all master and slave computational servers. Each slave server may have different knowledge bases (or different portions of an overall knowledge base), so that on each client the rules are evaluated with respect to a different knowledge base.

In this implementation, the master server receives queries which are forwarded to each slave server. Each slave server on receipt of a query attempts to evaluate the rules with respect to its knowledge base. The master server then takes the rule evaluation results from each client server and combines the results with respect to the collection of rules.

In this implementation, the slave server begins by determining which of the entire collection of rules' triggers are valid with respect to the query or navigation state and placing the subset of rules in temporary storage. The resulting rules are then evaluated one by one, executing the actions on each rule. In order to preserve the semantics of the collective, slave servers may compute a larger set of rules that modify and conditionally depend on variables than deemed locally necessary. This additional computation allows the master server to combine the results in order to preserve the semantic of the non-distributed rules engine.

In this implementation, the slave servers, when they do not have enough information to fully determine the value of a variable, proceed using an estimate of the variable's value or range of values, based on their partial information. The master server, when it receives responses from the slave servers, determines if the slaves performed their computations correctly. If they did not, it sends information to the servers to correct those estimates. Multiple iterations may be necessary to achieve correct results.

For example, for a set of rules that set a temporary variable limiting the number of rules executed, each client may compute up to the maximum of rules to be executed to minimize the number of iterations from the master to the client. The master, in this case, combines the rules by then merging the results of client rule evaluations, possibly discarding individual results. This example trades additional evaluation by the client servers to eliminate additional iterations.

The search and navigation system described above allows information providers to overlay a search and navigation system over any collection of documents. The knowledge base aspect and the search and navigation aspect can be performed independently by different providers, and information providers may outsource these functions to separate entities. Similarly, a generated knowledge base may be imported by a search and navigation specialist. Information providers may also outsource this search and navigation requirement to a search and navigation system provider. A search and navigation system provider could charge customers a license fee for the system independent of the amount of its usage. Alternatively, a search and navigation system provider could charge customers on a per-click basis, a per-purchase basis if products are available via the system, or per-transaction generated from a click through the search and navigation system. A search and navigation system provider could also function as an aggregator—compiling records from a number of sources, combining them into a global data set, and generating a search and navigation system to search and navigate the data set. The search and navigation system can be implemented as software provided on a disk, on a CD, in memory, etc., or provided electronically (such as over the Internet).

A search and navigation system may also enhance user profiling capability and merchandising capability. The search and navigation system may maintain a profile of users based on the users' selections, including the particular paths selected to explore the collection of navigation states. Using the knowledge base, the system may also infer additional information regarding the users' preferences and interests by supplementing the selection information with information regarding related documents, attributes and terms in the knowledge base. That information may be used to market goods and services related to the documents of interest to the user.

The foregoing description has been directed to specific embodiments of the invention and specific examples of systems with which the invention may be used. The invention may be embodied in other specific forms without departing from the spirit and scope of the invention. The embodiments, figures, terms and examples used herein are intended by way of reference and illustration only and not by way of limitation. The scope of the invention is indicated by the appended claims and all changes that come within the meaning and scope of equivalency of the claims are intended to be embraced therein.

We claim:

1. A computer-implemented method for executing a rule for manipulating the content of a response to a query in a computer-implemented search and navigation system for a set of materials, comprising:

storing a plurality of attribute-value pairs associated with the materials, wherein each of a plurality of values has an association with at least one of the attributes characterizing the materials;

computing a plurality of navigation states, each navigation state corresponding to a particular expression of attribute-value pairs and to a particular subset of the materials, wherein for each navigation state the particular subset of the materials corresponding to the navigation state consists of those materials that are each described in accordance with the particular expression by every attribute-value pair in the particular expression of attribute-value pairs corresponding to that navigation state, wherein within the plurality of navigation states, at least a first navigation state includes a first attribute-value pair having a first attribute, in which the first attribute-value pair does not describe all the materials that the first attribute characterizes and a second navigation state includes at least the first attribute-value pair and a second attribute-value pair having a second attribute, which is not the same as the first attribute, in which the second attribute-value pair does not describe all the materials that second attribute characterizes;

obtaining a query;

identifying a current navigation state associated with the query, the current navigation state corresponding to a current particular expression of attribute-value pairs and a current particular subset of materials;

obtaining a rule including a trigger and an action, the rule including a trigger defined in terms of a third attribute-value pair and an action for manipulating the content of a response to the query by providing a first alternate subset of materials;

determining whether the trigger is satisfied by the current navigation state;

performing the action by substituting the first alternate subset of materials instead of the current particular subset of materials if the trigger is satisfied; and displaying a response to the query, the response to the query including a representation of the current particular subset of materials if the trigger is not satisfied by the current navigation state and including a representation of the first alternate subset of materials if the trigger is satisfied by the current navigation state.

2. The method of claim 1, wherein the third attribute-value pair used to define the trigger is included in an expression of one or more attribute-value pairs.

3. The method of claim 2, wherein the expression of one or more attribute-value pairs identifies a navigation state.

4. The method of claim 3, wherein the trigger is defined to include descendants of the navigation state.

5. The method of claim 3, wherein the trigger is defined to include ancestors of the navigation state.

6. The method of claim 3, wherein the trigger is defined using a function that measures a distance between navigation states.

7. The method of claim 1, wherein the third attribute-value pair is included in a Boolean combination of navigation states.

8. The method of claim 1, wherein the trigger includes an explicitly identified set of navigation states.

9. The method of claim 1, wherein the trigger includes an implicitly identified set of navigation states.

10. The method of claim 1, wherein the trigger is further defined with a keyword.

11. The method of claim 1, wherein the trigger incorporates randomization.

12. The method of claim 1, further comprising applying a script that provides logic for processing the rule.

13. The method of claim 12, wherein the script includes randomized logic in the logic for processing the rule.

14. The method of claim 12, wherein the script includes sequential logic in the logic for processing the rule.

15. The method of claim 12, wherein the script includes conditional logic in the logic for processing the rule.

16. The method of claim 15, wherein the conditional logic is designed to avoid duplication in the response.

17. The method of claim 1, wherein the action uses the query in substituting the first alternate subset of materials.

18. The method of claim 1, wherein the action does not use the query in substituting the first alternate subset of materials.

19. The method of claim 1, wherein the action includes identifying supplemental materials to be added to the current particular subset of materials to derive the first alternate subset of materials.

20. The method of claim 1, wherein the action includes identifying a supplemental navigation state to be included in the response.

21. The method of claim 1, wherein the action includes generating a suggested query to be included in the response.

22. The method of claim 1, wherein the action includes grouping desired content.

23. The method of claim 1, wherein the action includes sorting desired content.

24. The method of claim 1, wherein the action includes filtering desired content.

25. The method of claim 1, wherein the action includes rendering desired content in a particular format.

26. The method of claim 1, further comprising providing the response by integrating the first alternate subset of materials with the current particular subset of materials.

27. The method of claim 1, wherein displaying the response includes providing previews of navigation states.

28. The method of claim 1, wherein the rule specifies one or more variables that are populated by the determination of whether the trigger is satisfied and that are used in performing the action.

29. The method of claim 1, wherein the rule specifies one or more variables that are populated by the determination of whether the trigger is satisfied.

30. The method of claim 1, wherein the rule specifies one or more variables that are used in performing the action.

31. The method of claim 1, further including using the current expression of attribute-value pairs for determining whether the trigger is satisfied.

32. The method of claim 31, wherein the query includes refinement options selected by the user.

33. The method of claim 31, wherein the query includes text entered by a user.

34. The method of claim 1, further including the step of defining the rule.

35. The method of claim 1, further including the step of generating a script to process the rule.

36. The method of claim 1, wherein performing the action includes using one or more variables that have been set.

37. The method of claim 36, wherein the variables were set by the rule that includes the action being performed.

38. The method of claim 36, wherein the variables were set by one or more rules other than the rule that includes the action being performed.

39. The method of claim 1, further including the step of populating one or more variables associated with the rule based on the query.

40. The method of claim 1, wherein performing the action includes generating a supplemental query.

41. A computer-implemented method for specifying a rule for a computer-implemented search and navigation system for a set of materials, comprising:

storing a plurality of attribute-value pairs associated with the materials, wherein each of a plurality of values has an association with at least one of a plurality of attributes characterizing the materials;

computing a plurality of navigation states, each navigation state corresponding to a particular expression of attribute-value pairs and to a particular subset of the materials, wherein for each navigation state the particular subset of the materials corresponding to the navigation state consists of those materials that are each described in accordance with the particular expression by every attribute-value pair in the particular expression of attribute-value pairs corresponding to that navigation state, wherein within the plurality of navigation states, at least a first navigation state includes a first attribute-value pair having a first attribute, in which the first attribute-value pair does not describe all the materials that the first attribute characterizes and a second navigation state includes at least the first attribute-value pair and a second attribute-value pair having a second attribute, which is not the same as the first attribute, in which the second attribute-value pair does not describe all the materials that second attribute characterizes;

specifying a trigger for the rule in terms of a third attribute-value pair such that the rule is activated in a rules engine for executing the rule if a current navigation state satisfies the trigger;

specifying an action for the rule to manipulate content provided for display if the rule is activated by substituting a first alternate subset of materials for the particular subset of materials corresponding to the current navigation state; and storing the rule.

42. The method of claim 41, wherein specifying a trigger includes identifying an attribute-value pair and specifying a relationship between the attribute-value pair and a query.

43. A computer-implemented method for specifying a rule for a computer-implemented search and navigation system for a set of materials, comprising:

storing a plurality of attribute-value pairs associated with the materials, wherein each of a plurality of values has an association with at least one of the attributes characterizing the materials;

computing a plurality of navigation states, each navigation state corresponding to a particular expression of attribute-value pairs and to a particular subset of the materials, wherein for each navigation state the particular subset of the materials corresponding to the navigation state consists of those materials that are each described in accordance with the particular expression by every attribute-value pair in the particular expression of attribute-value pairs corresponding to that navigation state, wherein within the plurality of navigation states, at least a first navigation state includes a first attribute-value pair having a first attribute, in which the first attribute-value pair does not describe all the materials that the first attribute characterizes and a second navigation state includes at least the first attribute-value pair and a second attribute-value pair having a second attribute, which is not the same as the first attribute, in which the second attribute-value pair does not describe all the materials that second attribute characterizes;

specifying a trigger for the rule to be evaluated in relation to a current query; and specifying an action for the rule to manipulate content provided for display if the rule is activated by the query by substituting a first alternate navigation state for a current navigation state associated with the current query; and storing the rule.

* * * * *